(12) United States Patent
Horihata et al.

(10) Patent No.: US 8,350,886 B2
(45) Date of Patent: Jan. 8, 2013

(54) VEHICLE-MOUNTED VIDEO COMMUNICATION SYSTEM AND VEHICLE-MOUNTED IMAGE PICKUP SYSTEM

(75) Inventors: Satoshi Horihata, Yokkaichi (JP); Akihiro Natsume, Yokkaichi (JP); Makoto Miyashita, Yokkaichi (JP); Takeshi Fujimoto, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 765 days.

(21) Appl. No.: 12/449,211

(22) PCT Filed: Feb. 15, 2008

(86) PCT No.: PCT/JP2008/052522
§ 371 (c)(1),
(2), (4) Date: Aug. 6, 2009

(87) PCT Pub. No.: WO2008/099918
PCT Pub. Date: Aug. 21, 2008

(65) Prior Publication Data
US 2010/0039494 A1 Feb. 18, 2010

(30) Foreign Application Priority Data

Feb. 16, 2007 (JP) .................................. 2007-036555
Feb. 22, 2007 (JP) .................................. 2007-042941
Feb. 28, 2007 (JP) .................................. 2007-049637

(51) Int. Cl.
*H04N 7/14* (2006.01)

(52) U.S. Cl. .................................. 348/14.01; 348/14.12
(58) Field of Classification Search ....................... None
See application file for complete search history.

(56) References Cited

U.S. PATENT DOCUMENTS

| 7,010,583 | B1 * | 3/2006 | Aizono et al. | 709/219 |
| 2001/0019363 | A1 * | 9/2001 | Katta et al. | 348/333.01 |
| 2005/0188407 | A1 * | 8/2005 | van Beek et al. | 725/81 |
| 2007/0035625 | A9 * | 2/2007 | Hamdan et al. | 348/148 |

FOREIGN PATENT DOCUMENTS

| JP | A-2001-197480 | 7/2001 |
| JP | A-2001-238195 | 8/2001 |
| JP | A-2001-346198 | 12/2001 |
| JP | A-2003-163926 | 6/2003 |
| JP | A-2003-230099 | 8/2003 |
| JP | A-2004-155395 | 6/2004 |
| JP | A-2004-173048 | 6/2004 |
| JP | A-2004-216984 | 8/2004 |
| JP | A-2004-282683 | 10/2004 |

(Continued)

*Primary Examiner* — Sath V Perungavoor
*Assistant Examiner* — Kate Luo
(74) *Attorney, Agent, or Firm* — Oliff & Berridge, PLC

(57) ABSTRACT

A vehicle-mounted video communication system is equipped with first to fourth image pickup devices, mounted on a vehicle, for transmitting video data obtained by picking up an image; first to fourth video processing devices for processing the video data; and a vehicle-mounted video relay device having connection sections connected to the first to fourth image pickup devices and the first to fourth video processing devices via communication cables and configured to transmit the video data transmitted from the first to fourth image pickup devices selectively or in a multiplexed state to the first to fourth video processing devices.

7 Claims, 28 Drawing Sheets

FOREIGN PATENT DOCUMENTS

| | | |
|---|---|---|
| JP | A-2005-117614 | 4/2005 |
| JP | A-2005-184397 | 7/2005 |
| JP | A-2006-13808 | 1/2006 |
| JP | A-2006-25188 | 1/2006 |
| JP | A-2006-180026 | 7/2006 |
| JP | A-2006-211415 | 8/2006 |
| JP | A-2006-222611 | 8/2006 |
| JP | A-2006-224927 | 8/2006 |

\* cited by examiner

VEHICLE-MOUNTED VIDEO COMMUNICATION SYSTEM AND VEHICLE-MOUNTED IMAGE PICKUP SYSTEM

This application is the national phase under 35 U.S.C. §371 of PCT International Application No. PCT/JP2008/52522 which has an International filing date of Feb. 25, 2008 and designated the United States of America.

BACKGROUND

1. Technical Field

The present invention relates to a vehicle-mounted video communication system for transmitting the video data picked up by image pickup devices mounted on a vehicle to video processing devices via communication lines (transmission lines) and to a vehicle-mounted image pickup system capable of recording the video pictures picked up by the image pickup devices.

2. Description of Related Art

In recent years, video pictures of the periphery of a vehicle are picked up using a plurality of image pickup devices mounted on the vehicle and the picked up video pictures are displayed on a display device, such as a head-up display and a car navigation display, so as to prevent traffic accidents.

Since, by picking up an image of a blind area in the view from the driver's seat, the area incapable of being directly viewed by the driver can be displayed on a display, the driver can take necessary actions to prevent accidents. Furthermore, a system has also been developed in which pedestrians, other vehicles, etc. around the vehicle are detected by performing various processing on the basis of the video pictures picked up using the image pickup devices mounted on the vehicle and a warning is issued to the driver. Hence, the number of such image pickup devices mounted on each vehicle tends to increase. Moreover, in recent years, image pickup devices are also mounted inside the vehicle to pick up video pictures of the driver, and the video pictures are subjected to various processing using the image pickup devices, such as the detection of the line of sight of the driver.

FIG. 27 is a block diagram showing an example of a conventional vehicle-mounted video communication system. The vehicle-mounted video communication system is equipped with a plurality of image pickup devices, that is, first to third image pickup devices 21, 22 and 23, mounted on a vehicle. First to third video processing devices 31, 32 and 33 are connected one-to-one to the first to third image pickup devices 21, 22 and 23, respectively, via cables. The first to third video processing devices 31, 32 and 33 process video data, thereby detecting the traveling position of the vehicle, detecting pedestrians and issuing warnings, for example.

Furthermore, in recent years, attention is paid to a drive recorder for recording the video pictures picked up by image pickup devices at the time of occurrence of an accident, such as a vehicle collision. The drive recorder is configured so as to record the video pictures picked up during a predetermined period of approximately several seconds to several ten seconds before and after the time of occurrence of the collision. Hence, the drive recorder is advantageous in that, in the case that an accident occurred, the cause of the accident can be investigated more accurately.

Japanese Patent Application Laid-Open No. 2006-211415 has proposed a vehicle-mounted image recording device in which video information around a vehicle is obtained and encoded as video-encoded stream information, the traveling state information of the vehicle is obtained, and the video-encoded stream information and the traveling state information are multiplexed, whereby a multiplexed stream is generated and recorded. With this vehicle-mounted image recording device, the multiplexed stream recorded can be used as evidence in the case of occurrence of an accident. Furthermore, video picture recorded regardless of the occurrence of an accident can be viewed easily by the user.

SUMMARY

As a video processing device is improved in processing capability and becomes multifunctional and as image pickup devices mounted on each vehicle increase in number, it becomes necessary to connect a plurality of image pickup devices to a single video processing device via cables. When a plurality of connection terminals are provided in a video processing device and image pickup devices are connected to the connection terminals via cables, there occurs a problem that the wiring between the image pickup devices and the video processing device becomes complicated and bulky. Furthermore, as the connection terminals increase in number, there occurs a problem that these devices are increased in size.

FIG. 28 is a block diagram schematically showing an example of the problems in the above-mentioned connection method. When three image pickup devices, that is, first to third image pickup devices 21, 22 and 23, are connected to a second video processing device 32 via cables, and two image pickup devices, that is, the first and third image pickup devices 21 and 23, are connected to a third video processing device 33, three connection terminals are required to be provided in the second video processing device 32, and two connection terminals are required to be provided in the third video processing device 33. Hence, the second and third video processing devices 32 and 33 are increased in size. In addition, the wiring state of the cables becomes complicated as shown in FIG. 28. Furthermore, when the first image pickup device 21 is connected to three video processing devices, that is, the first to third video processing devices 31, 32 and 33, via cables, three connection terminals are also required to be provided in the first image pickup device 21, and the first image pickup device 21 are also increased in size.

In particular, while the automotive field becomes more electronic, vehicles are requested to be reduced in size, and interior spaces of the vehicles are required to be increased. For this reason, various vehicle-mounted devices and cables are required to have less space, and the above-mentioned problems have become serious.

Moreover, when image pickup devices for transmitting analog video data and image pickup devices for transmitting digital video data are mixed, the video processing device connected thereto is required to be equipped with analog connection terminals, digital connection terminals and an AD converter, thereby causing a problem that the video processing device is increased in size.

Still further, a conventional drive recorder is configured so as to be equipped with an image pickup device, a sensor, a memory, a control circuit, etc, designed for exclusive use, thereby being high in cost, and the range picked up by the image pickup device is limited to a narrow range, such as only a range in front of a vehicle. The vehicle-mounted image recording device described in Japanese Patent Application Laid-Open No. 2006-25188 also has these problems. When a plurality of image pickup devices are mounted on a vehicle as shown in FIGS. 27 and 28, if a drive recorder is configured using these image pickup devices, the cost can be reduced, and video pictures can be picked up in a wide range and recorded. However, since the plurality of image pickup devices are connected to the drive recorder, a plurality of communication lines are required to be laid out in the vehicle, problems similar to those described above will occur.

In consideration of the above-mentioned circumstances, an object of the present invention is to provide a vehicle-mounted video communication system equipped with a vehicle-mounted video relay device for collecting the video data obtained by picking up with a plurality of image pickup devices and for transmitting the collected video data selectively or in a multiplexed state to a video processing device via one communication line, whereby the wiring between the plurality of image pickup devices and the video processing device can be simplified, the total length of the cables can be reduced, and the respective devices can be reduced in size.

Another object of the present invention is to provide a vehicle-mounted video communication system configured so that the communication line for connecting a vehicle-mounted video relay device to one of video processing devices is branched by a branching unit and the other video processing device is connected to the branched communication line, whereby a plurality of image pickup devices can be connected to the plurality of video processing devices, the wiring can be prevented from becoming complicated and bulky, and the respective devices can be prevented from being increased in size.

Another object of the present invention is to provide a vehicle-mounted video communication system configured so that a plurality of video processing devices are connected using another communication line, one of the video processing devices collects the video request data of each video processing device via the another communication line and the collected video request data is transmitted to the video processing devices, whereby the amount of data to be transmitted from the vehicle-mounted video relay device to the video processing devices via a video data communication line can be reduced and the transmission band of the communication lines for the video data can be extended.

Another object of the present invention is to provide a vehicle-mounted video communication system configured so that, when the image pickup devices thereof are required not to pick up an image, that is, no video processing device requests the video data of any of the image pickup devices, the power supply to the image pickup devices is shut off, whereby wasteful power consumption can be reduced.

Another object of the present invention is to provide a vehicle-mounted video communication system configured so that, in the case that the operation state of one of the video processing devices, for collecting and transmitting video request data, is monitored and the video processing device operates abnormally, video data transmitted from a predetermined image pickup device is transmitted to each video processing device, whereby, even if the one of the video processing devices becomes faulty, the minimum amount of video data can be transmitted to the other video processing devices.

Another object of the present invention is to provide a vehicle-mounted video communication system configured so that, in the case that one of the video processing devices, for collecting and transmitting video request data, becomes faulty, the video data obtained by picking up with a predetermined image pickup device is transmitted to each video processing device at a predetermined resolution and frame rate, whereby even if the one of the video processing devices becomes faulty, the minimum amount of video data can be transmitted to the other video processing device at the predetermined resolution and frame rate.

Another object of the present invention is to provide a vehicle-mounted video communication system configured so that a video processing device transmits video request data containing data indicating the resolution and frame rate of video data, and a vehicle-mounted video relay device converts the resolution and frame rate of the video data on the basis of the data, whereby the video data having the resolution and frame rate at which each video processing device can operate can be transmitted to each video processing device.

Another object of the present invention is to provide a vehicle-mounted video communication system configured so that one of video processing devices autonomously specifies video data required for each video processing device depending on a detection result of an external detector and requests the video data from the vehicle-mounted video relay device, whereby video data required by each video processing device can be transmitted without collecting the video request data from each video processing device.

Another object of the present invention is to provide a vehicle-mounted video communication system configured so that an image pickup device is equipped with means for performing predetermined processing for video data and for transmitting a predetermined signal to a vehicle-mounted video relay device depending on the result of the processing and so that, when the predetermined signal is received, the vehicle-mounted video relay device forcibly transmits the video data of the image pickup device to a video processing device, whereby video data being judged autonomously to be important can be transmitted.

Another object of the present invention is to provide a vehicle-mounted video communication system configured so that, when the video data of an image pickup device from which a predetermined signal was transmitted is multiplexed with the other video data and transmitted and that a bit rate of the multiplexed video data is equal to or more than a predetermined bit rate, the resolution or frame rate of the other video data is reduced, and the other video data is transmitted, whereby important video data can be multiplexed and transmitted preferentially.

Another object of the present invention is to provide a vehicle-mounted video communication system equipped with a vehicle-mounted video relay unit for collecting and AD-converting the video data obtained by picking up with a plurality of image pickup devices and for transmitting the AD-converted digital video data selectively or in a multiplexed state to a video processing device via one communication line, such as a cable, whereby the wiring between the plurality of image pickup devices and the video processing device can be simplified, the total length of the cables can be reduced, and the video processing device can be formed of a small video processing device having no analog video data receiving connection terminals and no A/D conversion section.

Another object of the present invention is to provide a vehicle-mounted video communication system equipped with a branching unit for AD-converting the analog video data obtained by picking up with an image pickup device and for distributing the AD-converted digital video data to a plurality of video processing devices, whereby the wiring between the image pickup device and the plurality of video processing devices is simplified, the total length of the cables can be reduced, and the video processing device can be formed of a small video processing device having no analog video data receiving connection terminals and no A/D conversion section.

Another object of the present invention is to provide a vehicle-mounted video communication system being equipped with the above-mentioned vehicle-mounted video relay unit and the above-mentioned branching unit, whereby the wiring between the plurality of image pickup devices and the plurality of video processing devices is simplified, the total length of the cables can be reduced, and the video processing device can be formed of a small video processing device having no analog video data receiving connection terminals and no A/D conversion section.

Another object of the present invention is to provide a vehicle-mounted image pickup system being configured so that a plurality of image pickup devices and a processing device (video processing device) are connected via a signal switching device (vehicle-mounted video relay unit) for switching and outputting one or more video signals from a plurality of input video signals (video data), the video pictures obtained by picking up with the plurality of image pickup devices are switched and supplied to the processing device, and the plurality of input video pictures are recorded by the signal switching device, whereby the amount of transmission lines (signal lines) laid out in a vehicle can be reduced, the number of transmission lines connected to the processing device can be reduced, and the signal switching device can be used as a drive recorder.

Another object of the present invention is to provide a vehicle-mounted image pickup system being configured so that a trigger signal is generated on the basis of vehicle information, such as the acceleration, speed or brake operation state of a vehicle and a signal switching device records the video pictures picked up during a predetermined period before and/or after generation of the trigger signal, whereby the occurrence of an accident to the vehicle is detected, and the signal switching device can record the video pictures picked up before and after the accident.

Another object of the present invention is to provide a vehicle-mounted image pickup system being configured so that a signal switching device reduces the amount of the data of the video pictures picked up by image pickup devices and records the video pictures, whereby the video pictures can be recorded while the recording capacity of a memory, a hard disk drive or the like mounted on the signal switching device is used efficiently.

Another object of the present invention is to provide a vehicle-mounted image pickup system being configured so that a control signal relating to reading of the video picture recorded in a recording section is received and the video picture is read from the recording section, whereby the video picture recorded by using the recording section as a drive recorder can be displayed on a display or the like.

Another object of the present invention is to provide a vehicle-mounted image pickup system being configured so that a processing device outputs, to a signal switching device, a control signal for controlling switching of a video signal in a signal switching device and a control signal relating to reading of a recorded video picture, using a transmission line for transmitting a video signal from the signal switching device to the processing device, whereby the video signals can be switched and the recorded video pictures can be read without increasing the number of transmission lines between the signal switching device and the processing device.

Another object of the present invention is to provide a vehicle-mounted image pickup system being configured so that a processing device outputs, to a signal switching device, a control signal for controlling switching of a video signal in a signal switching device and a control signal relating to reading of a recorded video picture, using a power line for supplying power from power supplying means, such as a battery, mounted on a vehicle to the image pickup devices and processing device, whereby the video signals can be switched and the recorded video pictures can be read without increasing the number of transmission lines between the signal switching device and the processing device.

Another object of the present invention is to provide a vehicle-mounted image pickup system being configured so that an image pickup device and a plurality of processing devices are connected via a signal distributor (branching unit) for distributing an input video signal, the video picture picked up by the image pickup device is distributed to the plurality of processing devices, and the signal distributor records the input video picture, whereby the amount of transmission lines laid out in a vehicle can be reduced, and the signal distributor can be used as a drive recorder without providing a function of relaying video signals in the processing devices.

Another object of the present invention is to provide a vehicle-mounted image pickup system being configured so that a trigger signal is generated on the basis of vehicle information and a signal distributor records the video picture picked up during a predetermined period before and/or after generation of the trigger signal, whereby the occurrence of an accident to the vehicle is detected, and the signal distributor can record the video picture picked up before and after the accident.

Another object of the present invention is to provide a vehicle-mounted image pickup system being configured so that a signal distributor reduces the amount of the data of the video pictures picked up by image pickup devices and records the video pictures, whereby the video pictures can be recorded while the recording capacity of a memory, a hard disk drive or the like mounted on the signal distributor is used efficiently.

Another object of the present invention is to provide a vehicle-mounted image pickup system being configured so that the signal distributor directly outputs the video signal input from an image pickup device to one of the output sections thereof connected to one processing device and the signal distributor outputs the video signal amplified by an amplifier to the other output section connected to the other processing device, whereby, even when the signal distributor distributes the video signal to a plurality of processing devices, the video signal can be prevented from being degraded.

A vehicle-mounted video communication system according to a first aspect is a vehicle-mounted video communication system characterized by comprising: a plurality of image pickup devices, mounted on a vehicle, for transmitting video data obtained by picking up an image, a video processing device for processing the video data, and a vehicle-mounted video relay device having a connection section connected to said plurality of image pickup devices and said video processing device via a communication line, and configured to transmit the video data transmitted from said image pickup devices selectively or in a multiplexed state to said video processing device.

A vehicle-mounted video communication system according to a second aspect is characterized by further comprising: a plurality of said video processing devices; the communication line for connecting said vehicle-mounted video relay device to one of said video processing devices, and a branching unit for branching said communication line, wherein the other video processing device is connected to a communication line branched by said branching unit.

A vehicle-mounted video communication system according to a third aspect is characterized in that said plurality of video processing devices are connected to one another via another communication line, said video processing devices include means for generating video request data for requesting the video data of a specific one of said image pickup devices, one of said video processing devices includes: collecting means for collecting the video request data generated in each video processing device via the another communication line; and transmitting means for transmitting the collected video request data to said vehicle-mounted video relay device via said communication line, and said vehicle-mounted video relay device includes: receiving means for receiving the video request data transmitted from said transmitting means; specifying means for specifying said image pickup device required to pick up an image, on the basis of the video request data received by said receiving means; and means for transmitting the video data transmitted from said image pickup device specified by said specifying means to each video processing device.

A vehicle-mounted video communication system according to a fourth aspect is characterized by further comprising means for supplying power to said image pickup device specified by said specifying means, and shutting off power supply to said image pickup device required not to pick up an image.

A vehicle-mounted video communication system according to a fifth aspect is characterized in that the one of said video processing devices transmits video request data at intervals of predetermined time, said vehicle-mounted video relay device includes a timer section for measuring time passed after said receiving section received one item of video request data, and said vehicle-mounted video relay device, when the predetermined time has passed before said receiving section receives another item of video request data, transmits video data transmitted from a predetermined image pickup device to each video processing device.

A vehicle-mounted video communication system according to a sixth aspect is characterized in that said vehicle-mounted video relay device includes a converting section for converting the video data transmitted from said predetermined image pickup device into video data having a predetermined resolution or frame rate, and said vehicle-mounted video relay device transmits the converted video data having the predetermined resolution or frame rate to said video processing devices.

A vehicle-mounted video communication system according to a seventh aspect is characterized in that said video request data contains data indicating a resolution or frame rate of video data, and said vehicle-mounted video relay device includes means for converting the resolution or frame rate of video data on the basis of said data.

A vehicle-mounted video communication system according to an eighth aspect is characterized in that one of said video processing devices includes: detection result receiving means for receiving a detection result from an external detector; a table which stores the detection results and the image pickup devices specified according to the detection results, associated with each other; specifying means for specifying said image pickup device according to the detection result on the basis of the detection result received by said detection result receiving means and said table; and means for transmitting video request data requesting video data of the image pickup device specified by said specifying means to said vehicle-mounted video relay device, and said vehicle-mounted video relay device includes: receiving means for receiving the video request data transmitted from said transmitting means; specifying means for specifying said image pickup device required to pick up an image, on the basis of the video request data received by said receiving means; and means for transmitting the video data transmitted from said image pickup device specified by said specifying means to each video processing device.

A vehicle-mounted video communication system according to a ninth aspect is characterized in that said image pickup device includes: means for performing predetermined processing for video data obtained by picking up an image; and means for transmitting a predetermined signal depending on a result of the predetermined processing, and said vehicle-mounted video relay device includes means for receiving the predetermined signal, and said vehicle-mounted video relay device, when the predetermined signal is received, transmits video data of an image pickup device from which the predetermined signal was transmitted to said video processing device.

A vehicle-mounted video communication system according to a tenth aspect is characterized by further comprising: bit rate judging means for, when the video data of said image pickup device from which the predetermined signal was transmitted and video data of the other image pickup device are multiplexed and transmitted, judging as to whether a bit rate of the video data that is multiplexed and transmitted is equal to or more than a predetermined bit rate; and converting means for, when said bit rate judging means judges that the bit rate is equal to or more than the predetermined bit rate, converting the video data of the other image pickup device into video data having a lower bit rate.

A vehicle-mounted video communication system according to an 11th aspect is a vehicle-mounted video communication system characterized by comprising a plurality of image pickup devices, mounted on a vehicle, for transmitting video data obtained by picking up an image, a video processing device for processing digital video data, and a vehicle-mounted video relay unit for transmitting the video data transmitted from said plurality of image pickup devices selectively or in a multiplexed state to said video processing device, wherein said one or more image pickup devices transmit analog video data, and said vehicle-mounted video relay unit includes: a connection section connected to said plurality of image pickup devices and said video processing device; and an A/D conversion section for converting the analog video data transmitted from said image pickup device into digital video data, whereby said vehicle-mounted video relay unit transmits digital video data to said video processing device.

A vehicle-mounted video communication system according to a 12th aspect is a vehicle-mounted video communication system characterized by comprising an image pickup device, mounted on a vehicle, for transmitting analog video data obtained by picking up an image, a plurality of video processing devices for processing digital video data, and a branching unit for distributing the video data transmitted from said image pickup device, wherein said branching unit includes; a connection section connected to said image pickup device and said plurality of video processing devices; and an A/D conversion section for converting the analog video data transmitted from said image pickup device into digital video data, whereby said branching unit transmits the digital video data to said plurality of video processing devices.

A vehicle-mounted video communication system according to a 13th aspect is a vehicle-mounted video communication system characterized by comprising a first image pickup device and a second image pickup device, mounted on a vehicle, for transmitting analog video data obtained by picking up an image, a first video processing device and a second video processing device for processing digital video data, a branching unit for distributing the video data transmitted from said first image pickup device, and a vehicle-mounted video relay unit for transmitting the video data transmitted from said first and second image pickup devices selectively or in a multiplexed state to said second video processing device, wherein said branching unit includes: a connection section connected to said first image pickup device, said first video processing device and said vehicle-mounted video relay unit; and an A/D conversion section for converting the video data transmitted from said first image pickup device into digital video data, whereby said branching unit transmits the digital video data to said first video processing device and said vehicle-mounted video relay unit, and said vehicle-mounted video relay unit includes: a connection section connected to said branching unit, said second image pickup device and said second video processing device; and an A/D conversion section for converting the video data transmitted from said second image pickup device into digital video data, whereby said vehicle-mounted video relay unit transmits the digital video data to said second video processing device.

A vehicle-mounted image pickup system according to a 14th aspect is a vehicle-mounted image pickup system characterized by comprising a plurality of image pickup devices, mounted on a vehicle, for picking up a video picture of an interior and/or exterior of the vehicle and a processing device for performing processing on the basis of a video picture picked up by said image pickup device, said vehicle-mounted image pickup system further comprising: a transmission line for transmitting a video signal relating to the video picture picked up by said image pickup device; and a signal switching device including: a plurality of input sections connected to said plurality of image pickup devices via the transmission line so that said video signal is input thereto; an output section connected to said processing device via the transmission line for outputting said video signal; a switching section for switching a plurality of video signals input to said input sections to one or more video signals and for supplying the one or more video signals to said output section; and a recording section for recording a video picture relating to the video signal input to said input sections, wherein said image pickup devices and said processing device are connected via said signal switching device.

A vehicle-mounted image pickup system according to a 15th aspect is characterized by further comprising: vehicle information acquiring means for acquiring vehicle information regarding said vehicle; and trigger signal generating means for generating a trigger signal on the basis of the vehicle information acquired by said vehicle information acquiring means, wherein the recording section of said signal switching device records a video picture relating to a video signal input during a predetermined period before and/or after generation of said trigger signal.

A vehicle-mounted image pickup system according to a 16th aspect is characterized in that said signal switching device includes reducing means for reducing a data amount of a video picture relating to the video signal input to said input section, and said recording section records a video picture having a data amount reduced by said reducing means.

A vehicle-mounted image pickup system according to a 17th aspect is characterized in that said signal switching device includes: receiving means for receiving a control signal relating to reading of the video picture recorded in said recording section; and reading means for reading a video picture from said recording section depending on the control signal received by said receiving means.

A vehicle-mounted image pickup system according to an 18th aspect is characterized in that said processing device outputs a control signal for controlling switching of the switching section of said signal switching device and a control signal relating to reading of the video picture recorded in said recording section of said signal switching device, to said signal switching device via said transmission line.

A vehicle-mounted image pickup system according to a 19th aspect is characterized by further comprising: a power line for supplying power from power supplying means mounted on said vehicle to said image pickup devices and said processing device, wherein said processing device outputs a control signal for controlling switching of the switching section of said signal switching device and a control signal relating to reading of the video picture recorded in the recording section of said signal switching device, to said signal switching device via said power line.

A vehicle-mounted image pickup system according to a 20th aspect is a vehicle-mounted image pickup system characterized by comprising an image pickup device, mounted on a vehicle, for picking up a video picture of an interior and/or exterior of the vehicle, and a plurality of processing devices for performing processing on the basis of a video picture picked up by the image pickup device, said vehicle-mounted image pickup system further comprising: a transmission line for transmitting a video signal relating to the video picture picked up by said image pickup device; and a signal distributor including: an input section connected to said image pickup device via the transmission line so that the video signal from said image pickup device is input thereto; a plurality of output sections connected to said processing devices via the transmission line for outputting the video signal; a distribution section for distributing the video signal input to said input section to said plurality of output sections; and a recording section for recording a video picture relating to the video signal input to said input section, wherein said image pickup device and said processing devices are connected via said signal distributor.

A vehicle-mounted image pickup system according to a 21st aspect is characterized by further comprising: vehicle information acquiring means for acquiring vehicle information regarding said vehicle; and trigger signal generating means for generating a trigger signal on the basis of the vehicle information acquired by said vehicle information acquiring means, wherein the recording section of said signal distributor records a video picture relating to a video signal input during a predetermined period before and/or after generation of said trigger signal.

A vehicle-mounted image pickup system according to a 22nd aspect is characterized in that said signal distributor includes reducing means for reducing a data amount of a video picture relating to the video signal input to said input section, and said recording section records a video picture having a data amount reduced by said reducing means.

A vehicle-mounted image pickup system according to a 23rd aspect is characterized in that the distribution section of said signal distributor directly outputs the video signal input to the input section to one of the output sections, and also outputs a video signal amplified by an amplifier to the other output section.

According to the first aspect, the plurality of image pickup devices and the video processing device are connected to the connection section of the vehicle-mounted video relay device, and the video data obtained by picking up with the image pickup devices are transmitted selectively or in a multiplexed state to the video processing device. In other words, the video data of the plurality of image pickup devices is transmitted to the video processing device via one communication line for connecting the video processing device to the vehicle-mounted video relay device.

Hence, even if the number of image pickup devices to be connected to the video processing device increases, the number of interfaces does not increase and the video processing device is not increased in size. In addition, the communication line does not become complicated or bulky.

According to the second aspect, the communication line connected to the vehicle-mounted video relay device is branched using the branching unit, and the other video processing device is connected to the branched communication line.

Hence, even if a plurality of image pickup devices and a plurality of video processing devices are connected, the number of interfaces does not increase, and the video processing device and the vehicle-mounted video relay device is not increased in size. Furthermore, the communication line does not become complicated or bulky.

Consequently, a plurality of image pickup devices can be connected to a plurality of video processing devices. Furthermore, the wiring is prevented from becoming complicated or bulky, and the respective devices can be prevented from being increased in size.

According to the third aspect, each video processing device generates video request data requesting video data to be required. The plurality of video processing devices are connected via another communication line other than that for video data, and one of the video processing devices collects the video request data respectively generated by the video processing devices through the another communication line. Then, the one of the video processing devices transmits the collected video request data to the vehicle-mounted video relay device via the communication line.

The receiving means of the vehicle-mounted video relay device receives the transmitted video request data. On the basis of the received video request data, the specifying means specifies the image pickup device required to pick up an image, and the vehicle-mounted video relay device transmits the video data of the specified image pickup device to each video processing device.

Hence, the data amount of the video request data transmitted from the video processing device to the vehicle-mounted video relay device is reduced and the transmission band of the communication line for transmitting the video data is extended in comparison with a case in which the video processing devices individually transmit the video request data to the vehicle-mounted video relay device. In other words, the data amount of the video data that can be transmitted through the communication line increases.

Furthermore, since the system is configured so as to transmit and receive the video request data through the communication line for video data, any additional communication line is not required to be connected to the vehicle-mounted video relay device, whereby the vehicle-mounted video relay device can be made small.

According to the fourth aspect, power is supplied to the image pickup device required to pick up an image, and power supply to the image pickup device whose video data is not requested and which is required not to pick up an image is shut off.

Hence, wasteful power consumption can be reduced.

According to the fifth aspect, it is possible to monitor the active/inactive state of one video processing device that is used to collect and transmit the video request data. In the case that the video processing device does not operate normally, predetermined video data, for example, the minimum amount of video data required for the operation of each video processing device, is transmitted.

More specifically, the one video processing device transmits the video request data at intervals of a predetermined time, and the vehicle-mounted video relay device measures the time passed after one item of the video request data was received. When the predetermined time has passed before the receiving means of the vehicle-mounted video relay device receives another item of the video request data, it is assumed that the one video processing device is faulty. In this case, since video data required for the other video processing device cannot be specified, the vehicle-mounted video relay device transmits the predetermined video data.

Hence, in the case that the one video processing device is faulty, the minimum amount of video data required for the operation of the other video processing device can be transmitted.

According to the sixth aspect, in the case that one of the video processing devices is faulty, the video data obtained by picking up with the predetermined image pickup device is converted into video data having the predetermined resolution or frame rate and the obtained video data is transmitted to each video processing device.

Hence, even when the total data amount of the video data to be transmitted at the time when one of the video processing devices is faulty exceeds the data amount that can be transmitted, the minimum amount of video data having a resolution and a frame rate required for the operations of each video processing device is transmitted.

Consequently, even if the video processing device for collecting and transmitting the video request data is faulty, the minimum amount of video data having the predetermined resolution and frame rate can be transmitted to each video processing device.

According to the seventh aspect, the video request data collected and transmitted by one of the video processing devices contains data indicating the resolution or frame rate of the video data. The vehicle-mounted video relay device converts the resolution or frame rate of the video data on the basis of the data contained in the video request data and transmits the obtained video data to each video processing device.

Hence, the video data having a resolution and a frame rate suited for each video processing device can be transmitted to the video processing device.

According to the eighth aspect, the video processing device receives the detection result from the external detector. The video processing device is equipped with the table which stores the detection results and the image pickup devices specified according to the detection results, associated with each other. The specified image pickup device is an image pickup device capable of obtaining video data required by each video processing device depending on the detection result. The specifying means specifies the image pickup device required to pick up an image on the basis of the received detection result and the table. Furthermore, the vehicle-mounted video relay device transmits the video data of the specified image pickup device to each video processing device.

Hence, the video data required by each video processing device can be transmitted to each video processing device without providing the above-mentioned other communication line for connecting each video processing device.

Consequently, the video data required by each video processing device can be transmitted without collecting the video request data from each video processing device. Furthermore, since the communication line to be connected to each video processing device to collect video data is not required, the wiring can be simplified and each video processing device can be reduced in size.

According to the ninth aspect, the image pickup device performs the predetermined processing for video data obtained by picking up an image and transmits the predetermined signal depending on the result of the processing.

When the predetermined signal is received, the vehicle-mounted video relay device transmits, to the video processing device, the video data of the image pickup device from which the predetermined signal was transmitted.

Hence, depending on the video picture picked up by the image pickup device, the vehicle-mounted video relay device autonomously judges as to whether the video data is present, whereby the vehicle-mounted video relay device can transmit the video data.

According to the tenth aspect, when the video data of the image pickup device from which the predetermined signal was transmitted and the video data of the other image pickup device are multiplexed and transmitted, the rate judging means judges as to whether the bit rate of the multiplexed video data is equal to or more than the predetermined bit rate.

When it is judged that the bit rate is equal to or more than the predetermined bit rate, in other words, when it is judged that the multiplexed video data cannot be transmitted, the bit rate of the other video data is reduced.

Hence, the video data of the image pickup device from which the predetermined signal was output is preferentially multiplexed and transmitted.

Consequently, important video data can be preferentially multiplexed and transmitted to each video processing device.

According to the 11th aspect, the plurality of image pickup devices and the video processing device are connected to the connection section of the vehicle-mounted video relay unit, and the video data obtained by picking up with the image pickup devices are transmitted selectively or in a multiplexed state to the video processing device. In other words, the video data obtained by picking up with the plurality of image pickup devices is transmitted to the video processing device via one communication line, such as a cable, connected to the video processing device. Hence, even if the number of image pickup devices to be connected to the video processing device increases, the number of interfaces does not increase and the video processing device is not increased in size. In addition, the communication line does not become complicated or bulky.

On the other hand, in the configuration in which one or more image pickup devices transmit analog video data to the vehicle-mounted video relay unit, the vehicle-mounted video relay unit converts the analog video data into digital video data and transmits the digital video data to the video processing device. Hence, the video processing device is not required to be equipped with connection terminals for receiving analog video data or an AD converter, whereby the video processing device can be reduced in size.

Means for connecting the image pickup devices, the vehicle-mounted video relay unit and the video processing device are not limited to a cable, but a cord, a conductor, an optical fiber, etc. may also be used, provided that they can transmit video data.

Hence, the wiring between the plurality of image pickup devices and the video processing device can be simplified, and the total length of the cables can be reduced. Furthermore, the video processing device can be formed of a small video processing device not equipped with connection terminals for receiving analog video data or an AD conversion section.

According to the 12th aspect, the image pickup device and the plurality of video processing devices are connected to the branching units, and the video data obtained by picking up with the image pickup device is distributed to the video processing devices. Hence, even if the number of image pickup devices to be connected to the video processing device increases, the number of interfaces does not increase and the video processing device in not increased in size. In addition, the communication line does not become complicated or bulky.

On the other hand, in the configuration in which the image pickup device transmits analog video data to the vehicle-mounted video relay unit, the vehicle-mounted video relay unit converts the analog video data into digital video data and transmits the digital video data to the video processing device. Hence, the video processing device is not required to be equipped with connection terminals for receiving analog video data or an AD converter, whereby the video processing device can be reduced in size.

Hence, the wiring between the image pickup device and the plurality of video processing devices can be simplified, and the total length of the cables can be reduced. Furthermore, the video processing device can be formed of a small video processing device not equipped with connection terminals for receiving analog video data or an AD conversion section.

According to the 13th aspect, the first image pickup device is connected to the first video processing device via the branching unit. The branching unit AD-converts the analog video data obtained by picking up with the first image pickup device into digital video data using the A/D conversion section and distributes the AD-converted digital video data to the first video processing device. In addition, the branching unit is connected to the vehicle-mounted video relay unit, and the digital video data is also distributed to the vehicle-mounted video relay unit.

The second image pickup device is connected to the vehicle-mounted video relay unit. The vehicle-mounted video relay unit AD-converts the analog video data obtained by picking up with the second image pickup device into digital video data using the A/D conversion section. Then, the vehicle-mounted video relay unit relays the AD-converted video data of the first image pickup device and the second image pickup device selectively or in a multiplexed state to the second video processing device.

Hence, with this configuration, in comparison with a case in which the first image pickup device is connected one-to-two to the first and second video processing devices and the second image pickup device is connected one-to-one to the second video processing device, it is possible to prevent the upsizing of the video processing devices due to the increase in the number of interfaces. Furthermore, the cables can be prevented from becoming complicated and bulky.

Hence, even if the number of image pickup devices to be connected to the video processing device increases, the number of interfaces does not increase and the video processing device is not increased in size. In addition, the communication line does not become complicated or bulky.

Furthermore, each video processing device is not required to be equipped with connection terminals for receiving analog video data or an AD converter, whereby the video processing device can be reduced in size.

Hence, the wiring between the plurality of image pickup devices and the plurality of video processing devices can be simplified, and the total length of the cables can be reduced. Furthermore, the video processing device can be formed of a small video processing device not equipped with connection terminals for receiving analog video data or an AD conversion section.

According to the 14th aspect, the plurality of image pickup devices mounted on the vehicle are connected to the input sections of the signal switching device via the plurality of transmission lines, the processing device is connected to the output section of the signal switching device via the transmission line, and video signals are transmitted from the image pickup devices to the processing device via the signal switching device. The signal switching device switches a plurality of video signals input from the plurality of image pickup devices and outputs the video signals to the processing device. Although it is necessary to provide transmission lines as many as the number of the image pickup devices mounted on the vehicle between the image pickup devices and the signal switching device, only one (or a few) transmission line should only be provided between the signal switching device and the processing device. Hence, the amount of the transmission lines inside the vehicle can be reduced by disposing the signal switching device close to the image pickup devices. In addition, since the processing device is not required to be provided with numerous connection terminals for connecting the transmission lines, the processing device can be reduced in size.

Furthermore, the signal switching device can be used as a drive recorder by providing the recording section for recording video pictures relating to the video signals input from the image pickup devices in the signal switching device. Since the video signals are input from the plurality of image pickup devices to the signal switching device, a plurality of video pictures can be recorded efficiently.

Hence, the processing device can be reduced in size and cost, and a vehicle-mounted image pickup system equipped with more image pickup devices can be mounted on the vehicle easily at low cost. Moreover, after an accident to the vehicle, the cause of the accident can be investigated on the basis of more video pictures. Consequently, it is possible to provide a vehicle-mounted image pickup system having the function of a drive recorder and high convenience at a low price.

According to the 15th aspect, the vehicle information, such as the acceleration, speed or brake operation state of a vehicle, is obtained, a trigger signal is generated on the basis of the vehicle information, and the recording section of the signal switching device records video pictures depending on the trigger signal. The vehicle-mounted image pickup system may be configured so that the signal switching device obtains the vehicle information and generates the trigger signal or may be configured so that the processing device, the image pickup devices or other devices supply the trigger signal to the signal switching device. Hence, according to the vehicle information, a judgment is made as to whether an accident occurred, and video pictures can be recorded during a predetermined period before and after the accident. For example, video pictures can be recorded using a method in which the recording section sequentially stores the video pictures input thereto in a buffer or the like and the stored video pictures are saved in a non-volatile memory after a predetermined period from the generation of the trigger signal. Video pictures can also be recorded using a method in which the input video pictures are overwritten repeatedly in a non-volatile memory and sequentially recorded, and an overwriting disabling flag is set in the video pictures recorded during a predetermined time before and after the generation of the trigger signal. Other methods may also be used for the recording.

Hence, since, after a judgment is made as to whether an accident occurred, video pictures can be recorded for the predetermined period before and after the accident, the cause of the accident can be investigated by examining the video pictures recorded in the signal switching device. Since a vehicle-mounted image pickup system equipped with numerous image pickup devices can be used as a drive recorder, the cause of an accident can be investigated in greater detail.

According to the 16th aspect, the signal switching device is equipped with means for reducing the data amounts of video pictures input from the image pickup devices, and video pictures, the data amounts of which are reduced, are recorded in the recording section. For example, when video pictures are displayed on a display inside a vehicle, it is preferable that video pictures having high frame rates are displayed, whereby the image pickup device outputs video pictures having high frame rates. However, when video pictures are recorded by using the system as a drive recorder, video pictures having high frame rates are not always necessary. In addition, a memory, a hard disk drive or the like having a large capacity is required to record video pictures input from the plurality of image pickup devices. Hence, with a method in which the frame rates of video pictures are lowered to reduce the amounts of data thereof, and the video pictures, the data amounts of which are reduced, are recorded, video picture recording can be done while a memory, a hard disk drive or the like is used efficiently.

Hence, the capacity of the memory, hard disk drive or the like to be mounted in the signal switching device can be reduced, and the cost of the signal switching device can also be reduced, whereby it is possible to provide a vehicle-mounted image pickup system having the function of a drive recorder.

According to the 17th aspect, the signal switching device receives the control signals from the processing device, etc. and reads the video pictures recorded in the recording section. The video pictures read by the signal switching device are transmitted to the processing device, and the processing device can display the video pictures on a display. Hence, the video pictures recorded in the signal switching device can be displayed easily, and the video pictures recorded by using the system as a drive recorder can be displayed easily, whereby the convenience of the vehicle-mounted image pickup system can be improved.

According to the 18th aspect, since the vehicle-mounted image pickup system is configured so that the plurality of image pickup devices and the processing device are connected via the signal switching device, it is necessary to perform control to determine which of the plurality of video signals input to the signal switching device should be output. Although this control can be performed using the signal switching device or the image pickup device, the control is performed simply and securely using the processing device. In the configuration in which the processing device performs the control, it becomes necessary to supply the control signal for the control from the processing device to the signal switching device. When a transmission line is provided for the control signal, there occurs a problem in which the number of transmission lines laid out in a vehicle increases.

To solve this problem, the transmission line for the video signal, provided between the signal switching device and the processing device, is used. In this case, for example, the transmission of the video signal is stopped temporarily, and the control signal is supplied from the processing device to the signal switching device. Furthermore, when the video pictures recorded in the signal switching device are read and displayed as described above, a control signal relating to the reading from a video display device to the signal switching device is required to be transmitted. In this case, the control signal is also transmitted using the transmission line. Hence, the processing device can control the operation of the signal switching device without increasing the number of the transmission lines between the signal switching device and the processing device.

Therefore, the processing device can control the signal switching device without providing a transmission line for the control signal between the signal switching device and the processing device. Consequently, by providing the signal switching device, the number of the transmission lines laid out in a vehicle can be prevented from increasing, and the cost of the vehicle-mounted image pickup system can be prevented from rising.

According to the 19th aspect, when the vehicle-mounted image pickup system is configured so that the processing device supplies the control signal to the signal switching device because of the above-mentioned reason, the control signal is transmitted and received by power line communication by using the power line for connecting the power supplying means, such as a battery (and a voltage conversion circuit for converting the voltage value of the power supplied from the battery and outputting the obtained power) mounted on a vehicle, to the processing device and the signal switching device. Since the power line is essential to supply power to the processing device and the signal switching device and is provided conventionally, the processing device can control the operation of the signal switching device without increasing the number of the transmission lines between the signal switching device and the processing device.

Therefore, the processing device can control the signal switching device without providing a transmission line for the control signal between the signal switching device and the processing device. Consequently, by providing the signal switching device, the number of the transmission lines laid out in a vehicle can be prevented from increasing, and the cost of the vehicle-mounted image pickup system can be prevented from rising.

According to the 20th aspect, the image pickup device mounted on the vehicle is connected to the input section of the signal distributor, and the plurality of processing devices are connected to the plurality of output sections of the signal distributor, and the video signal from the image pickup device is distributed to the plurality of processing devices by the signal distributor. When the video picture picked up by one image pickup device is processed by the plurality of processing devices, one processing device connected to the one image pickup device relays the video signal to other processing devices in a conventional vehicle-mounted image pickup system. However, by the use of the signal distributor, the processing device is not required to be equipped with a function of distributing the video signal, and the number of the transmission lines connected to the processing devices can be reduced, whereby it is not necessary to provide numerous connection terminals. In comparison with a configuration in which one image pickup device is connected to a plurality of processing devices via the transmission lines respectively, the number of the transmission lines can be reduced.

Furthermore, the signal distributor can be used as a drive recorder by providing the recording section for recording a video picture relating to the video signal input from the image pickup device in the signal distributor. Since the video picture to be used in the plurality of processing devices is input to the signal distributor, useful video pictures can be recorded and examined after the occurrence of an accident.

Hence, the processing devices are not required to relay the video signal, and the number of connection terminals can be reduced, whereby the processing devices can be reduced in size and cost. Therefore, a vehicle-mounted image pickup system equipped with more processing devices can be mounted on a vehicle easily at low cost. Furthermore, since the signal distributor can be used as a drive recorder, it is possible to provide a vehicle-mounted image pickup system having the function of a drive recorder and high convenience at a low price.

According to the 21st aspect, the vehicle information, such as the acceleration, speed or brake operation state of a vehicle, is obtained, a trigger signal is generated on the basis of the vehicle information, and the recording section of the signal switching device records a video picture depending on the trigger signal. The vehicle-mounted image pickup system may be configured so that the signal distributor obtains the vehicle information and generates the trigger signal or may be configured so that the processing device, the image pickup device or other devices supply the trigger signal to the signal distributor. Hence, according to the vehicle information, a judgment is made as to whether an accident occurred, and video pictures can be recorded during a predetermined period before and after the accident. Hence, the cause of the accident can be investigated by examining the video pictures recorded in the signal distributor.

According to the 22nd aspect, the signal distributor is equipped with means for reducing the data amount of the video picture input from the image pickup device, and the video picture, the data amount of which is reduced, is recorded in the recording section. Hence, video picture recording can be done while a memory, a hard disk drive or the like is used efficiently.

Hence, the capacity of the memory, hard disk drive or the like to be mounted in the signal distributor can be reduced, and the cost of the signal distributor can also be reduced, whereby it is possible to provide a vehicle-mounted image pickup system having the function of a drive recorder.

According to the 23rd aspect, the video signal input from the image pickup device to the input section of the signal distributor is directly output to one of the output sections (in a manner that the video signal passes through), and the video signal amplified by the amplifier is output to the other output section. A configuration in which a transmission line is simply branched and connected to a plurality of processing devices and a video signal is directly supplied to the plurality of processing devices is simple and can be achieved at low cost. However, the output capability of the image pickup device for outputting the video signal is required to be raised. For this purpose, the video signal is amplified in the signal distributor and output to one processing device, whereby the video signal is supplied to the processing device without raising the output capability of the image pickup device and without degrading the video signal. Furthermore, with the configuration in which the video signal is directly output to the one of the output sections, the image pickup device and one of the processing devices, which is connected to the one output section, can be connected directly to each other via a transmission line without disposing an amplifier therebetween. Hence, control signals, etc. can be supplied from the one processing device to the image pickup device, that is, in a direction opposite to the transmission direction of the video signal.

Hence, even when the video signal is distributed to a plurality of processing devices, the video signal can be prevented from being degraded, and the control signals, etc. can be supplied from the one processing device to the image pickup device, that is, in a direction opposite to the transmission direction of the video signal, whereby the vehicle-mounted image pickup system equipped with this signal distributor can have high extensibility.

According to the present invention, the wiring between the plurality of image pickup devices and the plurality of video processing devices can be simplified, the total length of the cables can be reduced, and the respective devices can be reduced in size. In particular, in recent years, since vehicles are requested to be reduced in size and the interior spaces thereof are requested to be increased, the vehicle-mounted video communication system and the vehicle-mounted image pickup system according to the present invention are especially effective.

The above and further objects and features will more fully be apparent from the following detailed description with accompanying drawings.

DETAILED DESCRIPTION

The present invention will be described below specifically on the basis of the accompanying drawings showing embodiments thereof.

Embodiment 1

Figure 1:
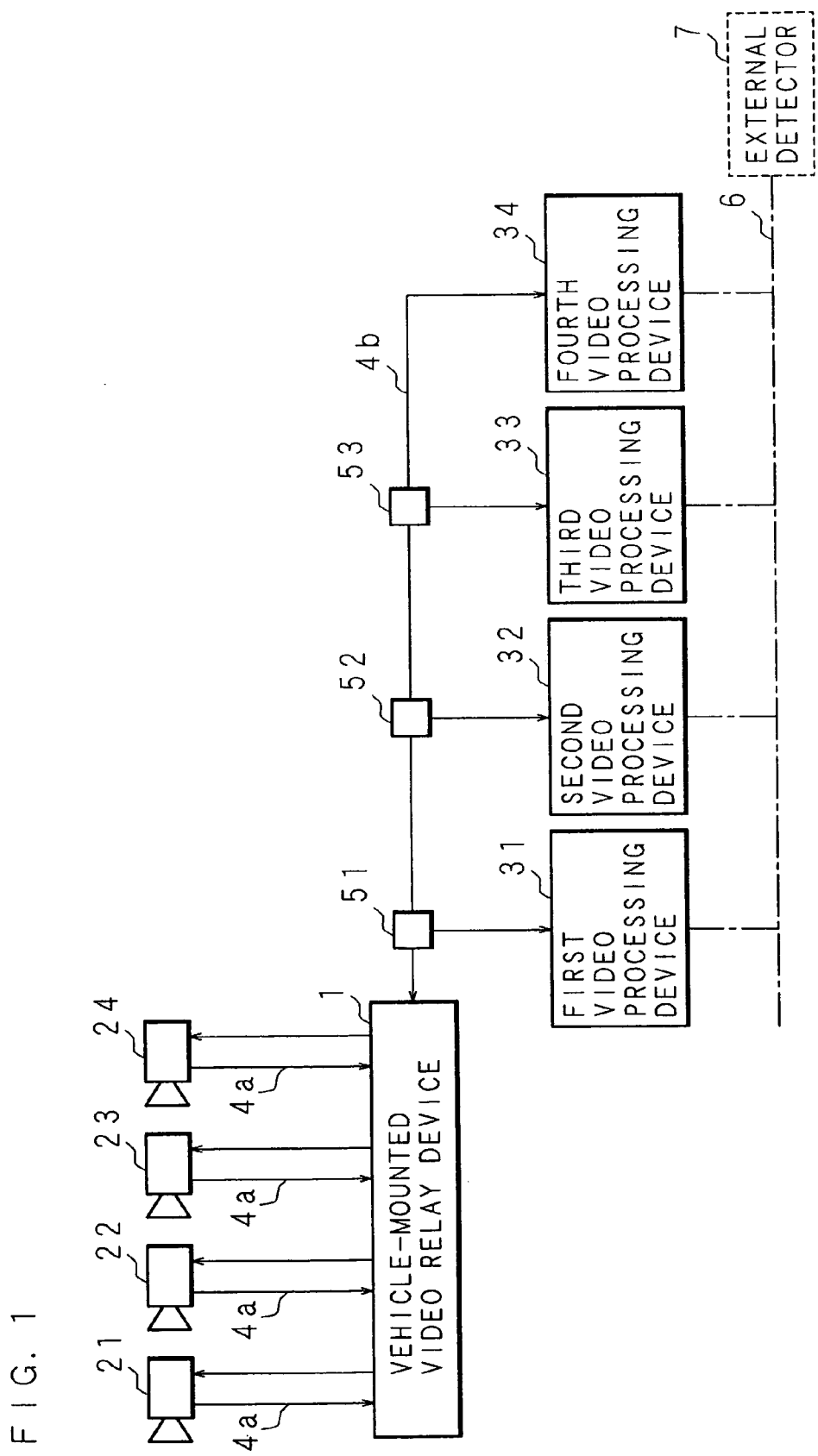
FIG. 1 is a block diagram showing a vehicle-mounted video communication system according to Embodiment 1 of the present invention.

FIG. 1 is a block diagram showing a vehicle-mounted video communication system according to Embodiment 1 of the present invention. The vehicle-mounted video communication system is equipped with first to fourth image pickup devices 21, 22, 23 and 24, first to fourth video processing devices 31, 32, 33 and 34, a vehicle-mounted video relay device 1, and branching units 51, 52 and 53 which are mounted on a vehicle.

The first to fourth image pickup devices 21, 22, 23 and 24 are respectively connected to the vehicle-mounted video relay device 1 via communication cables 4a (communication lines) suited for LVDS (Low-voltage Differential Signaling), for example, twisted-pair cables, such as STP (Shielded Twisted Pair) cables, and the fourth video processing device 34 is connected to the vehicle-mounted video relay device 1 via a communication cable 4b (communication line). The branching units 51, 52 and 53 are provided at appropriate positions of the communication cable 4b, and the first to third video processing devices 31, 32 and 33 are respectively connected to portions of the communication cable 4b branched using the branching units 51, 52 and 53.

The branching unit 51 is equipped with a high-impedance amplifier connected to conductors constituting the communication cable 4b and is configured so that the video data transmitted from the vehicle-mounted video relay device 1 is amplified by the amplifier and transmitted to the first video processing device 31. The other branching units 52 and 53 are also configured similarly. Furthermore, the first to fourth video processing devices 31, 32, 33 and 34 are connected to a communication line 6 (another communication line) configured in conformity with a protocol, such as LIN (Local Interconnect Network), CAN (Controller Area Network), MOST (Media Oriented Systems Transport) or IEEE (Institute of Electrical and Electronics Engineers) 1394, for example a vehicle-mounted LAN cable. Various external detectors (not shown), such as a speed sensor and an acceleration sensor for vehicles, are connected to the communication line 6.

The first image pickup device 21 is equipped with a lens, an image pickup element, a signal processing circuit, a transmitting circuit, etc. for picking up an image of the periphery of a vehicle, and installed at the front or rear section of the vehicle. Since the configurations of the second to fourth image pickup devices 22, 23 and 24 are similar to that of the first image pickup device 21, the configuration of the first image pickup device 21 will be described below.

The image pickup element is, for example, a CCD (Charge Coupled Device) for picking up an image using visible light, and converts an image formed using the lens into an analog electrical signal.

The signal processing circuit is equipped with a correlated double sampling circuit, an auto gain control circuit, an AD converter, a video processing microprocessor, etc. The signal processing circuit performs processing, such as noise reduction, gain adjustment and AD conversion, for the electrical signal converted using the image pickup element, and supplies the processed signal to the transmitting circuit. The video data has a header portion and data indicating the brightness values of pixels in a frame constituting a video picture. The header portion contains ID information, such as identification addresses, for identifying the first to fourth image pickup devices 21, 22, 23 and 24. The ID information is stored in a non-volatile memory (not shown), and the signal processing circuit is configured so that the ID information stored in the non-volatile memory is added to the header portion of the video data.

The transmitting circuit is equipped with communication functions, i.e., transceiver and controller functions, and transmits the video data in a predetermined communication format, such as the LVDS format. More specifically, the video data is converted into a differential signal having an amplitude of several hundred mV and transmitted. The transmitting circuit is equipped with connection terminals for connection to the vehicle-mounted video relay device 1 via the communication cable 4a, and transmits the converted video data to the vehicle-mounted video relay device 1 via the connection terminal and the communication cable 4a. The transmission speed is several hundred Mbits/s.

Although a case in which a video picture of the periphery of a vehicle is picked up using a visible light has been described above, the vehicle-mounted video communication system may be configured to pick up a video picture using infrared light, far-infrared light, etc. Furthermore, the system may also be configured to pick up a video picture of an interior of the vehicle.

Figure 2:
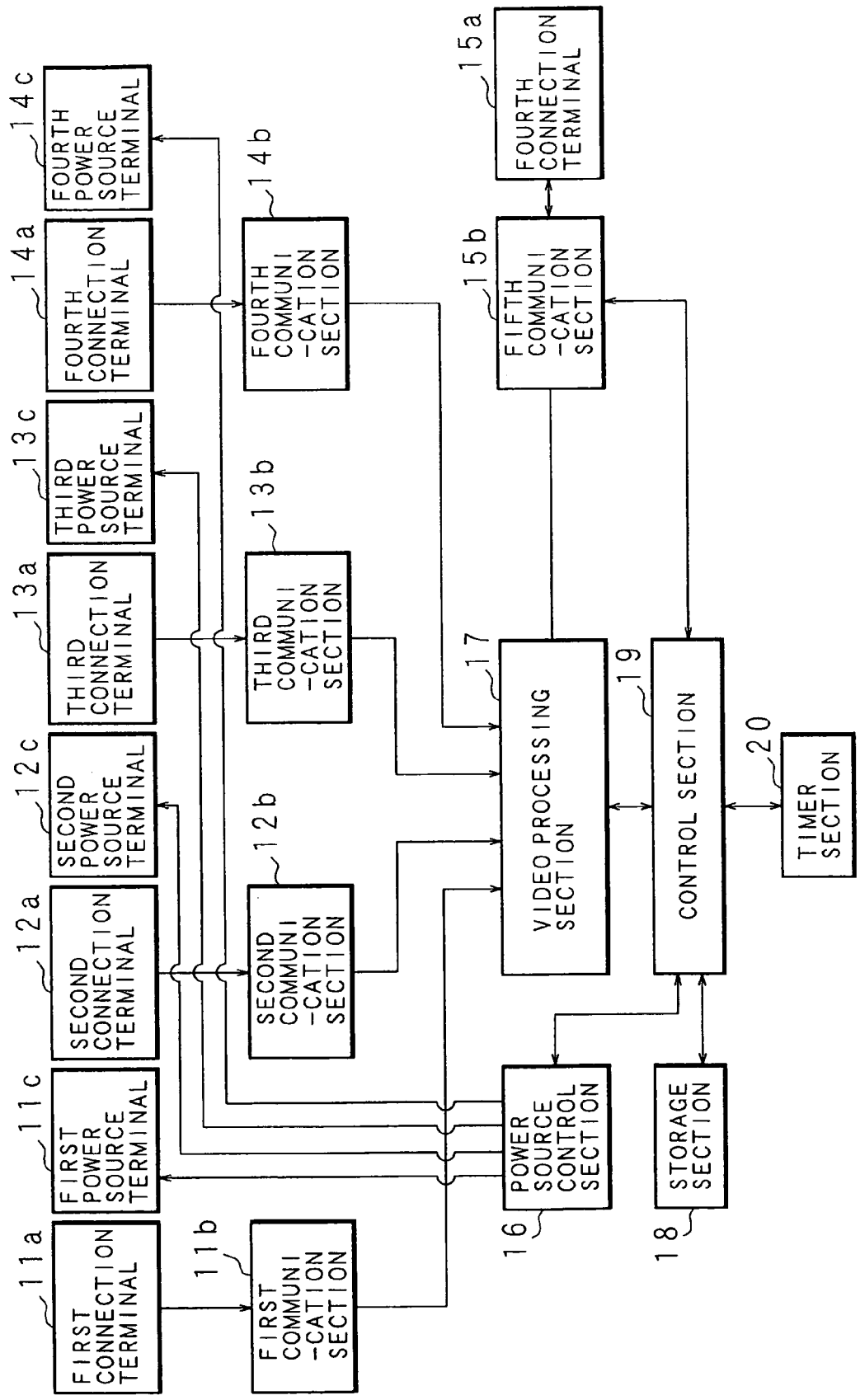
FIG. 2 is a block diagram showing the internal configuration of a vehicle-mounted video relay device according to Embodiment 1 of the present invention.

FIG. 2 is a block diagram showing the internal configuration of the vehicle-mounted video relay device 1 according to Embodiment 1 of the present invention. The vehicle-mounted video relay device 1 is equipped with a control section 19 for controlling the operation of each constituent component, a video processing section 17, first to fifth connection terminals 11a, 12a, 13a, 14a and 15a, and first to fifth communication sections 11b, 12b, 13b, 14b and 15b.

The control section 19 is a microcomputer equipped with a CPU, for example, and the CPU is equipped with a ROM, a RAM, input/output sections, etc., these being connected via a bus. The ROM stores computer programs for executing control operations. The computer programs are loaded into the RAM and executed to control the various operations of the vehicle-mounted video relay device 1.

Furthermore, a power source control section 16 is connected to the control section 19. The power source control section 16 is equipped with a multi-output switching power source unit and the like, and performs control for power supply to the first to fourth image pickup devices 21, 22, 23 and 24 and for the shutoff of the power supply thereto depending on the control signal from the control section 19.

Moreover, a storage section 18 and a timer section 20 are connected to the control section 19. The storage section 18 is formed of a non-volatile semiconductor memory, for example, stores data, such as differences in the first to fourth image pickup devices 21, 22, 23 and 24 being capable of transmitting video data at least required for the operations of the first to fourth video processing devices 31, 32, 33 and 34, and resolutions, frame rates, etc. of respective video data.

The first connection terminal 11a is a connection section for connecting the first image pickup device 21 to the vehicle-mounted video relay device 1 via the communication cable 4a. In addition, the first communication section 11b is connected to the first connection terminal 11a, whereby the system is configured so that the video data transmitted from the first image pickup device 21 is input to the first communication section 11b via the first connection terminal 11a.

In a similar way, the second to fourth image pickup devices 22, 23 and 24 are connected to the second to fourth connection terminals 12a, 13a and 14a via the communication cables 4a, respectively, and the system is configured so that the video data transmitted from the second to fourth image pickup devices 22, 23 and 24 is input to the second to fourth communication sections 12b, 13b and 14b, respectively.

The first to fourth communication sections 11b, 12b, 13b and 14b convert the video data having been converted in conformity with the LVDS format into data having logical levels, and supply the converted video data to the video processing section 17.

The video processing section 17 is equipped with a resolution converting function for converting the resolutions of the video data transmitted from the first to fourth image pickup devices 21, 22, 23 and 24, a thinning function for converting the frame rates of the video data, a multiplexing function for time-division multiplexing a plurality of items of video data, a switching function for selecting one item of video data and transmitting the selected video data to the first to fourth video processing devices 31, 32, 33 and 34, etc. The video processing section 17 operates under the control of the control section 19 and supplies the selected video data or the multiplexed video data to the fifth communication section 15b.

The fifth communication section 15b converts the video data supplied from the video processing section 17 into data conforming to the LVDS format. The fifth connection terminal 15a is connected to the fifth communication section 15b. The fifth connection terminal 15a is a connection section for connecting the vehicle-mounted video relay device 1 to the first to fourth video processing devices 31, 32, 33 and 34 via the communication cable 4b. The fifth communication section 15b transmits video data to the first to fourth video processing devices 31, 32, 33 and 34 via the fifth connection terminal 15a and the communication cable 4b.

Furthermore, the fifth communication section 15b is connected to the control section 19, and configured to receive and convert various data transmitted from the video processing section 17 into data having logical levels and to supply the converted data to the control section 19.

Figure 3:
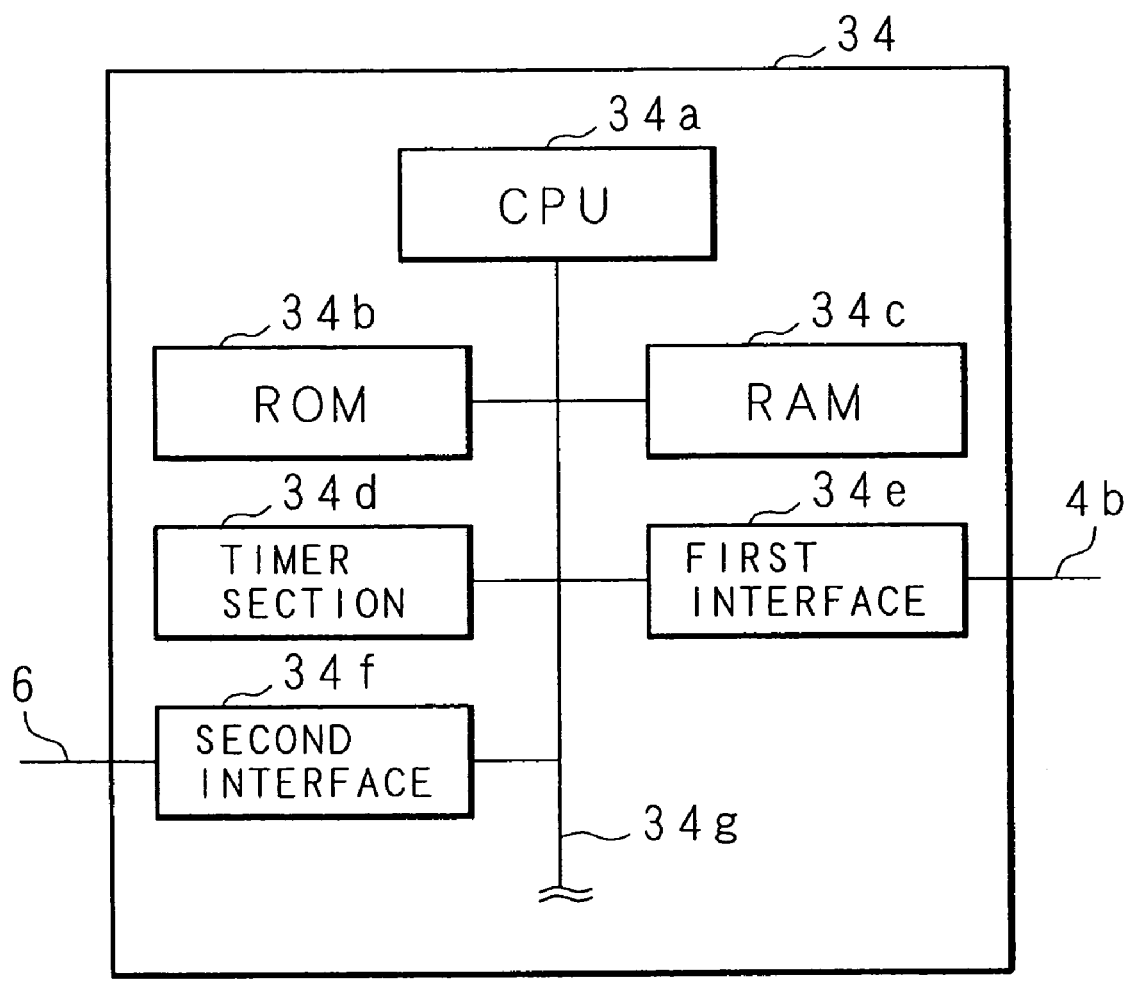
FIG. 3 is a block diagram showing the configuration of a fourth video processing device.

FIG. 3 is a block diagram showing the configuration of the fourth video processing device 34. The fourth video processing device 34 is a microcomputer equipped with a CPU 34a.

The CPU 34a is equipped with a ROM 34b, a RAM 34c, a timer section 34d, a first interface 34e and a second interface 34f, these being connected via a bus 34g.

The first interface 34e is connected to the communication cable 4b, and configured to receive and convert the video data transmitted from the vehicle-mounted video relay device 1 into data having logical levels. The video data converted into data having logical levels is stored temporarily in the RAM 34c and processed by the CPU 34a.

The second interface 34f is connected to a communication cable 6, and the first to fourth video processing devices 31, 32, 33 and 34 can transmit and receive various data via the communication line 6.

The ROM 34b stores computer programs for performing various processing regarding video data and for supporting operations. The CPU 34a loads the computer programs into the RAM 34c and executes the computer programs to perform the above-mentioned processing. For example, when the system detects a pedestrian who may have a risk of colliding with the vehicle, the system issues a warning. The configurations of the first to third video processing devices 31, 32 and 33 are similar to that of the fourth video processing device 34.

Figure 4:
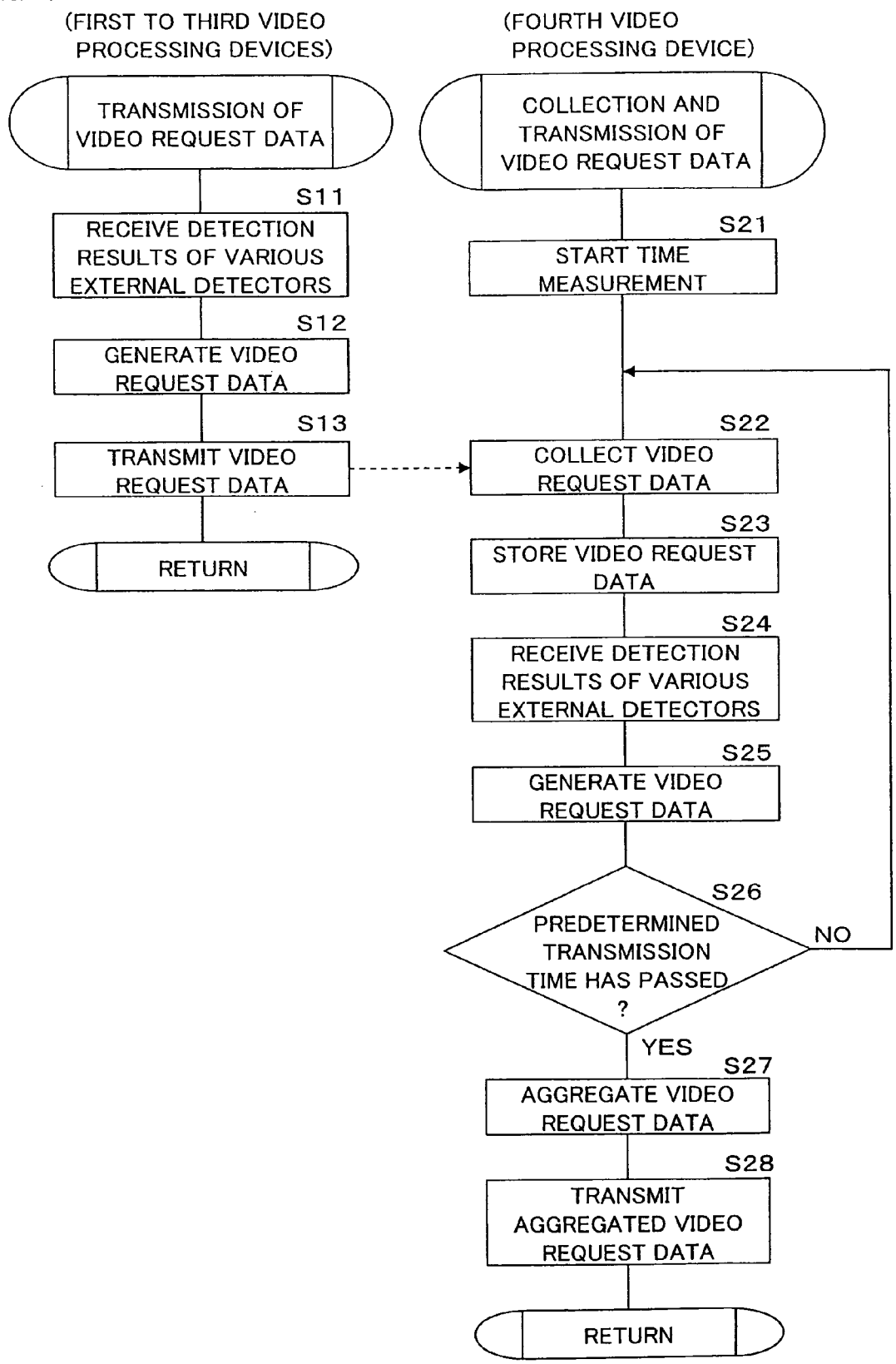
FIG. 4 is a flowchart showing the processing procedure of a CPU with respect to the collection and transmission of video request data.

FIG. 4 is a flowchart showing the processing procedure of the CPU with respect to the collection and transmission of video request data.

First, the operations of the first to third video processing devices 31, 32 and 33 will be described below. Since the operations of the first to third video processing devices 31, 32 and 33 are similar to one another, the operation of the first video processing device 31 will be described below.

The CPU of the first video processing device 31 receives the detection results of various external detectors 7 via the communication line 6 (at step S11), and generates video request data depending on the received detection results (at step S12). The video request data contains data indicating video data required by the first video processing device 31, data indicating the resolutions and frame rates of the video data, etc, depending a the detection results. Next, the CPU transmits the generated video request data to the fourth video processing device 34 via the communication line 6 (at step S13), thereby completing the processing. The above-mentioned processing is executed periodically.

The second and third video processing devices operate similarly, and transmit the video request data to the fourth video processing device 34 via the communication line 6.

On the other hand, the CPU 34a of the fourth video processing device 34 first resets the timer section 34d, and the timer section 34d starts time measurement (at step S21). Next, the CPU 34a collects the video request data transmitted from the first to third video processing devices 31, 32 and 33 (at step S22), and stores the collected video request data (at step S23).

Next, the CPU 34a receives the detection results transmitted from the various external detectors via the communication line 6 (at step S24), and generates the video request data of the fourth video processing device 34 (at step S25). Then, the CPU 34a judges as to whether a predetermined transmission time has passed after the time measurement was started at step S21 (at step S26).

When it is judged that the predetermined transmission time has not passed (NO at step S26), the CPU 34a returns the processing to step S22. When it is judged that the predetermined transmission time has passed (YES at step S26), the CPU 34a aggregates the plurality of items of the video request data stored at step S23 and the video request data generated at step S25 (at step S27). Next, the CPU 34a transmits the aggregated video request data to the vehicle-mounted video relay device 1 via the communication cable 4b (at step S28), thereby completing the processing.

Figure 5:
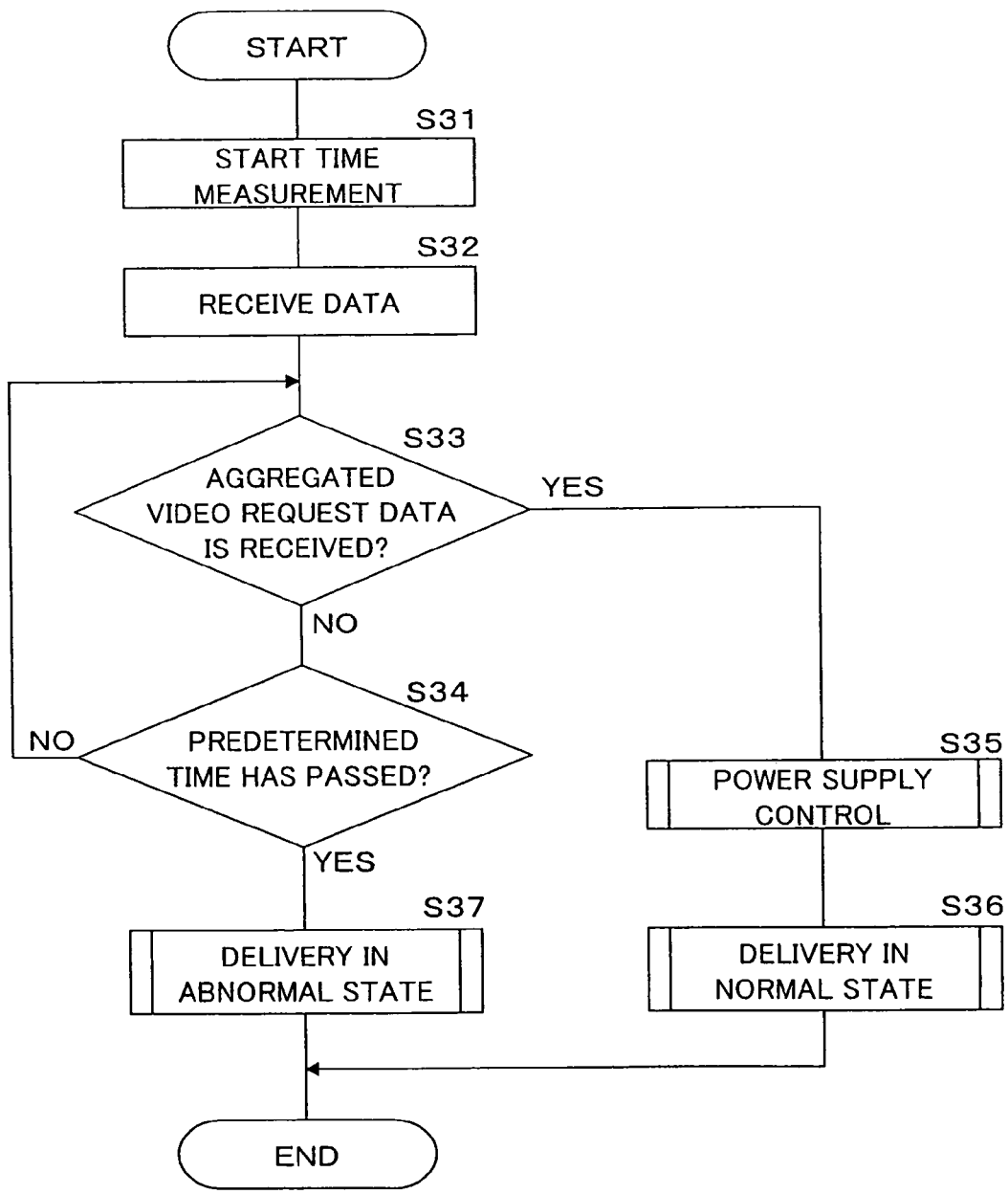
FIG. 5 is a flowchart showing the processing procedure of a control section with respect to the delivery of video data.

FIG. 5 is a flowchart showing the processing procedure of the control section 19 with respect to the delivery of the video data. First, the control section 19 resets the timer section 20, and the timer section 20 starts time measurement (at step S31), and the fifth communication section 15b receives the data (at step S32).

Next, the control section 19 judges as to whether the video request data transmitted from the fourth video processing device 34 has been received (at step S33). When it is judged that the video request data has been received (YES at step S33), the control section 19 executes a subroutine for power supply control and controls power supply to the first to fourth image pickup devices 21, 22, 23 and 24 (at step S35). Next, the control section 19 executes a subroutine for the delivery of the video data in a normal state (at step S36), thereby completing the processing with respect to the delivery.

When it is judged that the video request data has not been received (NO at step S33), the control section 19 judges as to whether a predetermined time has passed after the time measurement was started at step S31 (at step S34). When it is judged that the predetermined time has not passed (NO at step S34), the control section 19 returns the processing to step S33. When it is judged that the predetermined time has passed (YES at step S34), the control section 19 calls a subroutine for the delivery in an abnormal state and executes the processing with respect to the delivery of the video data (at step S37), thereby completing the processing with respect to the delivery.

Figure 6:
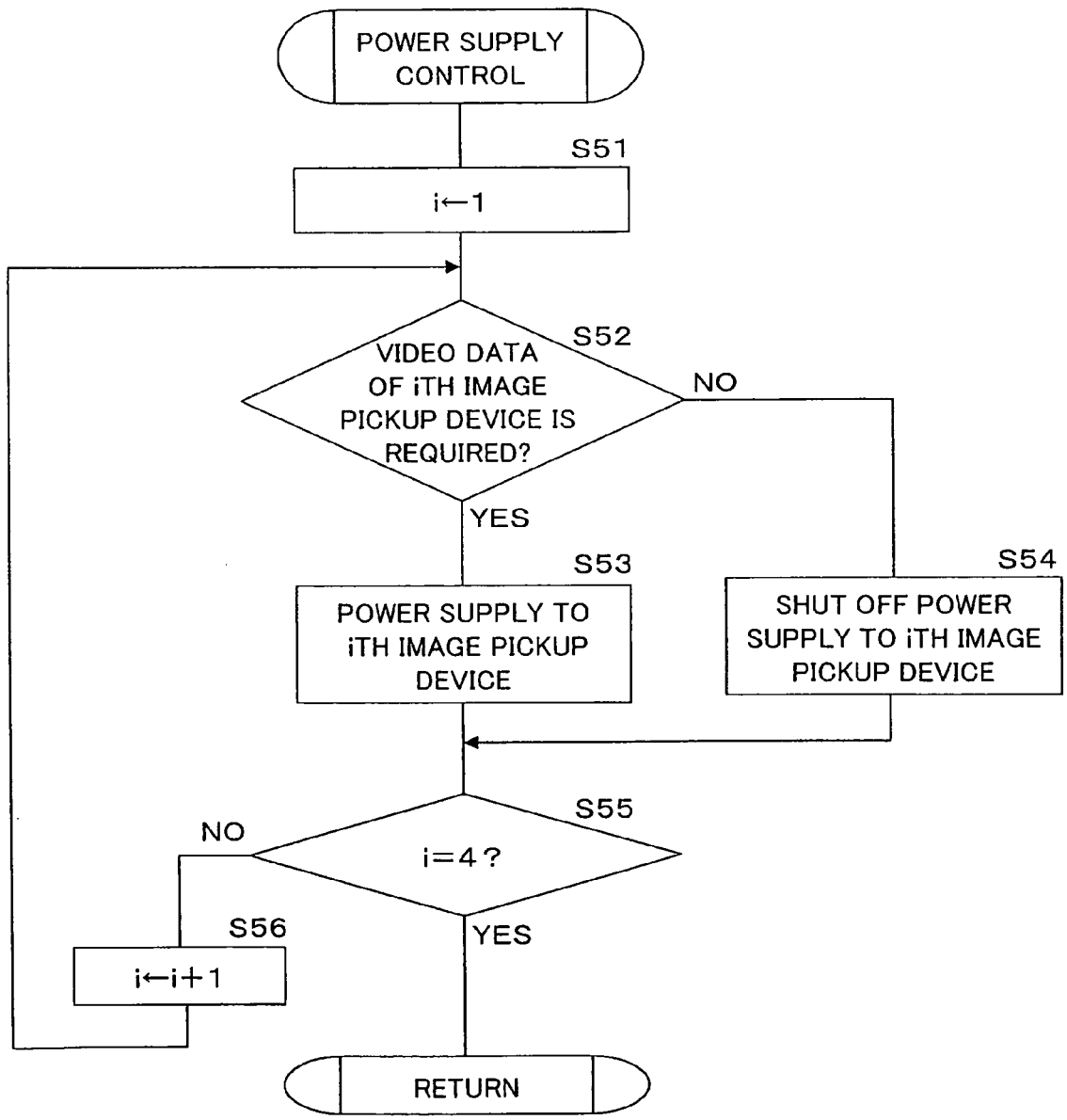
FIG. 6 is a flowchart showing the processing procedure of the control section with respect to power supply control.

FIG. 6 is a flowchart showing the processing procedure of the control section 19 with respect to power supply control. When a subroutine for power supply control is called, the control section 19 sets 1 to variable i indicating one of the first to fourth image pickup devices 21, 22, 23 and 24 (at step S51). Next, the control section 19 judges, on the basis of the video request data, as to whether the video data of the ith image pickup device is requested (at step S52). When it is judged that the video data of the ith image pickup device is requested (YES at step S52), the control section 19 supplies power to the ith image pickup device (at step S53). When it is judged that the video data of the ith image pickup device is not requested (NO at step S52), the control section 19 shuts off the power supply to the ith image pickup device (at step S54).

When the process at step S53 or step S54 is completed, the control section 19 judges as to whether the variable i is 4 (at step S55). When it is judged that i is not 4 (NO at step S55), the control section 19 adds 1 to the variable i (at step S56) and returns the processing to step S52. When it is judged that i is 4 (YES at step S55), the control section 19 completes the processing of the subroutine for power supply control.

Figure 7:
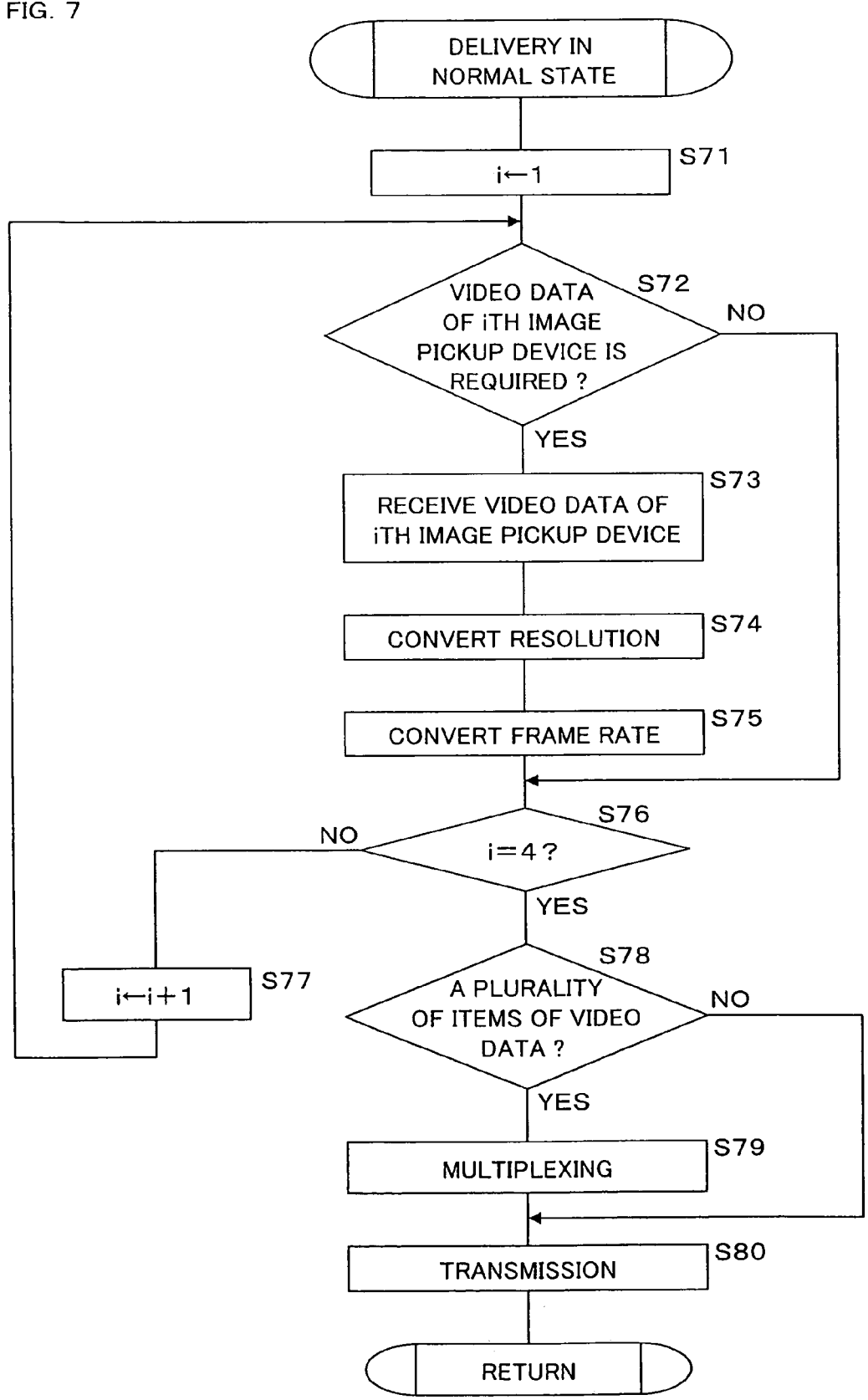
FIG. 7 is a flowchart showing the processing procedure of the control section with respect to the delivery of video data in a normal state.

FIG. 7 is a flowchart showing the processing procedure of the control section 19 with respect to the delivery of video data in a normal state. When a subroutine for the delivery control in the normal state is called, the control section 19 sets 1 to the variable i indicating one of the first to fourth image pickup devices 21, 22, 23 and 24 (at step S71). Next, the control section 19 judges, on the basis of the video request data, as to whether the video data of the ith image pickup device is requested (at step S72). When it is judged that the video data of the ith image pickup device is requested (YES at step S72), the control section 19 receives the video data transmitted from the ith image pickup device (at step S73). Next, the control section 19 converts the resolution of the video data on the basis of the video request data (at step S74) and then converts the frame rate thereof (at step S75).

When the process at step S75 is completed or when it is judged that the video data of the ith image pickup device is not requested (NO at step S72), the control section 19 judges as to whether the variable i is 4 (at step S76). When it is judged that i is not 4 (NO at step S76), the control section 19 adds 1 to the variable i (at step S77) and returns the processing to step S72. When it is judged that i is 4 (YES at step S76), the control section 19 judges as to whether a plurality of items of video data are requested (at step S78).

When it is judged that a plurality of items of video data are requested (YES at step S78), the control section 19 multiplexes the plurality of items of video data received at step S73 (at step S79). For example, time-division multiplexing is performed. When the process at step S79 is completed and when it is judged that a plurality of items of video data are not requested (NO at step S78), the control section 19 transmits the multiplexed video data or the one item of video data selected at step S72 to the first to fourth video processing devices 31, 32, 33 and 34 (at step S80), thereby completing the processing with respect to the delivery of video data in the normal state.

Since ID information for identifying which video data corresponds to which image pickup device, that is, one of the first to fourth image pickup devices 21, 22, 23 and 24, is added to each item of video data, the first to fourth video processing devices 31, 32, 33 and 34 can selectively receive the video data required for the respective processors on the basis of the ID information.

Figure 8:
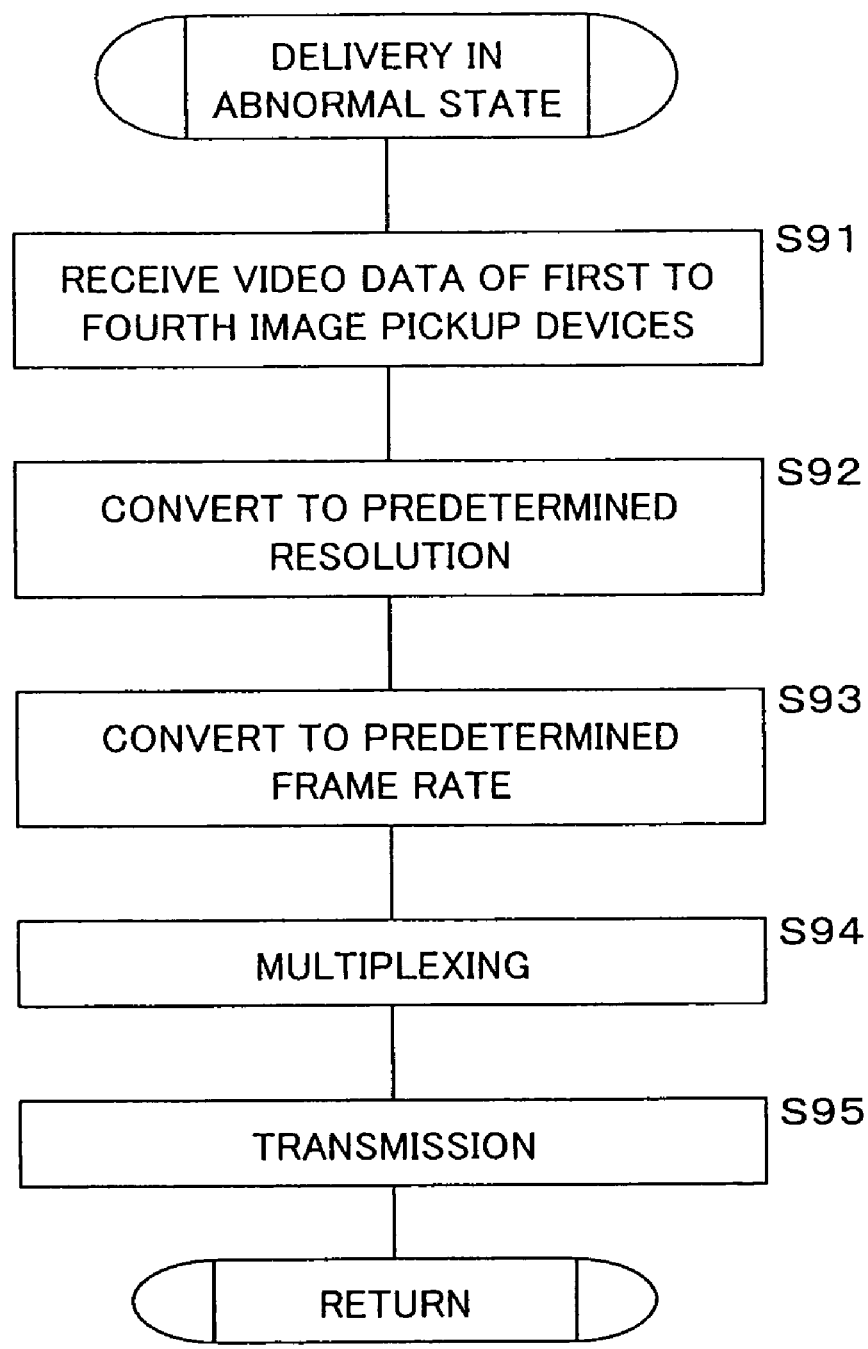
FIG. 8 is a flowchart showing the processing procedure of the control section with respect to the delivery of video data in the abnormal state.

FIG. 8 is a flowchart showing the processing procedure of the control section 19 with respect to the delivery of video data in the abnormal state. When a subroutine for the delivery of video data in the abnormal state is called, the control section 19 receives the video data transmitted from the first to fourth image pickup devices 21, 22, 23 and 24 (at step S91). Next, the control section 19 converts the resolution of each item of video data received into a predetermined resolution stored in the storage section 18 (at step S92) and converts the frame rate thereof into a predetermined frame rate (at step S93).

Then, the control section 19 multiplexes the respective items of video data (at step S94) and transmits the multiplexed video data to the first to fourth video processing devices 31, 32, 33 and 34 (at step S95), thereby completing the processing with respect to the delivery of video data.

Since the vehicle-mounted video communication system configured as described above is equipped with the vehicle-mounted video relay device 1 and the branching units 51, 52 and 53, the wiring between the plurality of image pickup devices, i.e., the first to fourth image pickup devices 21, 22, 23 and 24, and the plurality of video processing devices, i.e., the first to fourth video processing devices 31, 32, 33 and 34, can be simplified. As a result, the total cable length of the communication cables 4a and 4b can be reduced, and the devices can also be reduced in size.

In addition, since the vehicle-mounted video communication system is configured so that the video request data is transmitted and received mainly via the communication cable 4b for the video data, the amount of data to be transmitted from the first to fourth video processing devices 31, 32, 33 and 34 to the vehicle-mounted video relay device 1 via the communication cable 4b can be reduced, and the transmission band of the communication cable 4b for the video data can be extended.

Furthermore, since the communication line 6 is not required to be connected to the vehicle-mounted video relay device 1, the vehicle-mounted video relay device 1 can be reduced in size.

Moreover, when the video data of the first to fourth image pickup devices 21, 22, 23 and 24 is not requested, the power supply thereto is shut off, whereby wasteful power consumption in the first to fourth image pickup devices 21, 22, 23 and 24 can be reduced.

Besides, even if the fourth video processing device 34 for collecting and transmitting the video request data becomes faulty, the minimum amount of video data having a predetermined resolution and a predetermined frame rate can be transmitted to the first to fourth video processing devices 31, 32, 33 and 34.

Still further, the vehicle-mounted video relay device 1 can transmit the video data to the first to fourth video processing devices 31, 32, 33 and 34 at the resolution and frame rate conforming to the request of the first to fourth video processing devices 31, 32, 33 and 34.

Although the first to fourth video processing devices are connected via the communication line, when the system is equipped with a video processing device that operates using predetermined video data, the system may be configured so that no communication line is connected to the video processing devices and no video request data is transmitted thereto.

In addition, the communication cables and the communication lines for connecting the first to fourth image pickup devices, the vehicle-mounted video relay device and the first to fourth video processing devices are given as examples. Other cables, cords, conductors, optical fibers, power lines, etc. may also be used, provided that they can transmit and receive the video data and the video request data.

Furthermore, the number of the image pickup devices and the number of the video processing devices are given as examples. The system may be configured so that a plurality of video processing devices are connected to one image pickup device. Besides, the system may also be configured so that a plurality of image pickup devices are connected to one video processing device. Moreover, the system may also be configured so that two or more image pickup devices are connected to two or more video processing devices.

Still further, although a device for performing processing, such as the detection of a pedestrian, is given as an example of the video processing device, other devices may also be used, provided that the devices perform processing using video data, such as making various judgments, displaying video pictures and outputting video pictures to the outside using video data.

In addition, although the system is configured so that the video request data is transmitted from the video processing devices to the vehicle-mounted video relay device via the communication cable, the system may also be configured so that the video request data is transmitted via vehicle-mounted LAN cables, power lines or other communication lines.

When power line transmission using power lines is adopted, the wiring can be simplified, and the devices can be reduced in size, thereby being suited for the present invention.

Furthermore, although the system is configured so that the vehicle-mounted video relay device supplies power and shuts off the power supply, the system may be configured to supply power by connecting the image pickup devices to a power source device and by transmitting a control signal to the power source device or the image pickup devices.

Moreover, although the system is configured so that the resolution and frame rate of the video data are converted into a low resolution and a low frame rate as necessary, when it is possible to transmit a sufficient amount of data, the system may be configured so that the resolution and the frame rate are not converted.

Embodiment 2

The vehicle-mounted video communication system according to Embodiment 2 has a configuration similar to that of the vehicle-mounted video communication system according to Embodiment 1. The first to third video processing devices 31, 32 and 33 according to Embodiment 2 are not connected via the communication line 6, but only a fourth video processing device 234 is connected to the communication line 6. The configuration of the fourth video processing device 234 is different from that according to Embodiment 1 in that the video data required for the first to third video processing devices 31, 32 and 33 other than the fourth video processing device is specified on the basis of the detection results of the various external detectors so that the delivery of the video data can be requested. Since the processing procedure of the fourth video processing device 234 is mainly different from that according to Embodiment 1, the abovementioned difference will be described below.

Figure 9:
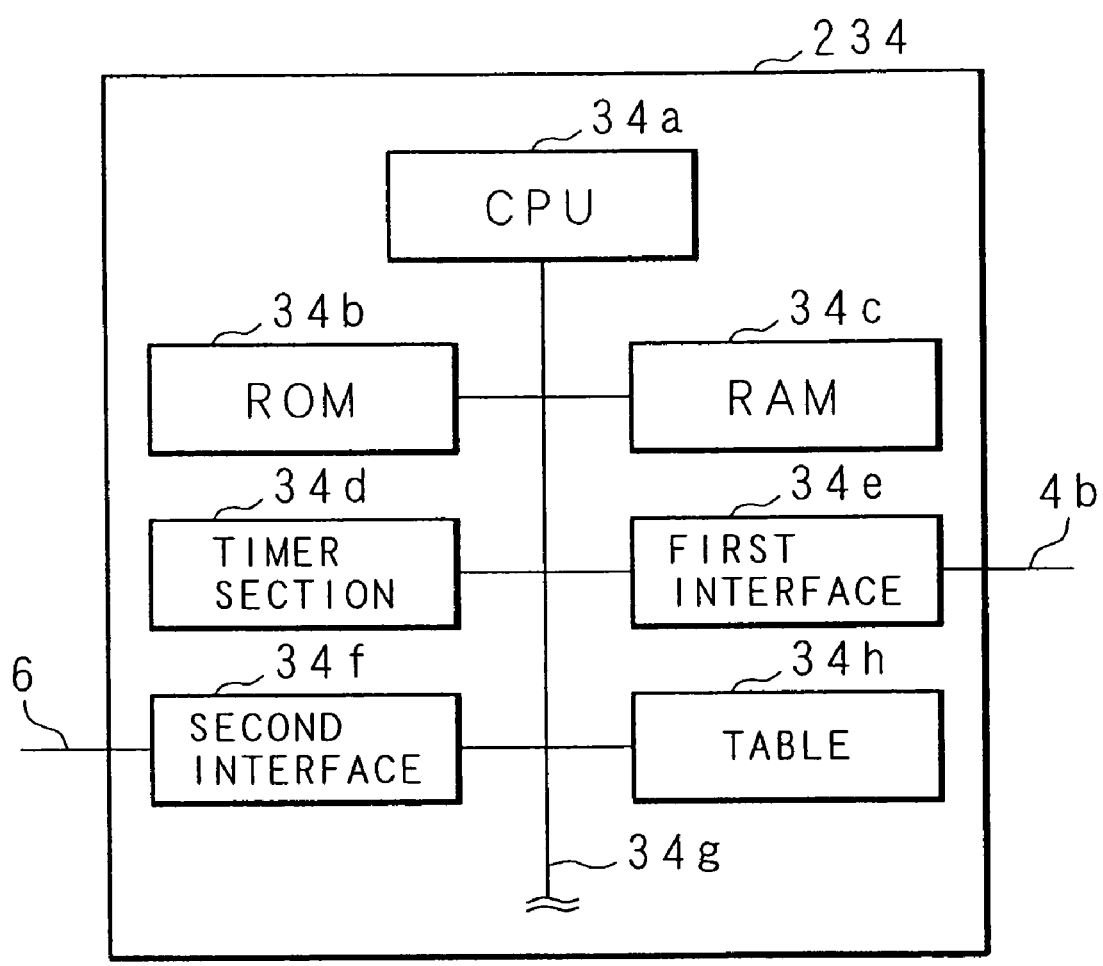
FIG. 9 is a block diagram showing the configuration of a fourth video processing device according to Embodiment 2.

FIG. 9 is a block diagram showing the configuration of the fourth video processing device 234 according to Embodiment 2. The fourth video processing device 234 is equipped with the CPU 34a, the ROM 34b, the RAM 34c, the timer section 34d, the first interface 34e, the second interface 34f and the bus 34g similar to those of the video processing device according to Embodiment 1. Furthermore, the fourth video processing device 234 according to Embodiment 2 is equipped with a table 34h for requesting video data associated with the detection results of various external detectors. The table 34h contains information in which the detection results are associated with the kinds of video data required for the first to fourth video processing devices 31, 32, 33 and 234, that is, the image pickup devices capable of picking up a video picture to obtain the video data, and the resolutions and frame rates of the video data. The data format of the information does not matter.

Figure 10:
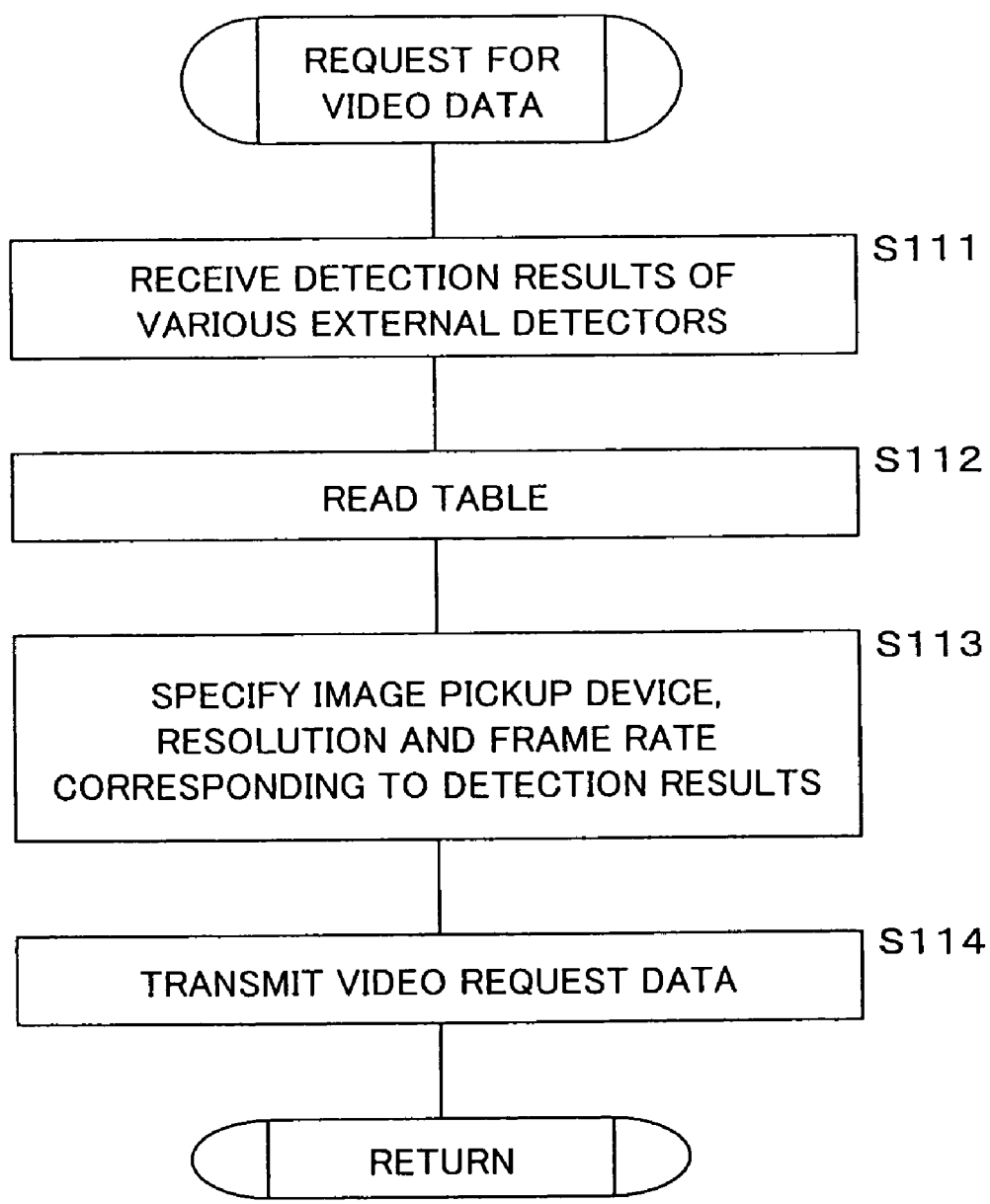
FIG. 10 is a flowchart showing the processing procedure of a CPU with respect to the request for video data.

FIG. 10 is a flowchart showing the processing procedure of the CPU 34a with respect to the request for video data. The CPU 34a of the fourth video processing device 234 first receives the detection results of the various external detectors (at step S111). Next, the CPU 34a reads the information of the table 34h (at step S112) and specifies one of the first to fourth image pickup devices 21, 22, 23 and 24, and the resolution and frame rate of the video data associated with the detection results on the basis of the received detection results and the table 34h (at step S113). Then, the control section 19 transmits data indicating the request for the video data of the specified one of the first to fourth image pickup devices 21, 22, 23 and 24, and the video request data containing data indicating the resolution and frame rate of the video data to the vehicle-mounted video relay device 1 (at step S114), thereby completing the processing with respect to the request for video data.

The processing of the vehicle-mounted video relay device 1 with respect to the reception of the video request data transmitted and the delivery of the video data is similar to that of the vehicle-mounted video relay device 1 according to Embodiment 1.

In the vehicle-mounted video communication system according to Embodiment 2, the fourth video processing device 234 can transmit the video request data requesting the video data required for the first to fourth video processing devices 31, 32, 33 and 234, without collecting the video request data via the communication line 6.

In addition, unlike the case of Embodiment 1, the first to fourth video processing devices 31, 32, 33 and 234 are not required to be connected to one another via the communication line 6. Hence, the wiring can be simplified, and the first to third video processing devices 31, 32 and 33 can be reduced in size.

Since the other configurations, actions and effects of the vehicle-mounted video communication system according to Embodiment 2 are similar to those of the vehicle-mounted video communication system according to Embodiment 1, the corresponding components are designated by the same reference codes, and their detailed descriptions are omitted.

Embodiment 3

Figure 11:
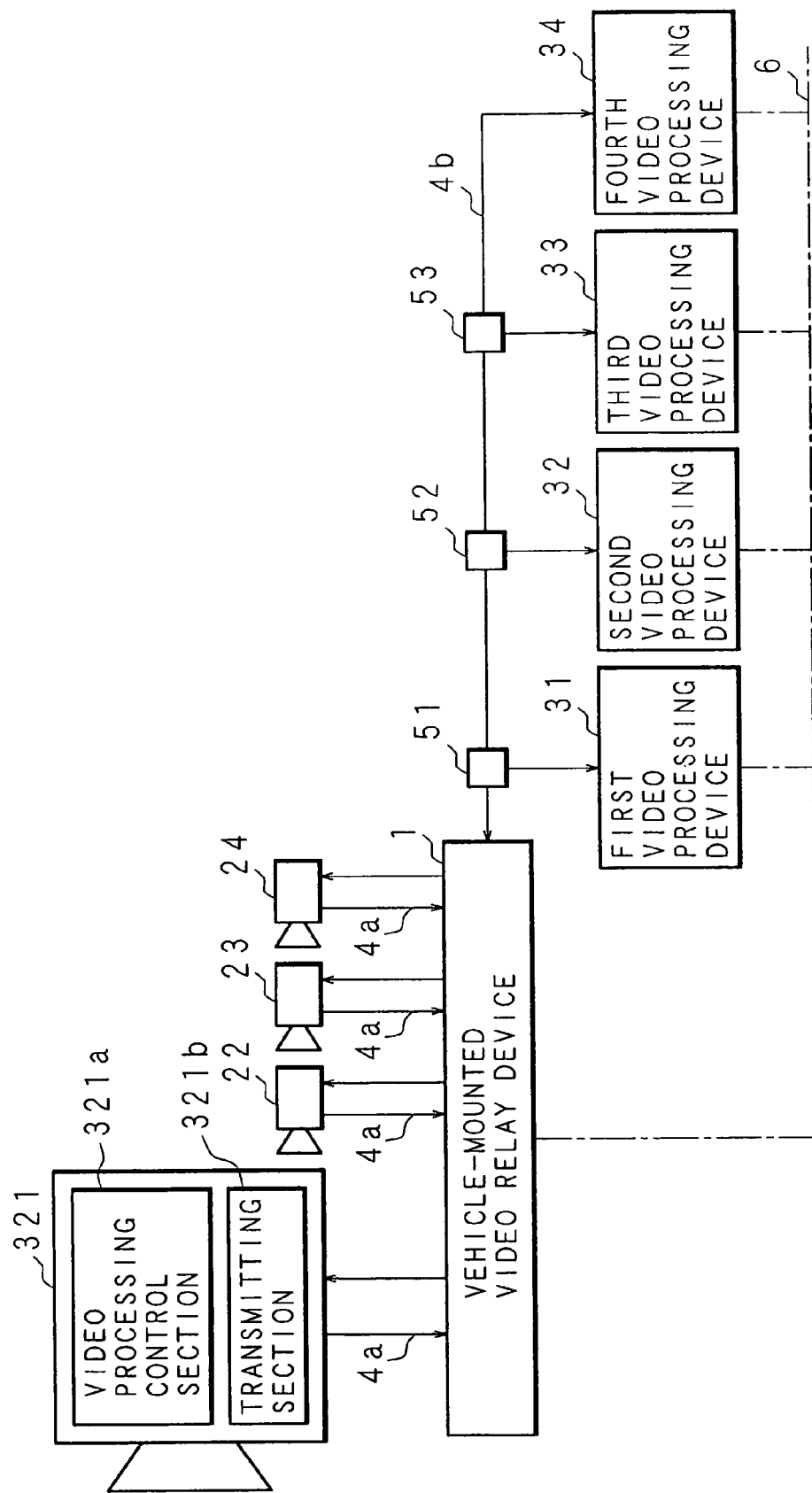
FIG. 11 is a block diagram showing a vehicle-mounted video communication system according to Embodiment 3.

FIG. 11 is a block diagram showing a vehicle-mounted video communication system according to Embodiment 3. The vehicle-mounted video communication system according to Embodiment 3 is equipped with a first image pickup device 321 having video processing functions, such as the detection of obstacles (pedestrians, animals, etc.) and the measurement of the distances of the obstacles to the vehicle. In addition, the vehicle-mounted video relay device 1 is connected to the communication line 6. The vehicle-mounted video communication device 1 is different from the vehicle-mounted video relay device according to Embodiment 1 in that, regardless of the contents of the video request data transmitted from the first to fourth video processing devices 31, 32, 33 and 34, when it is judged that the video data of the first image pickup device 321 is required to be processed urgently depending on the processing result of the first image pickup device 321, the vehicle-mounted video relay device 1 preferentially transmits the video data to the first to fourth video processing devices 31, 32, 33 and 34. This difference will be mainly described below.

The first image pickup device 321 is equipped with a video processing control section 321a for the image pickup device. The video processing control section 321a is configured so as to perform predetermined processing for the video data obtained by picking up with the first image pickup device 321 and to transmit a predetermined signal to the vehicle-mounted video relay device 1 depending on the result of the processing.

Figure 12:
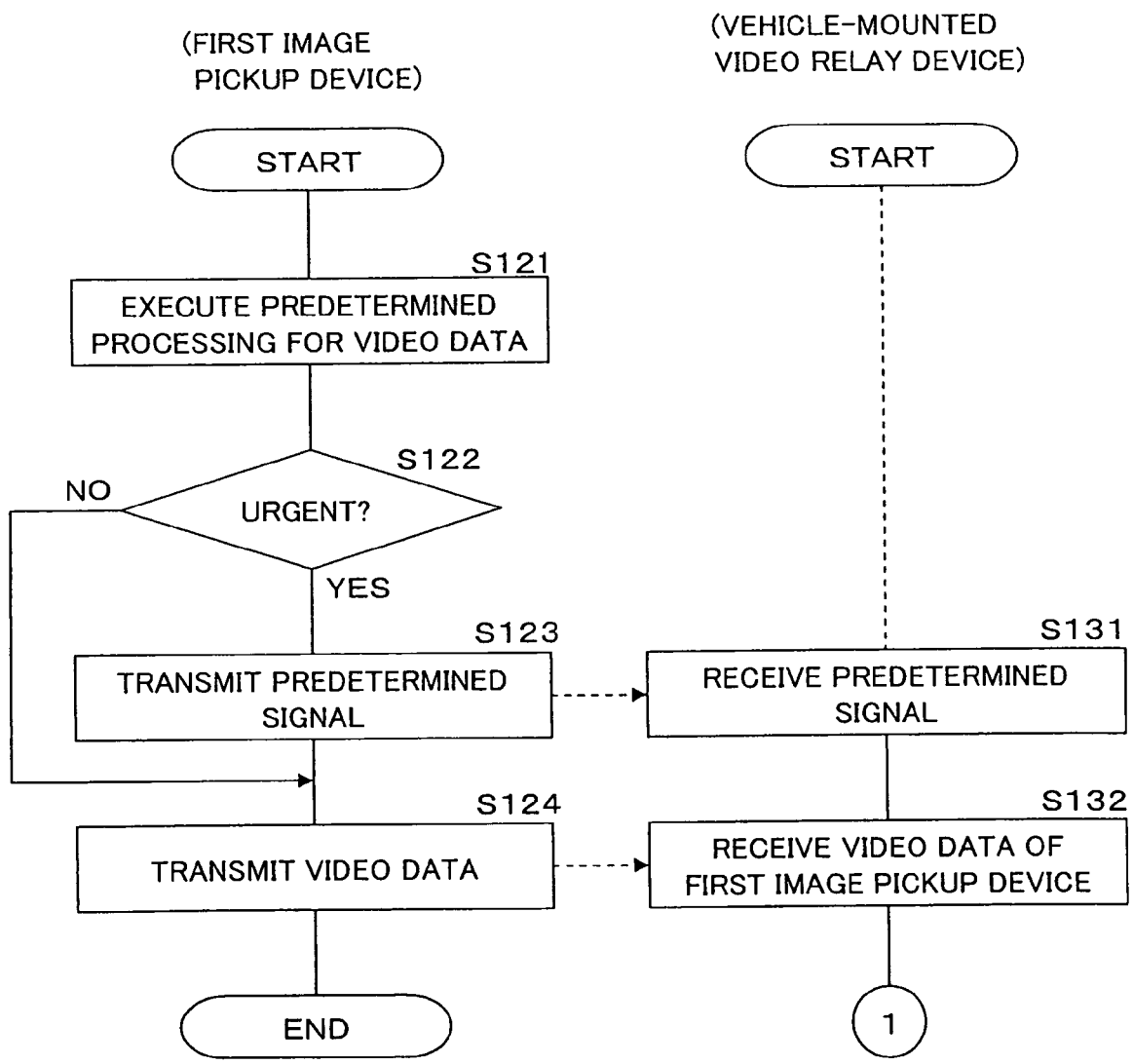
FIG. 12 is a flowchart showing the processing procedures of a video processing control section and a control section provided in a vehicle-mounted video relay device with respect to the delivery of video data.
Figure 13:
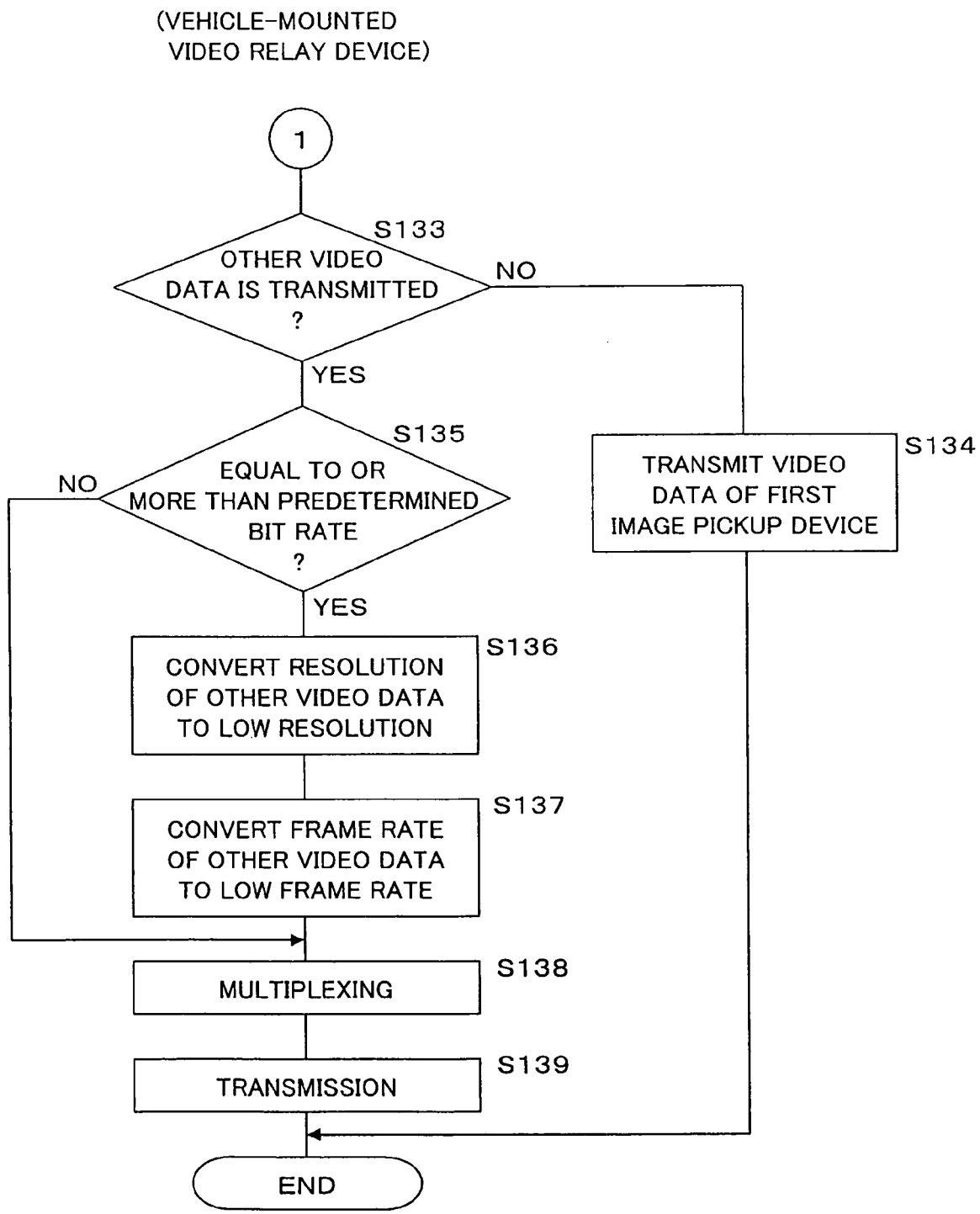
FIG. 13 is a flowchart showing the processing procedures of the video processing control section and the control section provided in the vehicle-mounted video relay device with respect to the delivery of video data.

FIGS. 12 and 13 are flowcharts showing the processing procedures of the video processing control section 321a and the control section 19 provided in the vehicle-mounted video relay device 1 with respect to the delivery of video data.

First, the video processing control section 321a executes the predetermined processing for the obtained video data (at step S121). For example, the video processing control section 321a executes processing for detecting a pedestrian by performing binarization, noise reduction, pattern matching, etc. for the video data.

Next, the video processing control section 321a judges, on the basis of the result of the processing, as to whether the video data is important video data required to be processed urgently (at step S122). For example, in the case that a pedestrian located close to the vehicle is detected, the control section judges that the video data is required to be processed urgently. When it is judged that the video data is required to be processed urgently (YES at step S122), the transmitting section 321b transmits the predetermined signal to the vehicle-mounted video relay device 1 (at step S123).

When the processing at step S123 is completed or when it is judged that the video data is not required to be processed urgently (NO at step S122), the control section 19 transmits the obtained video data to the vehicle-mounted video relay device 1 (at step S124), thereby completing the processing.

On the other hand, the control section 19 of the vehicle-mounted video relay device 1 monitors the signal transmitted from the first image pickup device 321. When the predetermined signal is transmitted from the first image pickup device 321, the control section 19 receives the transmitted predetermined signal (at step S131). Next, when the control section 19 has received the predetermined signal, the control section 19 receives the video data of the first image pickup device 321 (at step S132). Furthermore, when the control section 19 has received the predetermined signal, the control section 19 transmits the predetermined signal or event information corresponding to the predetermined signal to the outside via the communication line 6.

Next, the control section 19 judges as to whether other video data is transmitted (at step S133). In other words, the control section 19 judges as to whether the video data of the other image pickup devices, that is, the second to fourth image pickup devices 22, 23 and 24, is requested.

When it is judged that the other video data is not transmitted (NO at step S133), the control section 19 transmits the video data obtained by picking up with the first image pickup device 321 to the first to fourth video processing devices 31, 32, 33 and 34 (at step S134), thereby completing the processing.

When it is judged that the other video data is transmitted (YES at step S133), the control section 19 judges as to whether the bit rate of the video data obtained by multiplexing the video data of the first image pickup device 321 and the other video data is equal to or more than a predetermined bit rate (at step S135).

When it is judged that the bit rate is equal to or more than the predetermined bit rate (YES at step S135), the control section 19 converts the resolution of the other video data to a predetermined low resolution (at step S136). The predetermined low resolution has been stored in advance in the control section 19 or in the storage section 18. The low resolution is information required for a transmission band management function and is the lowest resolution at which the first to fourth video processing devices 31, 32, 33 and 34 operate. By the conversion of the resolution of the video data to the low resolution, the transmission band for transmitting the video data of the first image pickup device 321 can be obtained securely.

Then, the control section 19 converts the frame rate of the other video data to a predetermined low frame rate (at step S137). The predetermined low frame rate is also information required for the transmission band management function and has been stored in advance in the control section 19 or in the storage section 18.

The vehicle-mounted video relay device 1 is configured so as to convert a resolution and a frame rate. However, when the first image pickup device 321 has a video compression function, the first image pickup device 321 may be configured so as to compress the video data, for example, to convert the video data into video data having a low resolution and a low frame rate. The instruction for the compression should be transmitted from the vehicle-mounted video relay device 1 to the first image pickup device 321 using the gap between the frames of the video data transmitted from the first image pickup device 321.

When the processing at step S137 is completed or when it is judged that the bit rate is not equal to or more than the predetermined bit rate at step S135 (NO at step S135), the control section 19 multiplexes the video data of the first image pickup device 321 and the other video data for a fixed time (at step S138) and transmits the multiplexed video data to the first to fourth video processing devices 31, 32, 33 and 34 (at step S139), thereby completing the processing.

When the video request data for requesting the video data of the first image pickup device 321 was received before said fixed time has passed, the transmission of the video data continues. When said fixed time has passed before the video request data for requesting the video data of the first image pickup device 321 is received, the transmission of the video data is stopped, and only the video data requested is transmitted to the first to fourth video processing devices 31, 32, 33 and 34.

The vehicle-mounted video communication system configured as described above can autonomously judge as to whether video data is required to be processed urgently and can transmit the video data to the first to fourth video processing devices 31, 32, 33 and 34, regardless of the contents of the video request data from the first to fourth video processing devices 31, 32, 33 and 34.

Furthermore, when the video data required to be processed urgently is multiplexed and transmitted, a sufficient transmission band can be obtained securely by reducing the bit rates of the other video data. Hence, the video data required to be processed urgently can be transmitted preferentially.

Moreover, the least amount of video data required for the operations of the first to fourth video processing devices 31, 32, 33 and 34 can also be transmitted continuously.

Still further, when the vehicle-mounted video relay device 1 received the predetermined signal, the device can be equipped with a function of transmitting the predetermined signal or event information to the outside via the communication line.

Although the system according to Embodiment 3 is configured so that the first image pickup device performs the predetermined processing for the video data and transmits the predetermined signal, the system may also be configured so that a device for transmitting the predetermined signal is connected to the communication line as an external device.

In this case, when the predetermined signal is input via the communication line, the video data obtained by picking up with the predetermined first to fourth image pickup devices is multiplexed and transmitted to the first to fourth video processing devices.

Furthermore, although the vehicle-mounted video relay device is connected to the communication line, the system may be configured so that the vehicle-mounted video communication system is not connected to the communication line in view of simplifying the wiring and reducing the size of the device.

A selection should be made as to whether the vehicle-mounted video relay device should be connected to the communication line in consideration of the number of the image pickup devices and the number of the video processing devices to be mounted on the vehicle, necessity for space saving and convenience for information processing.

Since the other configurations, actions and effects of the vehicle-mounted video communication system according to Embodiment 3 are similar to those of the vehicle-mounted video communication system according to Embodiment 1, the corresponding components are designated by the same reference codes, and their detailed descriptions are omitted.

Embodiment 4

Figure 14:
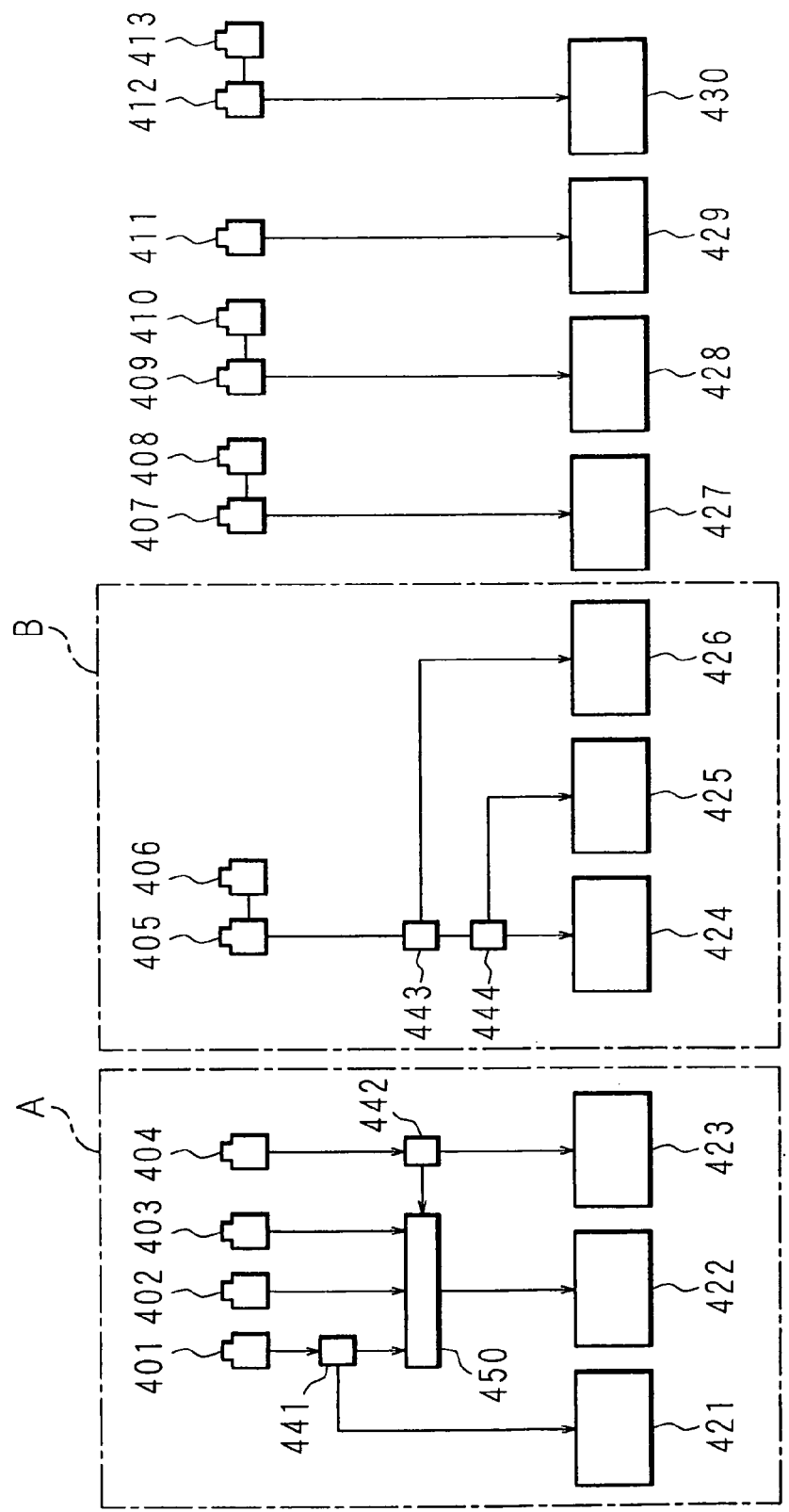
FIG. 14 is a block diagram showing a vehicle-mounted video communication system according to Embodiment 4 of the present invention.
Figure 15:
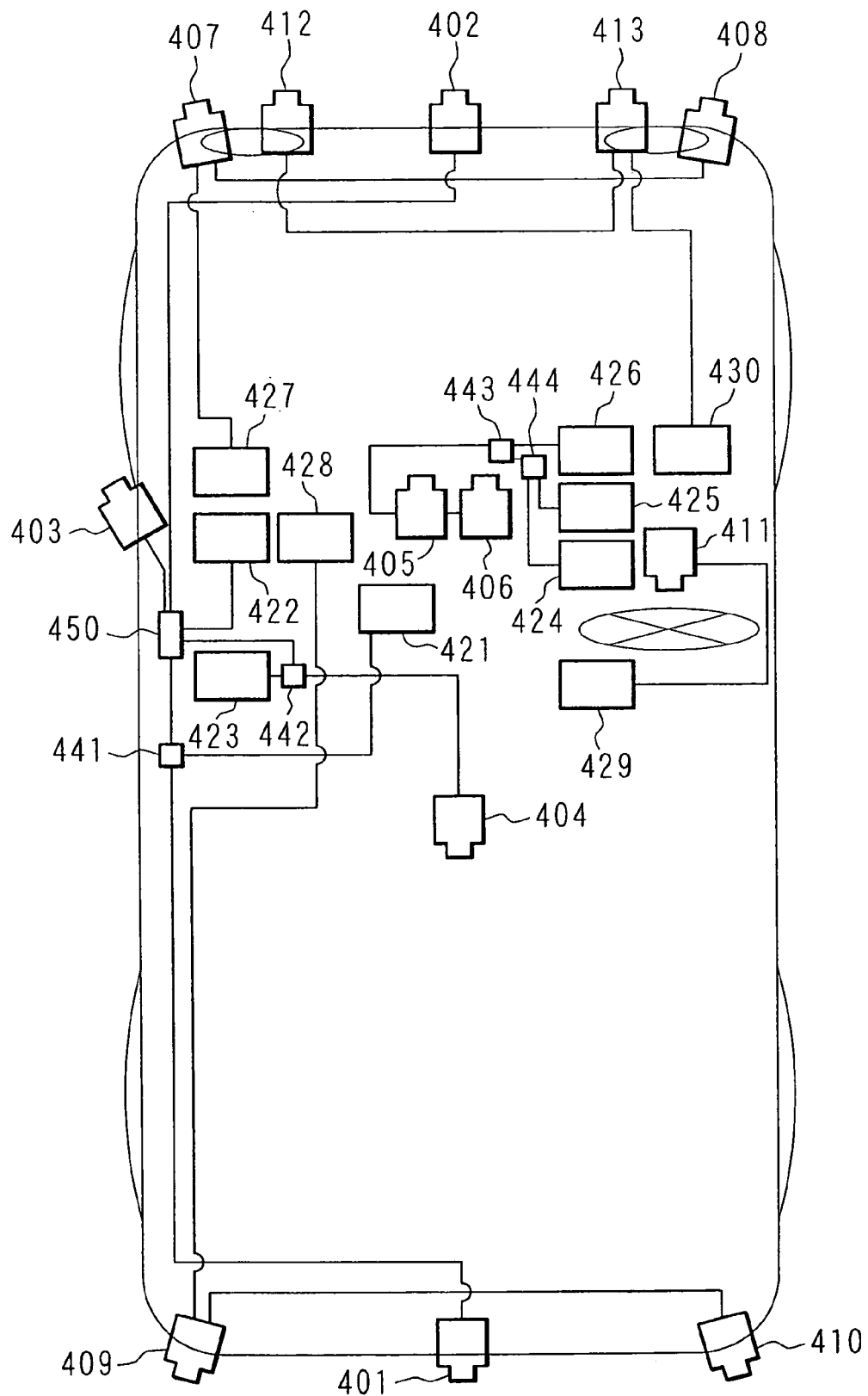
FIG. 15 is a schematic view showing the configuration of the vehicle-mounted video communication system according to Embodiment 4 in a state of being mounted on a vehicle.

FIG. 14 is a block diagram showing a vehicle-mounted video communication system according to Embodiment 4 of the present invention, and FIG. 15 is a schematic view showing the configuration of the vehicle-mounted video communication system according to Embodiment 4 in a state of being mounted on a vehicle. The vehicle-mounted video communication system according to Embodiment 4 has simplified wiring and is equipped with network sections A and B containing various devices reduced in size.

The network section A is equipped with first to fourth image pickup devices 401, 402, 403 and 404 for transmitting digital video data or analog video data, first to third video processing devices 421, 422 and 423 for processing digital video data, a vehicle-mounted video relay unit 450 having an A/D conversion function, and first and second branching units 441 and 442. The first, second and fourth image pickup devices 401, 402 and 404 transmit analog video data obtained by picking up a video picture, and the third image pickup device transmits digital video data obtained by picking up a video picture.

The first image pickup device 401 is provided, for example, at the approximately laterally central section of the rear section of the vehicle and is configured so as to transmit the analog video data obtained by picking up with visible light, infrared light or far-infrared light to the outside via a cable. The second and fourth image pickup devices 402 and 404 have the same configuration as that of the first image pickup device 401, and the third image pickup device 403 has the same configuration as that of the first image pickup device 401 except that the third image pickup device 403 transmits digital video data. Hence, the configuration of the first image pickup device 401 will be described below. The second image pickup device 402 is provided at the approximately laterally central section of the rear front section of the vehicle, and the third image pickup device 403 is provided at one side section of the vehicle. Furthermore, the fourth image pickup device 404 is provided at the approximately central section of the vehicle.

The first image pickup device 401 is equipped with a lens, an image pickup element, a signal processing circuit, a transmitting circuit, etc. for picking up an image of the periphery of the vehicle.

The image pickup element is formed of a CCD, a CMOS (Complementary Metal Oxide Semiconductor), etc. for picking up an image using visible light, and converts an image formed using the lens into an analog electrical signal.

The signal processing circuit is equipped with a correlated double sampling circuit, an auto gain control circuit, a video processing microprocessor, etc. The signal processing circuit performs processing, such as noise reduction and gain adjustment, for the electrical signal converted using the image pickup element, and supplies the processed signal to the transmitting circuit. The video data has a header portion and data indicating the brightness values of pixels in a frame constituting a video picture. The header portion contains ID information, such as MAC addresses, for identifying the first to fourth image pickup devices 401, 402, 403 and 404. The ID information is stored in a non-volatile memory (not shown), and the signal processing circuit is configured so that the ID information stored in the non-volatile memory is added to the header portion of the video data.

The transmitting circuit transmits analog video data, for example, composite signals, S-video signals, YCbCr signals and RGB signals conforming to the NTSC (National Television System Committee Standard) format or the PAL (Phase Alternating Line) format to the vehicle-mounted video relay unit 450 via a cable and the first branching unit 441.

The transmitting circuit of the third image pickup device 403 is configured so as to transmit digital video data.

Figure 16:
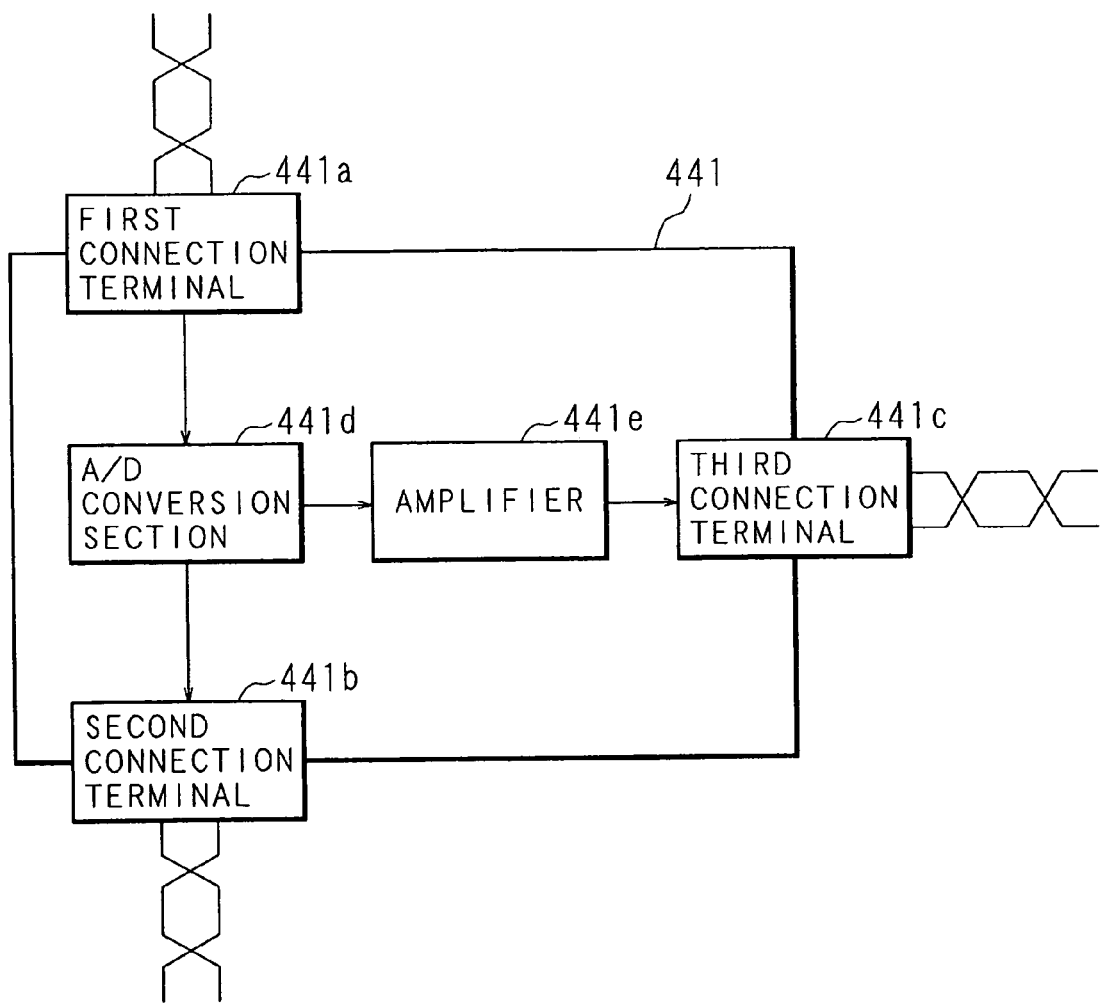
FIG. 16 is a block diagram showing the configuration of a first branching unit.

FIG. 16 is a block diagram showing the configuration of the first branching unit 441. The first branching unit 441 is equipped with first to third connection terminals 441a, 441b and 441c, an A/D conversion section 441d and an amplifier 441e, and is configured so as to distribute and transmit the video data transmitted from the first image pickup device 401 to the vehicle-mounted video relay unit 450 and the first video processing device 421.

The first connection terminal 441a is a terminal (connection section) for connecting the first image pickup device 401 to the first branching unit 441 via an analog cable. The second connection terminal 441b and the amplifier 441e are connected to the first connection terminal 441a via the A/D conversion section 441d.

The A/D conversion section 441d A/D-converts the analog video data transmitted from the first image pickup device 401 into digital video data. For example, the A/D conversion section 441d outputs a digital signal conforming to LVDS. More specifically, modulation is performed to produce a differential signal having an amplitude of several hundred mV, and the signal is transmitted. The vehicle-mounted video relay unit 450 is connected to the second connection terminal 441b via a digital cable, such as a twisted-pair cable conforming to LVDS, and the A/D conversion section 441d is configured so as to transmit the A/D-converted digital video data to the second connection terminal 441b and to the vehicle-mounted video relay unit 450 via a cable.

The amplifier 441e amplifies the digital video data A/D-converted by the A/D conversion section 441d. The third connection terminal 441c to which the first video processing device 421 is connected is connected to the amplifier 441e via a digital cable, and the amplifier 441e is configured so as to transmit the amplified digital video data to the first video processing device 421 via the third connection terminal 441c and a cable.

The second branching unit 442 has a configuration similar to that of the first branching unit 441, and is configured so as to A/D-convert the analog video data transmitted from the fourth image pickup device 404 into digital video data and to transmit the A/D-converted video data to the vehicle-mounted video relay unit 450 and the third video processing device 423.

Figure 17:
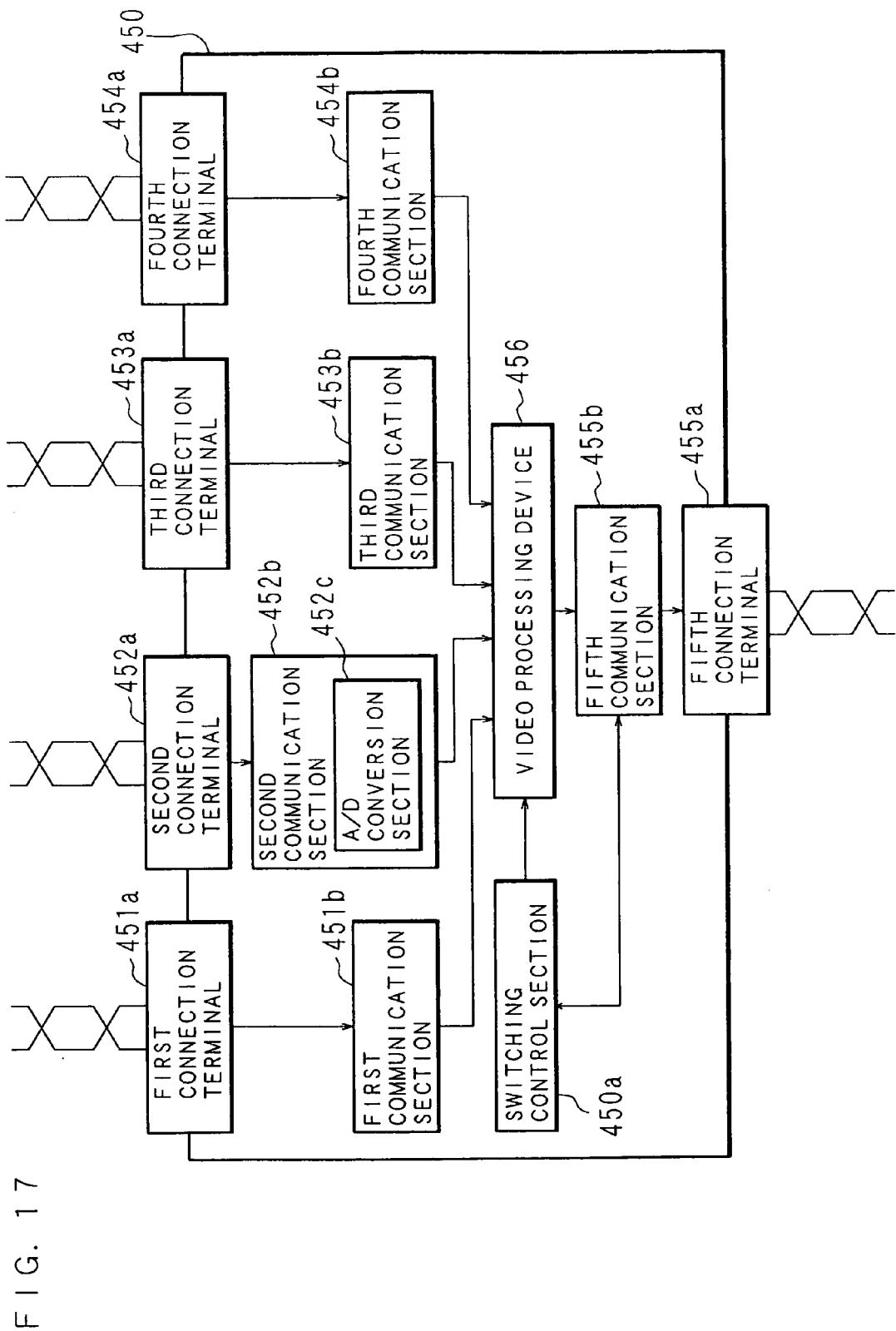
FIG. 17 is a block diagram showing the configuration of a vehicle-mounted video relay unit.

FIG. 17 is a block diagram showing the configuration of the vehicle-mounted video relay unit 450. The vehicle-mounted video relay unit 450 is equipped with a switching control section 450a, a video processing section 456, first to fifth connection terminals 451a, 452a, 453a, 454a and 455a, and first to fifth communication sections 451b, 452b, 453b, 454b and 455b. The vehicle-mounted video relay unit 450 is configured so as to transmit the video data transmitted from the first to fourth image pickup devices 401, 402, 403 and 404 to the second video processing device 422 selectively or to multiplex the video data transmitted from the first to fourth image pickup devices 401, 402, 403 and 404 and transmit the multiplexed video data to the second video processing device 422.

The switching control section 450a is, a microcomputer equipped with a CPU, for example, and the CPU is equipped with a ROM, a RAM, input/output sections, etc., these being connected via a bus. The ROM is formed of a mask ROM, an EEPROM, a flash memory or the like in which computer programs for executing control operations are stored. The RAM is formed of an SRAM or a DRAM for temporary data storage. The CPU loads the computer programs into the RAM and executes the computer programs to control the various operations of the vehicle-mounted video relay unit 450.

The first connection terminal 451a is a connection section for connecting the first image pickup device 401 to the vehicle-mounted video relay unit 450 via a cable and the first branching unit 441. The first communication section 451b is connected to the first connection terminal 451a, and the video data transmitted from the first image pickup device 401 is input to the first communication section 451*b* via the first connection terminal 451*a*. The video data to be input to the first communication section 451*b* is the digital video data A/D-converted by the first branching unit 441.

In a similar way, the fourth image pickup device 404 is connected to the fourth connection terminal 454*a* via a cable and the second branching unit 442, and the video data transmitted from the fourth image pickup device 404 is input to the fourth communication section 454*b* via the fourth connection terminal 454*a*.

The second image pickup device 402 is connected to the second connection terminal 452*a* via a cable, and the analog video data transmitted from the second image pickup device 402 is input to the second communication section 452*b* via the second connection terminal 452*a*.

In a similar way, the third image pickup device 403 is connected to the third connection terminal 453*a* via a cable, and the digital video data transmitted from the third connection terminal 453*a* is input to the third communication section 453*b* via the third connection terminal 453*a*.

The first communication section 451*b*, the third communication section 453*b* and the fourth communication section 454*b* demodulate the input digital video data and input the demodulated video data to the video processing section 456.

The second communication section 452*b* is equipped with an A/D conversion section 452*c*. The A/D conversion section 452*c* converts the analog video data input to the second communication section 452*b* into digital video data. The second communication section 452*b* demodulates the A/D-converted digital video data and inputs the demodulated video data to the video processing section 456.

The video processing section 456 is equipped with a resolution converting function for converting the resolutions of the video data transmitted from the first to fourth image pickup devices 401, 402, 403 and 404, a thinning function for converting the frame rate of the video data, a multiplexing function for time-division multiplexing a plurality of items of video data, a switching function for selecting one item of video data and transmitting the second video processing device selected video data to the second video processing device 422, etc. The video processing section 456 operates under the control of the switching control section 450*a*. The video processing section 456 supplies the selected video data or the multiplexed video data to the fifth communication section 455*b*.

The fifth communication section 455*b* modulates the video data supplied from the video processing section 456. The fifth connection terminal 455*a* is connected to the fifth communication section 455*b*, and the second video processing device 422 is connected to the fifth connection terminal 455*a* via a cable. The fifth communication section 455*b* transmits the video data to the second video processing device 422 via the fifth connection terminal 455*a* and a cable.

Furthermore, the fifth communication section 455*b* is connected to the switching control section 450*a* and configured so as to receive and demodulate the switching signal transmitted from the second video processing device 422 and to supply the demodulated switching signal to the switching control section 450*a*.

On the other hand, the network section B shown in FIG. 14 is equipped with fifth and sixth image pickup devices 405 and 406, third and fourth branching units 443 and 444, and fourth to sixth video processing devices 424, 425 and 426. The third and fourth branching units 443 and 444 have a configuration similar to that of the first branching unit 441.

The fifth and sixth image pickup devices 405 and 406, such as stereo far-infrared image pickup devices, are connected to the third branching unit 443, and one of the branched cables is connected to the sixth video processing device 426. The other branched cable is connected to the fourth branching unit 444. Furthermore, one of the cables branched at the fourth branching unit 444 is connected to the fourth video processing device 424, and the other cable is connected to the fifth video processing device 425.

The first to sixth video processing devices 421, 422, ..., 426 shown in FIG. 14 are microcomputers each equipped with a CPU. The CPU is equipped with a ROM, a RAM, a timer section, a CAN interface, a video input terminal, etc., these being connected via a bus. Each of the video processing devices is configured so as to receive digital video data and to perform predetermined processing for the received digital video data. For example, when the system detects a pedestrian who may have a risk of colliding with the vehicle, the system issues a warning. Since ID information for identifying which video data corresponds to which image pickup device, that is, one of the first to sixth image pickup devices 401, 402, ..., 406, is added to each item of video data, the first to sixth video processing devices 421, 422, ..., 426 can selectively receive the video data required for the respective processors on the basis of the ID information.

Furthermore, as shown in FIG. 14, other image pickup devices 407 and 408 are connected to a video processing device 427 via a cable, and image pickup devices 409 and 410 are connected to a video processing device 428 via a cable. Moreover, an image pickup device 411 is connected to a video processing device 429, and image pickup devices 412 and 413 are connected to a video processing device 430.

FIGS. 18A and 18B are block diagrams showing the comparison between the vehicle-mounted video communication system according to Embodiment 4 and a conventional vehicle-mounted video communication system.

FIG. 18A shows the vehicle-mounted video communication system according to Embodiment 4 of the present invention, and FIG. 18B shows a conventional vehicle-mounted video communication system equivalent to that shown in FIG. 18A.

When the network section A is compared with a network section C equivalent thereto, as shown in FIG. 18B, a second video processing device 422*a* corresponding to the second video processing device 422 is required to be equipped with analog connection terminals for connecting the first and second image pickup devices 401 and 402, a digital connection terminal for connecting the third image pickup device 403, and two connection terminals for transfer, whereby the second video processing device 422*a* is increased in size. In a similar way, a third video processing device 423*a* corresponding to the third video processing device 423 is required to be equipped with connection terminals for receiving video data and a connection terminal for transfer, whereby the third video processing device 423*a* is increased in size. Furthermore, since each of the first to third image pickup devices 401, 402 and 403 is required to be connected one-to-one to the second video processing device 422*a*, the cables for the connection require large space. Hence, the wiring becomes more complicated.

Figure 18:
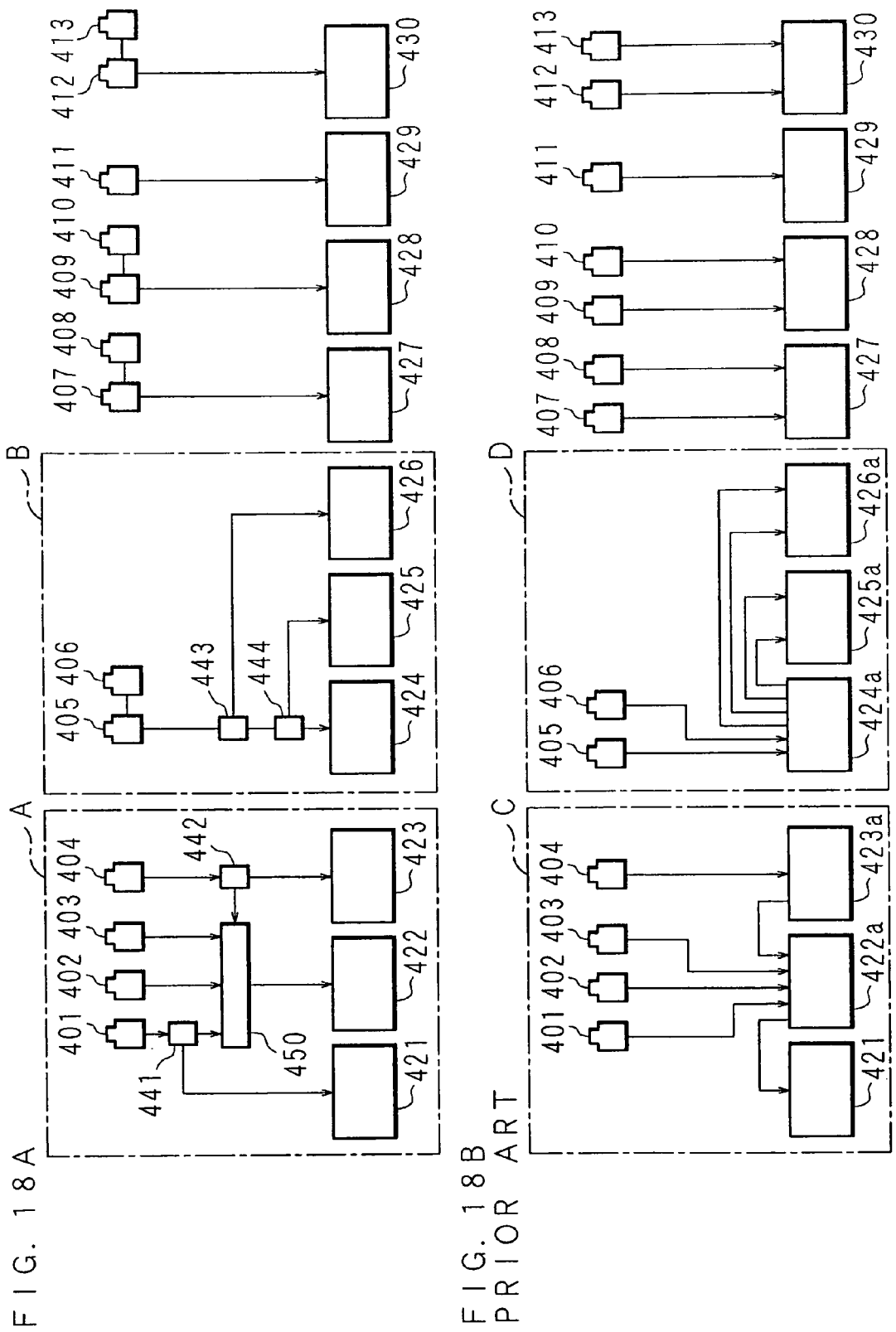
FIGS. 18A and 18B are block diagrams showing the comparison between the vehicle-mounted video communication system according to Embodiment 4 and a conventional vehicle-mounted video communication system.

On the other hand, when the system is configured so that video data is distributed and delivered using the vehicle-mounted video relay unit 450 and the first and second branching units 441 and 442, it is sufficient that the first to third video processing devices 421, 422 and 423 are each equipped with one digital connection terminal as shown in FIG. 18(*a*), whereby each device can be reduced in size. In addition, since the system is configured so that the vehicle-mounted video relay unit 450 collects the video data of the first to third image pickup devices 401, 402 and 403, and delivers the video data selectively or multiplexes the video data and delivers the multiplexed video data, whereby the cable wiring is simplified. Furthermore, since the system is configured so that the cables are branched at the first and second branching units 441 and 442, wiring and connection terminals for transfer are not required, whereby the wiring is simplified and the devices are reduced in size. Moreover, since the first and second branching units 441 and 442 and the vehicle-mounted video relay unit 450 are equipped with the A/D conversion sections 441*d* and 452*c*, it is not necessary to prepare video processing devices equipped with digital connection terminals and connection terminals for receiving analog video data, whereby the first to third video processing devices 421, 422 and 423 can be reduced in size.

When the network section B is compared with a network section D equivalent thereto, as shown in FIG. 18B, a fourth video processing device 424*a* corresponding to the fourth video processing device 424 is equipped with six connection terminals, and fifth and sixth video processing devices 425*a* and 426*a* corresponding to the fifth and sixth video processing devices 425 and 426 are each equipped with two connection terminals.

On the other hand, when the system is configured so that video data is distributed using the third and fourth branching units 443 and 444 as shown in FIG. 18A, the cable wiring can be simplified and the respective devices can be reduced in size, as in the case of the network section A. Moreover, the total length of the cables can be shortened.

The cables and communication lines for connecting the image pickup devices, the vehicle-mounted video relay unit, the branching units and the video processing devices are given as examples. Other cables, cords, conductors, optical fibers, power lines, etc. may also be used, provided that they can transmit/receive the video data.

Furthermore, the number of the image pickup devices and the number of the video processing devices are given as examples. The system may be configured so that a plurality of video processing devices are connected to one image pickup device. Besides, the system may also be configured so that a plurality of image pickup devices are connected to one video processing device. Moreover, the system may also be configured so that two or more image pickup devices are connected to two or more video processing devices.

Besides, although a case in which an image of the periphery of a vehicle is picked up using a visible light has been described above, the system may be configured so that an image is picked up using infrared light, far-infrared light, etc. Furthermore, the system may also be configured so that an image of an interior of the vehicle is picked up.

Still further, although a device for performing processing, such as the detection of a pedestrian, is given as an example of the video processing device, other devices may also be used, provided that the devices perform processing using video data, such as making various judgments, displaying a video picture and outputting a video picture to the outside using video data.

In the above-mentioned Embodiments 1 to 4, when a plurality of image pickup devices and a plurality of video processing devices are mounted on a vehicle, a vehicle-mounted video communication system, in which the respective devices thereof can be reduced in size and the wiring between the respective devices can be simplified, has been described. In the following embodiments, the configuration of a vehicle-mounted image pickup system, such as a drive recorder for recording the video pictures picked up by the image pickup devices, incorporating the above-mentioned vehicle-mounted video communication system will be described below. Processing devices or ECUs (Electronic Control Units) according to the following embodiments are equivalent to the video processing devices according to the above-mentioned embodiments. In a similar way, transmission lines described below are equivalent to the above-mentioned communication lines or communication cables, signal switching devices described below are equivalent to the above-mentioned vehicle-mounted video relay unit, and signal distributors described below are equivalent to the above-mentioned branching units.

Embodiment 5

Figure 19:
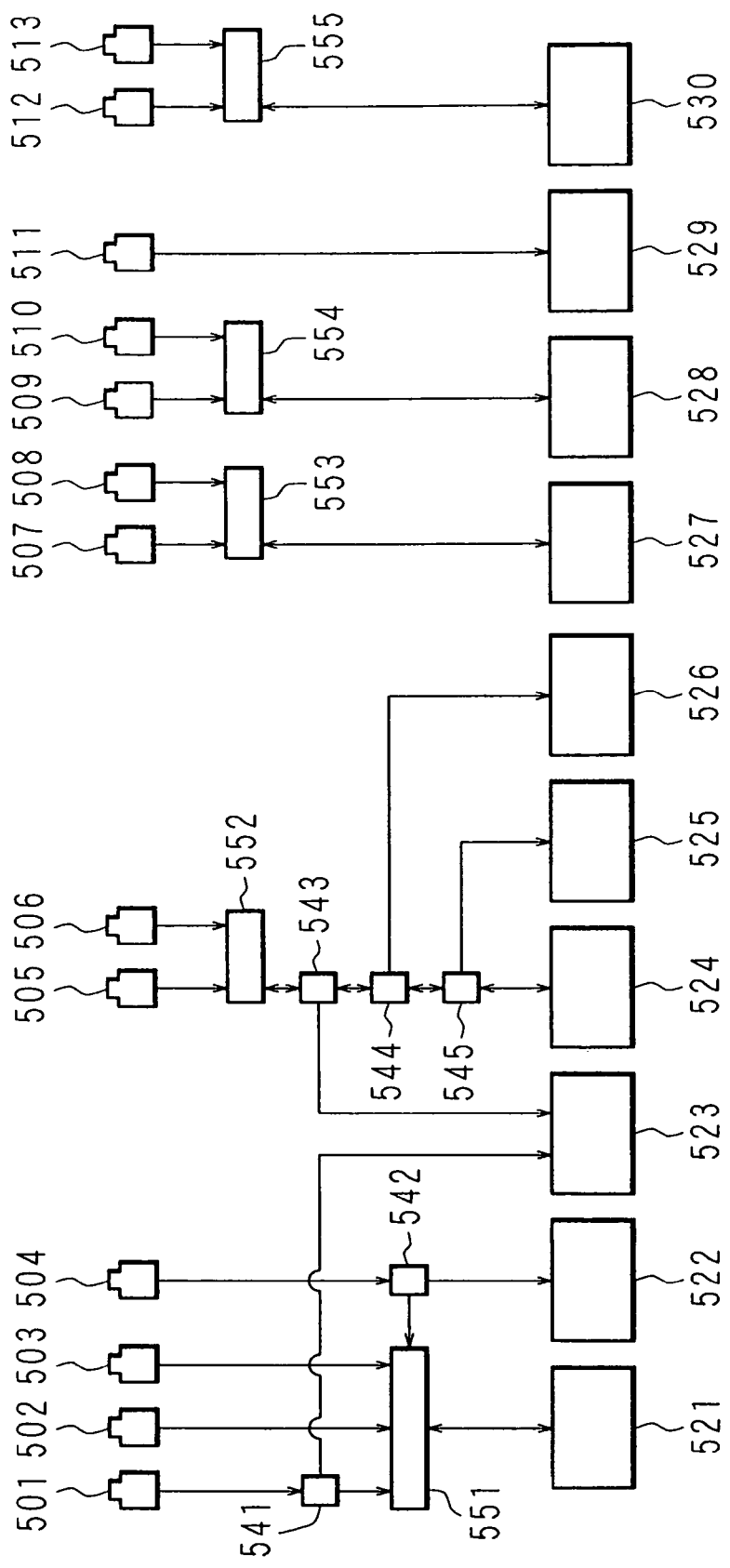
FIG. 19 is a block diagram showing the configuration of a vehicle-mounted image pickup system according to Embodiment 5 of the present invention.
Figure 20:
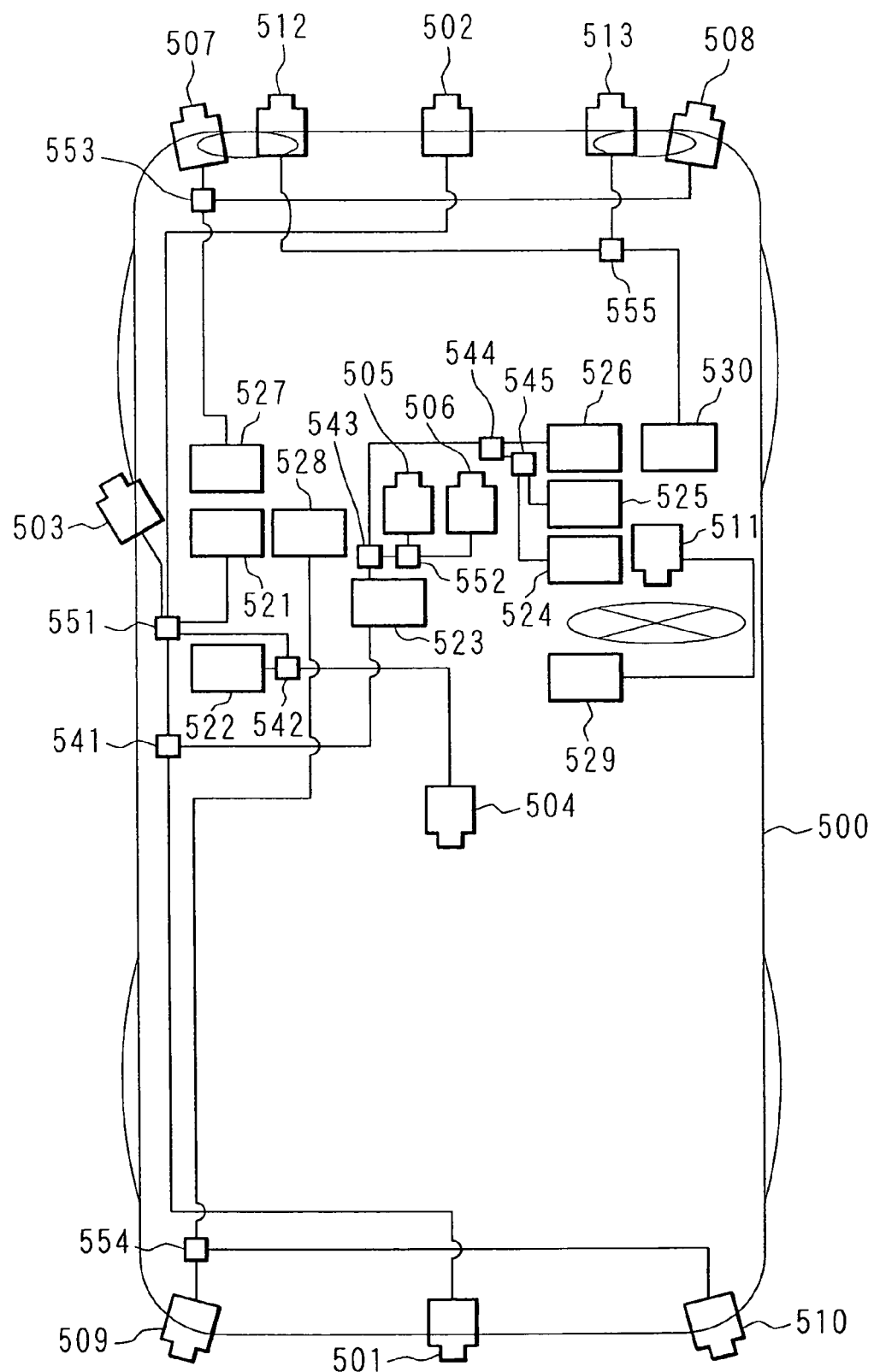
FIG. 20 is a schematic view showing the configuration of the vehicle-mounted image pickup system according to Embodiment 5 of the present invention in a state of being mounted on a vehicle.

FIG. 19 is a block diagram showing the configuration of a vehicle-mounted image pickup system according to Embodiment 5 of the present invention. In addition, FIG. 20 is a schematic view showing the configuration of the vehicle-mounted image pickup system according to Embodiment 5 of the present invention in a state of being mounted on a vehicle. In FIGS. 19 and 20, numerals 501 and 513 designate image pickup devices. The plurality of image pickup devices 501 to 513 are respectively mounted at appropriate positions of a vehicle 500 to pick up images of an interior or exterior of the vehicle 500. For example, the image pickup device 501 is mounted at the center of the rear section of the vehicle 500 and can be used as the so-called rear-view monitor by displaying the video pictures (video signal) picked up thereby on a display (not shown) disposed inside the vehicle 500. For example, the image pickup devices 507 and 508 are mounted at the left and right corner portions on the front side of the vehicle 500 and can be used as sensors for detecting objects, such as pedestrians or other vehicles, located around the vehicle 500, by performing image processing and for issuing a warning to the driver. Furthermore, for example, the image pickup device 511 is mounted inside the vehicle 500 to pick up video pictures of the driver and to detect the line of vision of the driver by performing image processing. As described above, the plurality of image pickup devices 501 to 513 mounted on the vehicle 500 include a wide variety of image pickup devices, such as image pickup devices for displaying the video pictures picked up thereby on the display and for allowing the driver to visually recognize the video pictures and image pickup devices serving as sensors for detecting the circumstances around the vehicle 500 by performing image processing.

The image pickup devices 501 to 513 are connected appropriately to the plurality of ECUs (processing devices) 521 to 530 mounted on the vehicle 500 using transmission lines, signal switching devices 551 to 555 and signal distributors 541 to 545. The ECUs 521 to 530 perform processing, such as receiving the video pictures transmitted from the image pickup devices 501 to 513, performing various processing for the received video pictures, displaying the obtained video pictures on the display and detecting objects located around the vehicle 500. The image pickup devices 501 to 513 are configured so as to transmit the obtained video pictures as digital data to the ECUs 521 to 530 such that the digital data of the video pictures is transmitted as video signals conforming to the LVDS format. With the LVDS format, a signal having a low amplitude of approximately several hundred mV is differentially transmitted, whereby a high-speed signal transmission rate of approximately several hundred Mbits/s can be achieved.

The signal switching devices 551 to 555 are used, when the video pictures picked up by the plurality of image pickup devices 501 to 513 are transmitted to one of the ECUs 521 to 530. The signal switching devices 551 to 555 are each equipped with a plurality of input connection terminals (input section) and one output connection terminal (output section), the plurality of image pickup devices 501 to 513 can be connected to the input connection terminals via transmission lines, and one of the ECUs 521 to 530 can be connected to the output connection terminal via a transmission line. The signal switching devices 551 to 555 have a function of selecting, switching and outputting one of a plurality of video signals input from the plurality of image pickup devices 501 to 513. For example, the signal switching device 551 is configured so as to select and output one of four input video signals, and the signal switching devices 552 to 555 are configured so as to output one of two input video signals. The output connection terminals of the signal switching devices 551 to 555 are the so-called input/output terminals capable of receiving control signals input from the ECUs 521 to 530 connected thereto, and the switching from the plurality of video signals to one video signal to be output is performed using the control signals from the ECUs 521 to 530. The detailed configuration of the signal switching devices 551 to 555 will be described later.

The signal distributors 541 to 545 are each used to transmit the video picture picked up by one of the image pickup devices 501 to 513 to the plurality of ECUs 521 to 530. The signal distributors 541 to 545 are each equipped with one input connection terminal (input section) and two output connection terminals (output section), and is configured so that one of the image pickup devices 501 to 513 can be connected to the input connection terminal via a transmission line and so that two of the ECUs 521 to 530 can be connected to the output connection terminals via transmission lines. The signal distributors 541 to 545 have a function of outputting the video signal input from one of the image pickup devices 501 to 513 to two of the ECUs 521 to 530 connected to the output connection terminals thereof respectively. Furthermore, one of the output connection terminals of each of the signal distributors 541 to 545 serves as an input/output terminal capable of receiving the control signal input from one of the ECUs 521 to 530 connected thereto, and the input connection terminal thereof serves an input/output terminal capable of outputting this control signal. Hence, even when the signal distributors 541 to 545 intervene between the image pickup devices 501 to 513 and the ECUs 521 to 530, the control signals can be transmitted from the ECUs 521 to 530 to the image pickup devices 501 to 513. The detailed configuration of the signal distributors 541 to 545 will be described later.

The plurality of image pickup devices 501 to 513 and the plurality of ECUs 521 to 530 mounted on the vehicle 500 are connected using the transmission lines while the plurality of signal switching devices 551 to 555 and the signal distributors 541 to 545 intervene therebetween so that the obtained video pictures can be transmitted from the image pickup devices 501 to 513 to the ECUs 521 to 530 as video signals. For example, the video signals from the four image pickup devices 501 to 504 can be transmitted to the ECU 521 via the signal switching device 551. In this case, the signal switching device 551 selects, switches and outputs one of the four video signals using the control signal supplied from the ECU 521.

In addition, for example, in order that the video picture picked up by the image pickup device 501 is used in the two ECUs 521 to 523, the signal distributor 541 outputs the video signal input thereto from the image pickup device 501 to the signal switching device 551 and the ECU 523. Furthermore, in order that the video picture picked up by the image pickup device 504 is used in the two ECUs 521 and 522, the signal distributor 542 outputs the video signal input thereto from the image pickup device 504 to the signal switching device 551 and the ECU 522. Moreover, in order that the video pictures picked up by the two image pickup devices 505 and 506 are used in the four ECUs 523 to 526, the signal switching device 552 selects, switches and outputs one of the two video signals input from the two image pickup devices 505 and 506, and the video signal output from the signal switching device 552 is output to the four ECUs 523 to 526 using the three signal distributors 543 and 545. In this case, the signal switching device 552 switches the video signals using the control signal supplied from the ECU 524, and the control signal output from the ECU 524 is supplied to the signal switching device 552 via the signal distributors 543 to 545.

Figure 21:
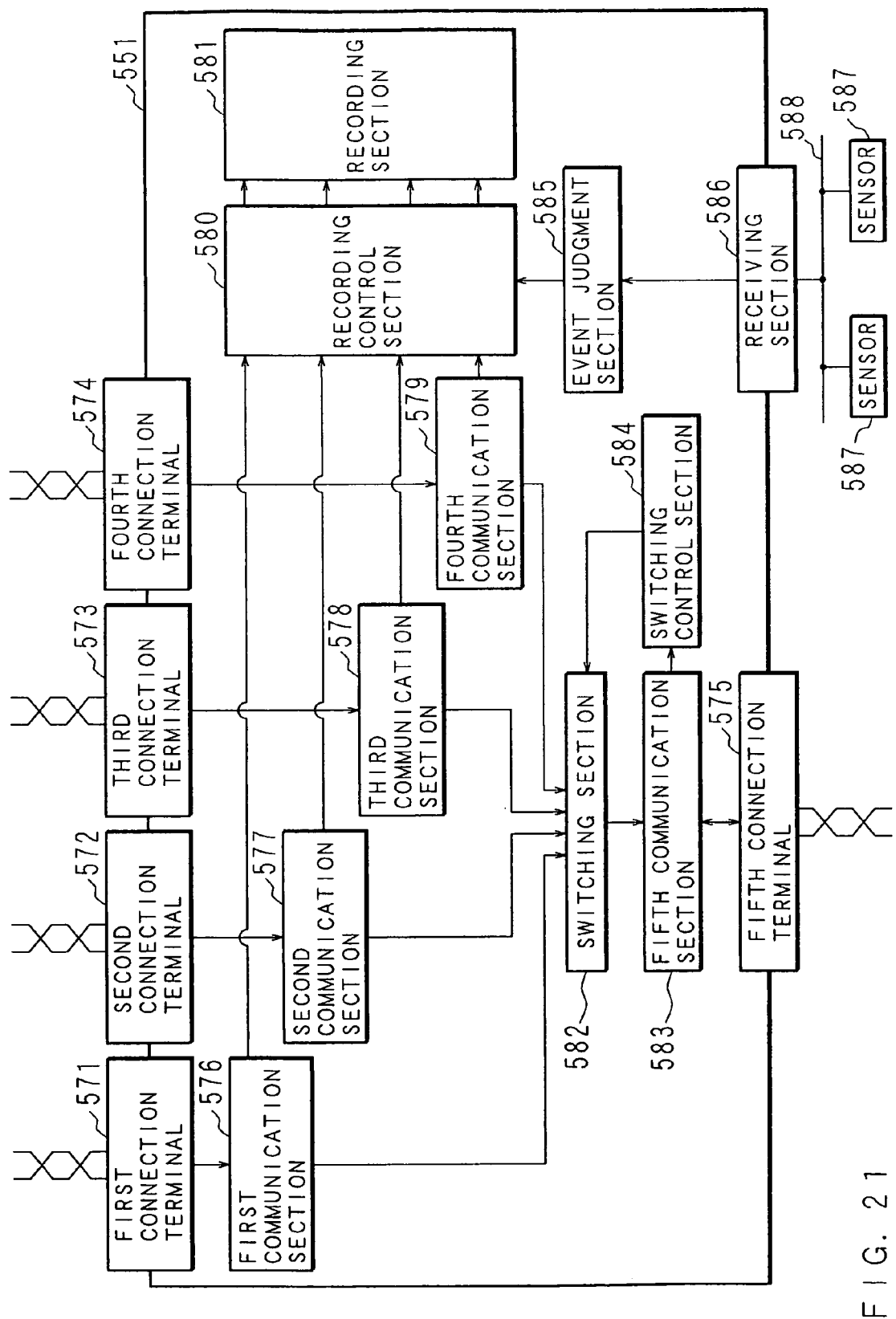
FIG. 21 is a block diagram showing the configuration of a signal switching device in the vehicle-mounted image pickup system according to Embodiment 5 of the present invention.

FIG. 21 is a block diagram showing the configuration of the signal switching device 551 of the vehicle-mounted image pickup system according to Embodiment 5 of the present invention. Since the other signal switching devices 552 to 555 have a configuration similar to that of the signal switching device 551, they are not shown. The signal switching device 551 is equipped with first to fourth connection terminals 571 to 574 (input section) for connection to the four image pickup devices 501 to 504 via transmission lines (and the signal distributors 541 and 542) and also equipped with a fifth connection terminal 575 (output section) for connection to the ECU 521 via a transmission line. The first to fourth connection terminals 571 to 574 are input connection terminal to which the video signals are input. The video signals input to the first to fourth connection terminals 571 to 574 are supplied to first to fourth communication sections 576 to 579, respectively, and the first to fourth communication sections 576 to 579 supply the supplied video signals to a switching section 582 and a recording control section 580.

The switching section 582 selects and switches one of the four video signals respectively supplied from the first to fourth communication sections 576 to 579 depending on a control signal supplied from a switching control section 584 and then supplies the selected video signal to a fifth communication section 583 as an output signal. The fifth connection terminal 575 is an input/output connection terminal through which the video signal is output and the control signal from the ECU 521 is input. The fifth communication section 583 supplies the video signal supplied from the switching section 582 to the fifth connection terminal 575 and outputs the video signal to the ECU 521. In addition, the fifth communication section 583 supplies the control signal input from the ECU 521 to the fifth connection terminal 575 to the switching control section 584. Since the output of the video signal and the input of the control signal at the fifth connection terminal 575 cannot be performed simultaneously, the fifth communication section 583 performs input/output switching at a predetermined timing. The switching control section 584 controls the video signal switching and outputting operations of the switching section 582 on the basis of the control signals supplied from the fifth communication section 583.

Furthermore, various sensors (vehicle information acquiring means) 587 for detecting the speed, acceleration, brake operation state, steering wheel operation state, etc. of the vehicle 500 are mounted on the vehicle 500, and the detection results of the sensors 587 are supplied to the signal switching device 551 (to 555) as vehicle information. The signal switching device 551 is equipped with a receiving section 586 connected to the sensors 587 via connection wires 588 so as to receive the vehicle information from the sensors 587, and the receiving section 586 is configured so as to supply the received vehicle information to an event judgment section (trigger signal generating means) 585. The event judgment section 585 judges, on the basis of the supplied vehicle information, as to whether an accident, such as a collision, has occurred to the vehicle 500. In the case that it is judged that an accident has occurred, the event judgment section 585 generates a trigger signal and supplies the trigger signal to the recording control section 580. Since the judgment as to whether an accident has occurred is made on the basis of the known technology regarding the drive recorder, the detailed description of the technology is herein omitted. The judgment can be made, for example, by determining whether the acceleration applied to the vehicle 500 exceeded its threshold value, whether the speed of the vehicle changed abruptly or whether the driver performed a sudden braking operation.

To the recording control section 580, the video signals from the first to fourth communication sections 576 to 579 are supplied and the trigger signal from the event judgment section 585 is supplied. The recording control section 580 is used to record video pictures relating to the supplied video signals in a recording section 581 formed of a flash memory or a hard disk drive or the like. In addition, the recording control section 580 (reducing means) has a function of reducing the frame rates of the video pictures relating to the supplied video signals. Hence, the video pictures, the frame rates of which are reduced so that the amount of data thereof is reduced, are recorded in the recording section 581. Since the video pictures picked up by the image pickup devices 501 to 513 are each made up of a sequence of still images, the recording control section 580 can reduce the frame rate by thinning the still images at predetermined intervals. Although the recording control section 580 is configured so that the amount of data is reduced by reducing the frame rate, the recording control section 580 may be configured so that the amount of data is reduced by using other methods, such as a method in which video pictures are compressed and recorded.

When the trigger signal is not supplied from the event judgment section 585, the recording control section 580 is configured so as to record the video pictures, which are supplied from the first to fourth communication sections 576 to 579 and whose frame rates are reduced, in the recording region of the recording section 581 in the order from the first address to the last address thereof. When the video picture recording has reached the last address of the recording region of the recording section 581, video picture overwriting is performed from the first address again repeatedly so as to complete recording.

When the trigger signal was supplied from the event judgment section 585, on the basis of the control by the recording control section 580, the video pictures picked up during a predetermined period from the time when the trigger signal was supplied are recorded in the recording section 581, and an overwriting prohibiting flag is set in the video pictures picked up during the predetermined period before and after the time when the trigger signal was supplied. With this setting, the video pictures recorded in the recording section 581 and having the overwriting prohibiting flags are not overwritten but preserved even when the recording section 581 resumes video picture recording.

As described above, the signal switching devices 551 to 555 of the vehicle-mounted image pickup system according to Embodiment 5 are each equipped with not only the function of switching and outputting the video signals supplied from the plurality of image pickup devices 501 to 513 but also the function of recording video pictures so as to serve as a drive recorder.

Figure 22:
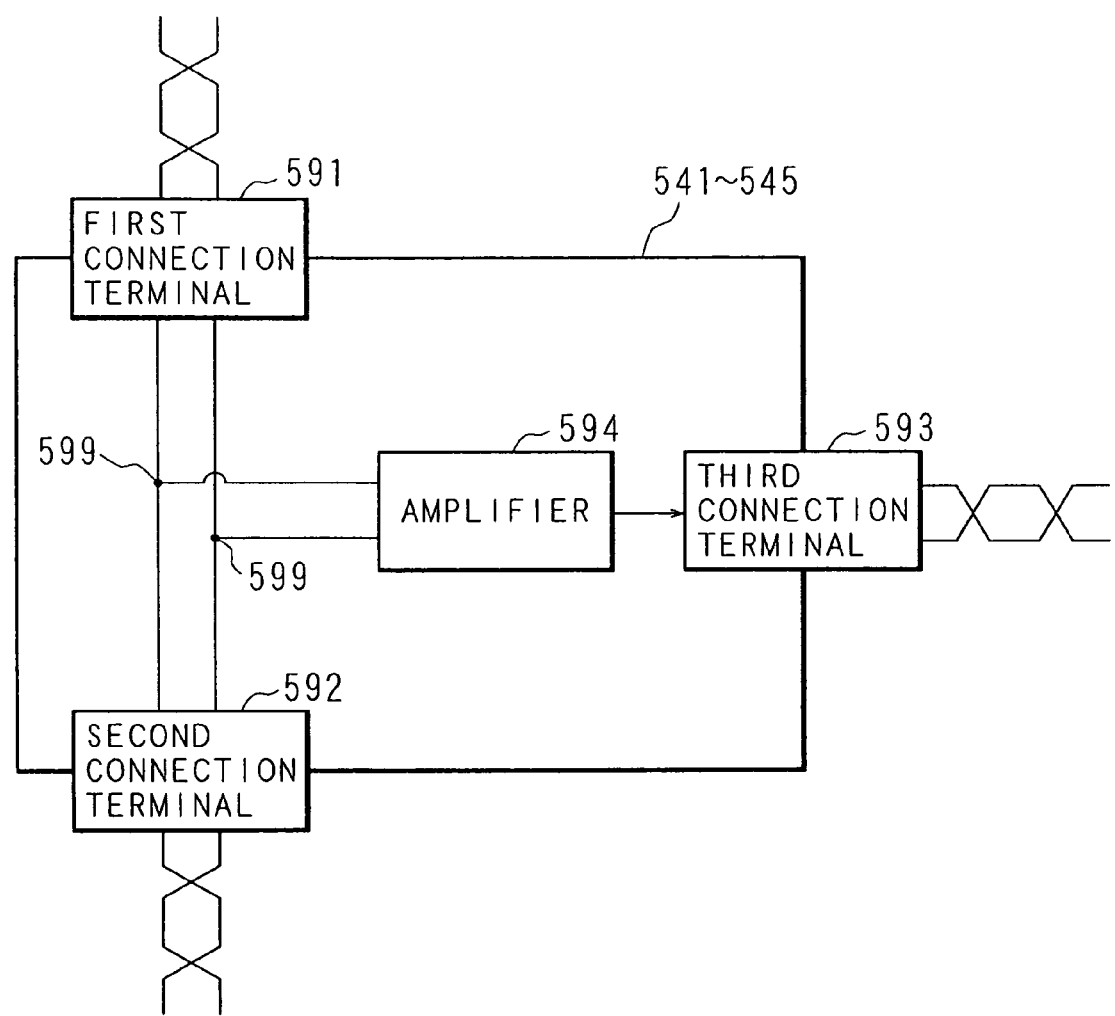
FIG. 22 is a block diagram showing the configuration of a signal distributor in the vehicle-mounted image pickup system according to Embodiment 5 of the present invention.

FIG. 22 is a block diagram showing the configuration of the signal distributors 541 to 545 of the vehicle-mounted image pickup system according to Embodiment 5 of the present invention. The signal distributors 541 to 545 are each equipped with a first connection terminal 591 (input section) for connection to one of the image pickup devices 501 to 513 via transmission lines (and the signal switching devices 551 to 555 and the signal distributors 541 to 545) and also equipped with a second connection terminal 592 and a third connection terminal 593 (output section) for connection to two of the ECUs 521 to 530 via transmission lines. The first connection terminal 591 and the second connection terminal 592 are input/output connection terminals for a video signal and a control signal, and the third connection terminal 593 is an output connection terminal through which a video signal is output.

The first connection terminal 591 and the second connection terminal 592 of the signal distributors 541 to 545 are directly connected to each other via wiring. Hence, a signal input from the first connection terminal 591 is directly output from the second connection terminal 592. In a similar way, a signal input from the second connection terminal 592 is directly output from the first connection terminal 591. Furthermore, the wires for connection between the first connection terminal 591 and the second connection terminal 592 are branched at branching points 599 (distribution section), and the branched wires are connected to the input terminals of an amplifier 594. The output terminals of the amplifier 594 are connected to the third connection terminal 593 so that the video signal input from the first connection terminal 591 is amplified and output from the third connection terminal 593.

In the vehicle-mounted image pickup system shown in FIGS. 19 and 20, the video signals output from the two image pickup devices 505 and 506 are input to the signal switching device 552, and only one of the video signals is output. The video signal output from the signal switching device 552 is distributed by the signal distributors 543 to 545 and supplied to the four ECUs 523 to 526. The control signal from the ECU 524 is required to be input to the signal switching device 552, and the control signal can be transmitted to the signal switching device 552 by transmitting the control signal from the second connection terminal 592 to the first connection terminal 591 sequentially in the order from the signal distributor 545 to the signal distributor 543. When the amplifier intervenes between the first connection terminal 591 and the second connection terminal 592 of the signal distributors 543 to 545, the control signal cannot be transmitted, and it is necessary to provide transmission lines for transmitting the control signal from the ECU 524 to the signal switching device 552. However, with the configuration shown in FIG. 22, it is not necessary to provide such transmission lines.

In the vehicle-mounted image pickup system configured as described above, the video signal transmission from the plurality of image pickup devices 501 to 513 mounted on the vehicle 500 to the ECUs 521 to 530 is performed via the signal switching devices 551 to 555 and the signal distributors 541 to 545. With this configuration, the amount of the transmission lines provided in the vehicle 500 can be reduced, the ECUs 521 to 530 are not required to be equipped with numerous connection terminals, and size reduction is not impaired. Hence, a vehicle-mounted image pickup system equipped with more image pickup devices can be mounted on the vehicle 500, and the vehicle-mounted image pickup system can be provided at a low price. Furthermore, with the configuration in which the vehicle information detected using the various sensors 587 is supplied to the signal switching devices 551 to 555 and the event judgment section 585 judges as to whether an accident has occurred, and the recording section 581 for recording video pictures are provided in the signal switching devices 551 to 555 so that the video pictures are recorded in the recording section 581 depending on the trigger signal generated from the event judgment section 585. Hence, the video pictures can be recorded efficiently by using the signal switching devices 551 to 555, to which the video signals from the plurality of image pickup devices 501 to 513 are input, as drive recorders. Consequently, in the case that an accident has occurred to the vehicle 500, the cause of the accident can be verified in greater detail.

In addition, the recording capacity of the recording section 581 can be used more efficiently and more video pictures can be recorded by virtue of the configuration in which the frame rates of the video data are reduced by the recording control section 580 of the signal switching devices 551 to 555, and the reduced video data is recorded in the recording section 581. Furthermore, with the configuration in which the fifth connection terminal 575 of the signal switching devices 551 to 555 is used as an input/output connection terminal and the ECUs 521 to 530 transmit the control signals thereof to the signal switching devices 551 to 555 using the transmission lines for transmitting the video signals from the signal switching devices 551 to 555 to the ECUs 521 to 530, the ECUs 521 to 530 can control the signal switching devices 551 to 555 without newly providing control signal transmission lines. Hence, the cost of the vehicle-mounted image pickup system can be prevented from increasing. Moreover, with the configuration in which the first connection terminal 591 and the second connection terminal 592 of the signal distributors 541 to 545 are used as input/output connection terminals so that the video signal input from the first connection terminal 591 can be output from the second connection terminal 592 and so that the control signal input from the second connection terminal 592 can be output from the first connection terminal 591, the ECUs 521 to 530 can control the signal switching devices 551 to 555 without increasing transmission lines even when the signal distributors 541 to 545 intervene between the signal switching devices 551 to 555 and the ECUs 521 to 530. Still further, with the configuration in which the video signal input from the first connection terminal 591 of the signal distributors 541 to 545 is amplified by the amplifier 594 and output from the third connection terminal 593, the video signal are prevented from being degraded due to distribution.

Although the signal switching devices 551 to 555 are configured so as to receive four or two video signals in this embodiment, the signal switching devices 551 to 555 are not limited to have this configuration but may have a configuration in which three or five or more video signals are received and one of the video signals is selected, switched and output. In addition, although the signal distributors 541 to 545 are configured so as to distribute the input video signals to two of the ECUs 521 to 530, the signal distributors 541 to 545 are not limited to have this configuration but may have a configuration in which the input video signals are distributed to three or more of the ECUs 521 to 530. Furthermore, it may be possible to have a configuration containing devices having both the functions of the signal switching devices 551 to 555 and the signal distributors 541 to 545, that is, the function for selecting and switching one of the plurality of video signals supplied from the plurality of image pickup devices 501 to 513 and the function for distributing the video signal to the plurality of ECUs 521 to 530. Moreover, all the signal switching devices 551 to 555 contained in the vehicle-mounted image pickup system are not necessarily required to be equipped with the recording section 581, but it may be possible to have a configuration in which only some of the signal switching devices 551 to 555 are equipped with the recording section 581.

In addition, the numbers and positions of the image pickup devices 501 to 513, the ECUs 521 to 530, the signal switching devices 551 to 555 and the signal distributors 541 to 545 mounted on the vehicle 500, the connection states of these devices via the transmission lines, etc. are not limited to those shown in FIGS. 19 and 20. Furthermore, although the vehicle-mounted image pickup system is configured so that the various sensors 587 and the signal switching devices 551 to 555 mounted on the vehicle 500 are connected via the connection wires 588, the system is not limited to have this configuration but may have a configuration in which the sensors 587 are incorporated in the signal switching devices 551 to 555. Moreover, although the vehicle-mounted image pickup system is configured so that the event judgment section 585 is mounted in the signal switching devices 551 to 555 and so that a judgment is made as to whether an accident has occurred to the vehicle 500, the system is not limited to have this configuration but may have a configuration in which the signal switching devices 551 to 555 receive the trigger signal from a device that is other than the event judgment section 585 and has the function thereof thereby recording video pictures.

(Modification 1)

Figure 23:
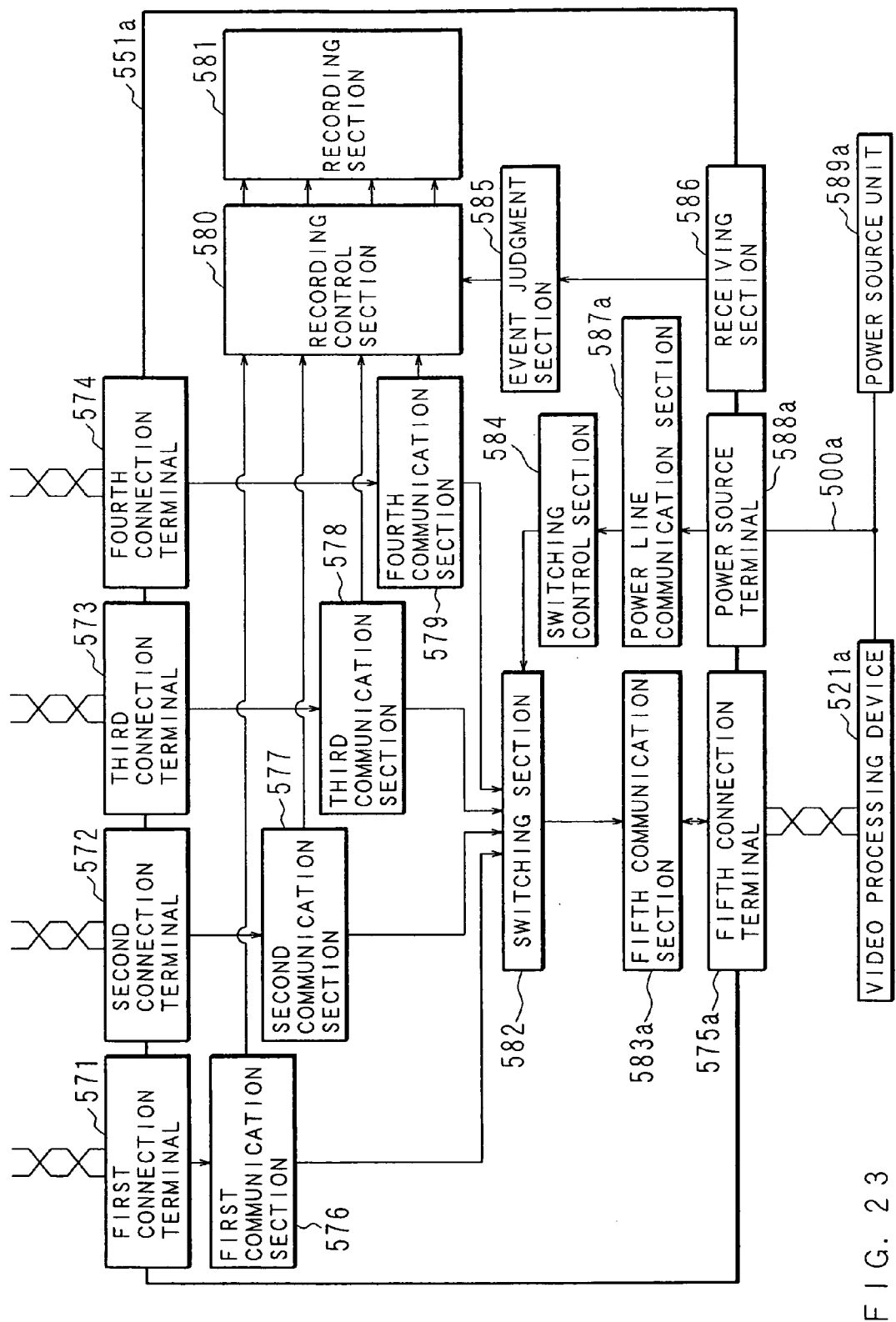
FIG. 23 is a block diagram showing the configuration of a signal switching device in a vehicle-mounted image pickup system according to Modification 1 of Embodiment 5 of the present invention.

The vehicle-mounted image pickup system according to Embodiment 5 described above has a configuration in which the control signals from the ECUs are transmitted to the signal switching devices using the transmission lines for transmitting video signals from the signal switching devices to the ECUs. However, a vehicle-mounted image pickup system according to Modification 1 of Embodiment 5 has a configuration in which the control signals are transmitted from the ECUs to the signal switching devices via power lines. FIG. 23 is a block diagram showing the configuration of a signal switching device 551a in the vehicle-mounted image pickup system according to Modification 1 of Embodiment 5 of the present invention. A power source unit 589a (power supplying means) formed of a battery or the like is mounted on the vehicle 500 and supplies power to an ECU 521a and the signal switching device 551a via power lines 500a. The signal switching device 551a is equipped with a power source terminal 588a for connection to the power line 500a so that the power from the power source unit 589a is supplied to the respective sections of the signal switching device 551a (power supply paths from the power source terminal 588a to the various sections are not shown).

The signal switching device 551a and the ECU 521a of the vehicle-mounted image pickup system according to Modification 1 is equipped with a function of executing communication via the power line 500a, that is, the so-called PLC (Power Line Communication) function, whereby the control signal for controlling the switching section 582 is transmitted from the ECU 521a to the signal switching device 551a via the power line 500a. The ECU 521a is equipped with a power line communication circuit (not shown) for superimposing the control signal on the power line 500a and for outputting the control signal, and the signal switching device 551a is equipped with a power line communication section 587a for extracting the control signal superimposed on the power line 500a.

The power line communication section 587a, connected to the power source terminal 588a, extracts the control signal superimposed on the power line 500a and supplies the control signal to the switching control section 584. The switching control section 584 controls the switching section 582 on the basis of the control signal supplied from the power line communication section 587a. Hence, the fifth connection terminal 575a of the signal switching device 551a serves as a connection terminal for outputting a video signal and is used to output the video signal supplied from the fifth communication section 583a to the ECU 521a.

With the above-mentioned configuration, the ECU 521a can control the signal switching device 551a via the power line 500a. Since the power line 500a serves as essential wiring for supplying power from the power source unit 589a, the control signal can be transmitted securely without newly providing a transmission line for transmitting the control signal. Although the power source unit 589a, the ECU 521a and the signal switching device 551a are directly connected via the power lines 500a in the configuration of Modification 1 shown in FIG. 23, Modification 1 is not limited to have this configuration but may have a configuration in which a device for performing voltage conversion intervenes among the power source unit 589a, the ECU 521a and the signal switching device 551a. Furthermore, Modification 1 may also have a configuration in which power is supplied from the power source unit 589a to the ECU 521a and the supplied power is subjected to voltage conversion using the ECU 521a and supplied to the signal switching device 551a.

(Modification 2)

Figure 24:
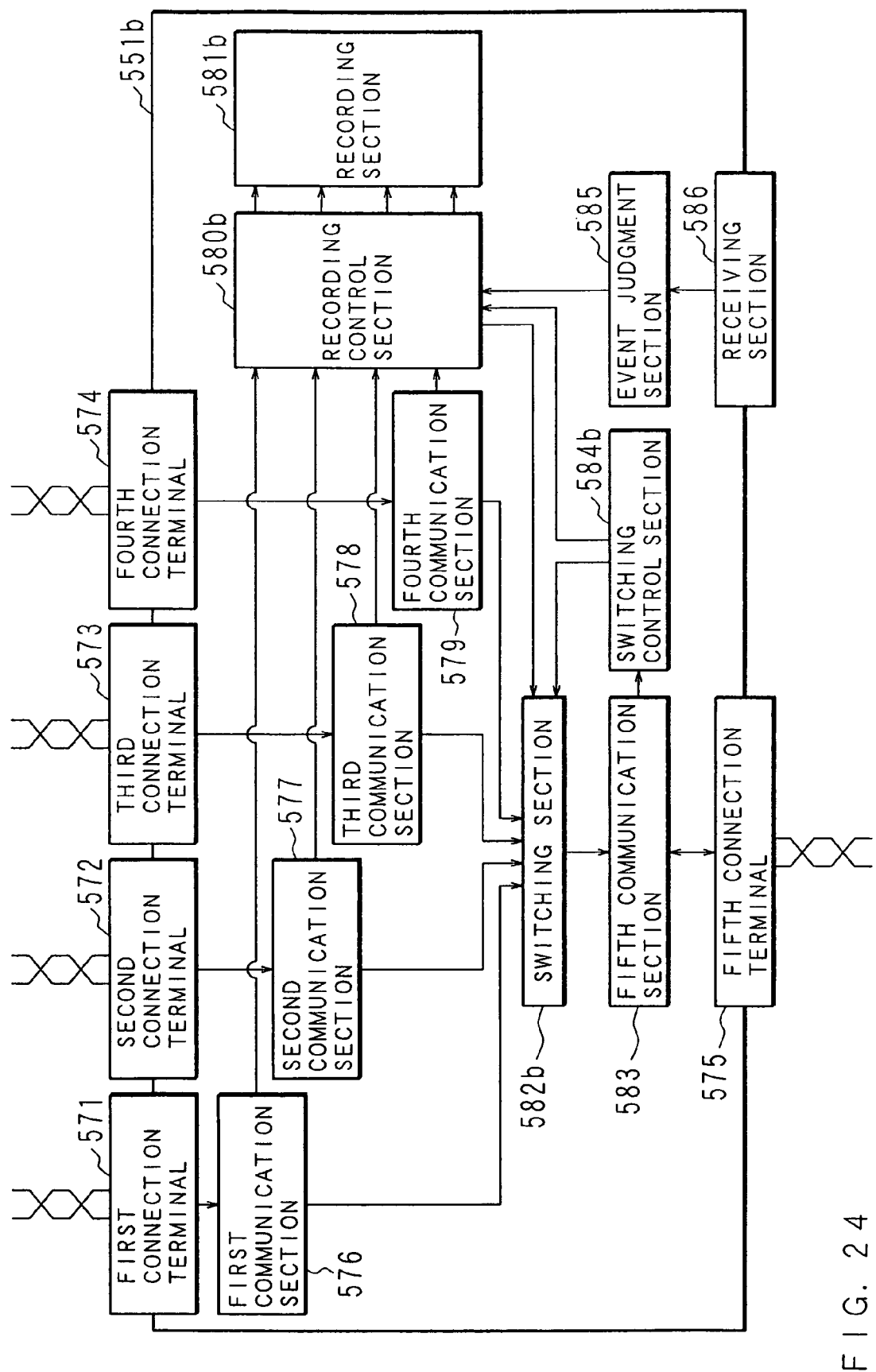
FIG. 24 is a block diagram showing the configuration of a signal switching device in a vehicle-mounted image pickup system according to Modification 2 of Embodiment 5 of the present invention.

In the vehicle-mounted image pickup system according to Embodiment 5 described above, the signal switching device is configured so that the video picture relating to the video signal input thereto is only recorded in the recording section. However, the signal switching device of a vehicle-mounted image pickup system according to Modification 2 of Embodiment 5 is configured so that the video picture recorded in the recording section can be read and transmitted to the ECU. FIG. 24 is a block diagram showing the configuration of a signal switching device 551b in the vehicle-mounted image pickup system according to Modification 2 of Embodiment 5 of the present invention. A recording control section 580b (reducing means, reading means) provided in the signal switching device 551b according to Modification 2 can record a video picture in a recording section 581b depending on the trigger signal supplied from the event judgment section 585 and can read the video picture recorded in the recording section 581b depending on the control signal supplied from a switching control section 584b (receiving means) and then can supply the read video picture to a switching section 582b as a video signal.

The video signals from the first to fourth communication sections 576 to 579 are supplied to the switching section 582b, and the video signal from the recording control section 580b is also supplied to the switching section 582b. The switching section 582b selects and switches one of the five video signals depending on the control signal from the switching control section 584b and then supplies the video signal to the fifth communication section 583. The fifth communication section 583 supplies the video signal from the switching section 582b to the fifth connection terminal 575 and outputs the video signal to the ECU. Furthermore, the fifth communication section 583 receives the control signal supplied from the ECU and supplies the control signal to the switching control section 584b.

The switching control section 584b controls the switching section 582b and the recording control section 580b on the basis of the control signal supplied from the fifth communication section 583. When an instruction for outputting the video signals input from the image pickup devices to the first to fourth connection terminals 571 to 574 is supplied from the ECU as a control signal, the switching control section 584b controls the switching section 582b so that the video signals supplied from the first to fourth communication sections 576 to 579 to the switching section 582b are output and also controls the recording control section 580b so that a video picture is recorded in the recording section 581b. When an instruction for outputting the video picture recorded in the recording section 581b is supplied from the ECU as a control signal, the switching control section 584b controls the recording control section 580b so that the video picture is read from the recording section 581b and also controls the switching section 582b so that the video signal supplied from the recording control section 580b is output.

With the configuration described above, the ECU can obtain the video picture recorded in the recording section 581b of the signal switching device 551b, whereby processing, such as displaying the video picture obtained by the ECU on a display, can be done easily.

(Modification 3)

Figure 25:
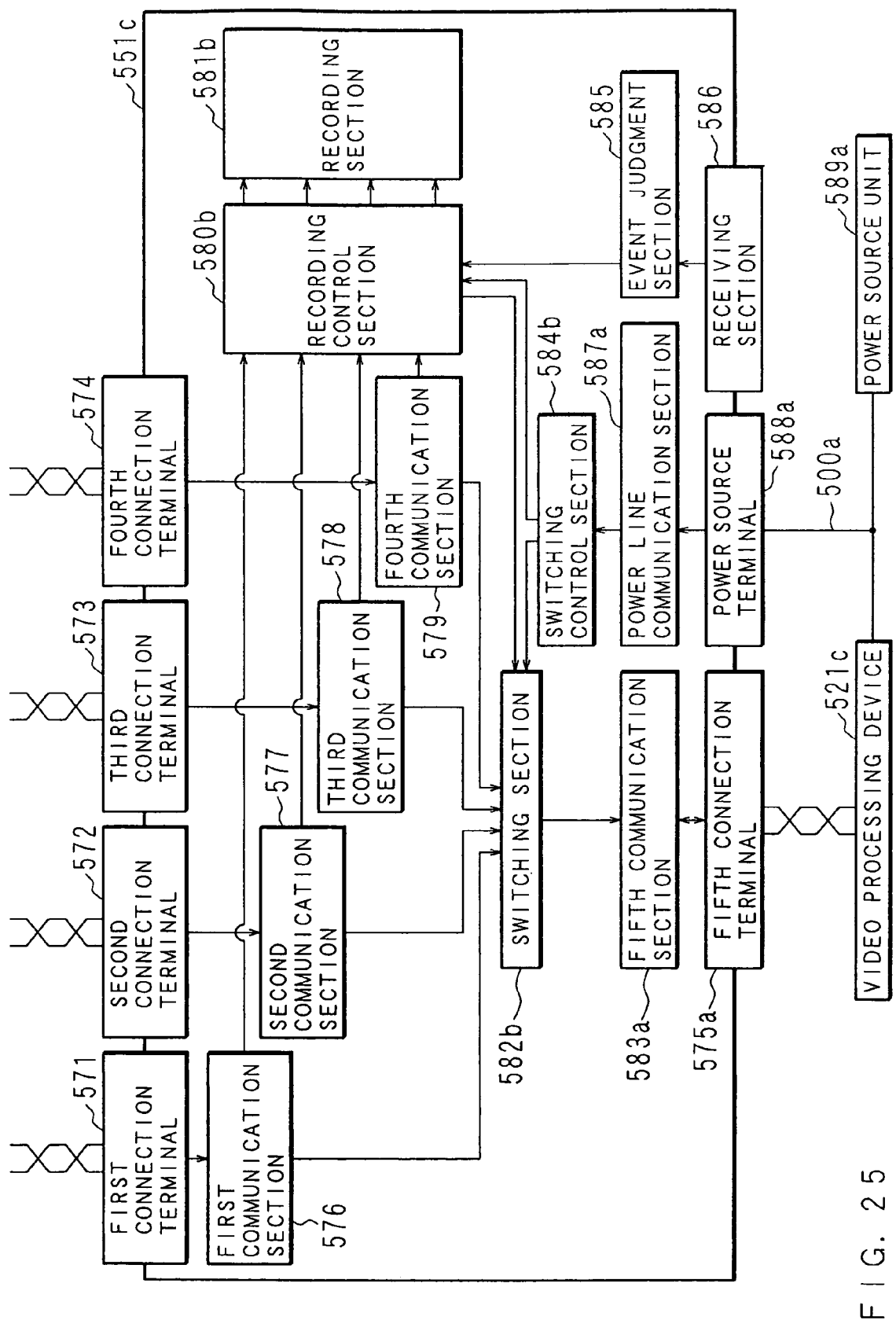
FIG. 25 is a block diagram showing the configuration of a signal switching device in a vehicle-mounted image pickup system according to Modification 3 of Embodiment 5 of the present invention.

FIG. 25 is a block diagram showing the configuration of a signal switching device 551c in a vehicle-mounted image pickup system according to Modification 3 of Embodiment 5 of the present invention. The signal switching device 551c according to Modification 3 is equipped with the function of the signal switching device 551a according to Modification 1 shown in FIG. 23 and the function of the signal switching device 551b according to Modification 2 shown in FIG. 24. The signal switching device 551c is connected to the power source unit 589a and an ECU 521c via the power lines 500a. The power from the power source unit 589a is supplied via the power lines 500a. Furthermore, the control signal relating to the switching of the switching section 582b and the control signal relating to the reading of the video picture recorded in the recording section 581b can be received from the ECU 521c via the power line 500a.

The signal switching device 551c is equipped with the power line communication section 587a for performing power line communication. The power line communication section 587a is connected to the power source terminal 588a and extracts the control signals superimposed on the power line 500a and supplies the extracted control signals to the switching control section 584b. On the basis of the control signals supplied from the power line communication section 587a, the switching control section 584b controls the switching section 582b and also controls the recording control section 580b so that the recording control section 580b performs reading.

Embodiment 6

Figure 26:
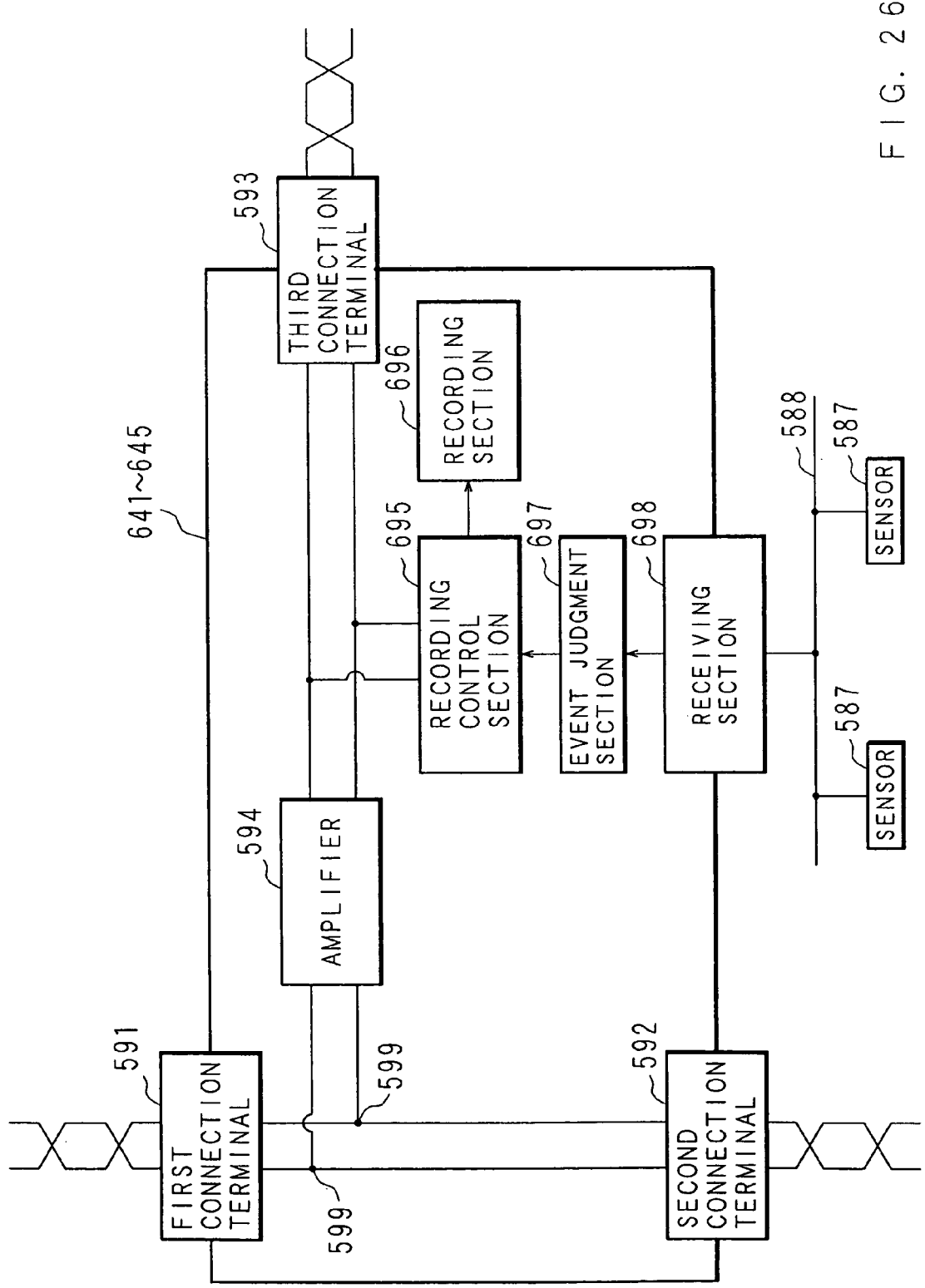
FIG. 26 is a block diagram showing the configuration of a signal distributor in a vehicle-mounted image pickup system according to Embodiment 6 of the present invention.
Figure 27:
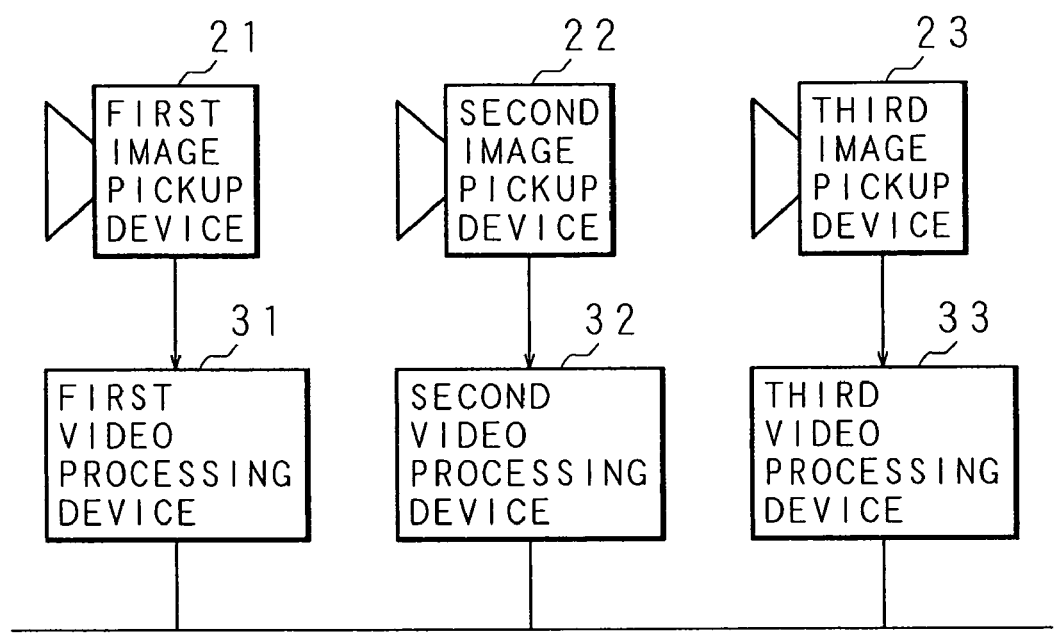
FIG. 27 is a block diagram showing an example of the conventional vehicle-mounted video communication system.
Figure 28:
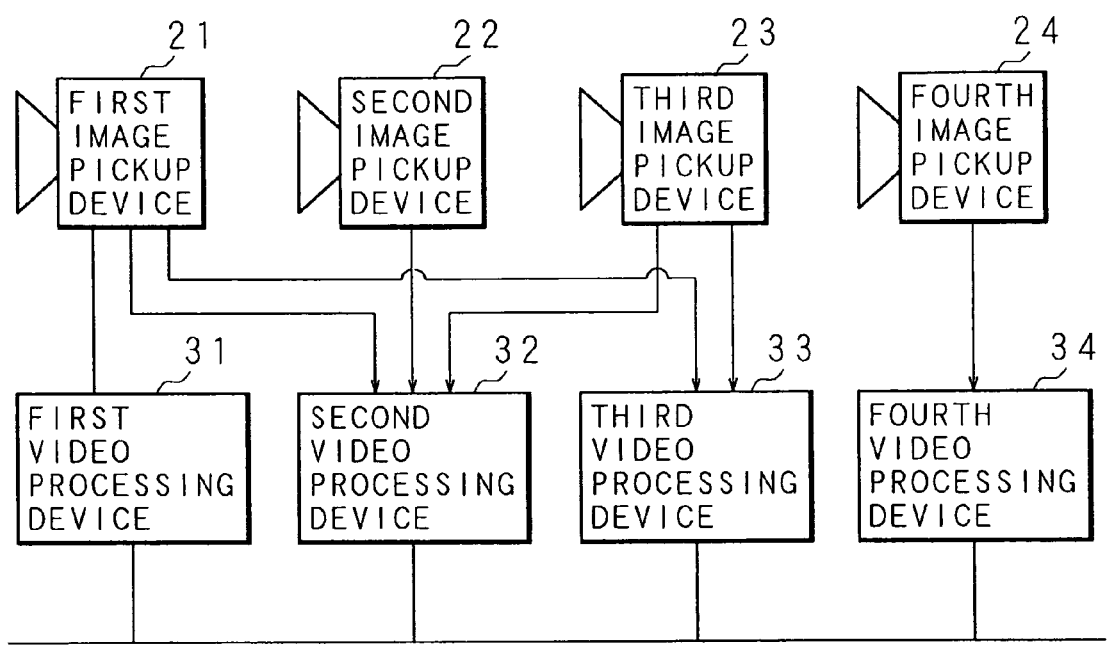
FIG. 28 is a block diagram schematically showing an example of problems in the conventional connection method.

The vehicle-mounted image pickup system according to Embodiment 5 is configured so that the signal switching devices 551 to 555 are each equipped with the recording section 581 for recording video pictures. However, a vehicle-mounted image pickup system according to Embodiment 6 is configured so that signal distributors are each equipped with a recording section for recording video pictures. FIG. 26 is a block diagram showing the configuration of signal distributors 641 to 645 in the vehicle-mounted image pickup system according to Embodiment 6 of the present invention. The signal distributors 641 to 645 according to Embodiment 6 are each equipped with a recording control section 695 (reducing means), to which the video signal amplified by the amplifier 594 is supplied and which reduces the frame rate of the video picture relating to the video signal and records the video picture in a recording section 696. Furthermore, the signal distributors 641 to 645 are each equipped with a receiving section 698 connected to the various sensors 587 mounted on the vehicle via the connection wires 588, whereby the receiving section 698 receives vehicle information from the sensors 587 and supplies the vehicle information to an event judgment section 697 (trigger signal generating means). The event judgment section 697 judges whether an accident has occurred to the vehicle on the basis of the supplied vehicle information. In the case that an accident has occurred, the event judgment section 697 supplies a trigger signal to the recording control section 695. The recording control section 695 records a video picture depending on the trigger signal supplied from the event judgment section 697.

In the vehicle-mounted image pickup system according to Embodiment 6 configured as described above, since the video pictures picked up by the image pickup devices can be recorded by using the signal distributors 641 to 645 as drive recorders, in the case that an accident has occurred to the vehicle, the cause of the accident can be investigated in greater detail. Furthermore, it may be possible to configure a vehicle-mounted image pickup system in which the signal switching devices 551 to 555 according to Embodiment 5 and the signal distributors 641 to 645 according to Embodiment 6 are mixed. In this case, the degree of freedom in the design of the vehicle-mounted image pickup system can be raised. Moreover, as in the cases of Modification 2 and Modification 3 of Embodiment 5, the system may be configured so that the signal distributors 641 to 645 have a function of reading the video pictures recorded in the receiving sections 696 and transmitting the video pictures to the ECUs.

Since the other components of the vehicle-mounted image pickup system according to Embodiment 6 are similar to those of the vehicle-mounted image pickup system according to Embodiment 5, the corresponding components are designated by the same reference codes, and the detailed descriptions thereof are omitted.

The invention claimed is:

1. A vehicle-mounted video communication system comprising:
   a plurality of image pickup devices, mounted on a vehicle, for transmitting video data obtained by picking up an image,
   a plurality of video processing devices for processing the video data,
   a vehicle-mounted video relay device having a connection section connected to said plurality of image pickup devices and the plurality of video processing devices via a plurality of first communication lines respectively, and configured to transmit the video data transmitted from said image pickup devices selectively or in a multiplexed state to the plurality of video processing devices, one first communication line of the first communication lines connecting said vehicle-mounted video relay device to a first video processing device of the plurality of video processing devices, and
   a branching unit for branching the one first communication line, wherein
   a remainder of the plurality of video processing devices is connected to the one first communication line branched by said branching unit,
   the plurality of video processing devices are connected to one another via a second communication line,
   the plurality of video processing devices include controllers for generating video request data for requesting the video data of a specific one of said image pickup devices respectively,
   said controller of one of the plurality of video processing devices collects the video request data generated in each video processing device via the second communication line,
   said one of the plurality of video processing devices includes a transmitting section for transmitting the collected video request data to said vehicle-mounted video device via the one first communication line, and
   said one of the plurality of video processing devices transmits video request data at intervals of predetermined time, wherein
   said vehicle-mounted video relay device includes:
   a receiving section for receiving the video request data transmitted from, said transmitting section,
   a controller for specifying said image pickup device required to pick up an image, on the basis of the video request data received by said receiving section; and
   a transmitting section for transmitting video data transmitted from said image pickup device specified by said controller to each video processing device,
   a timer section for measuring time passed after said receiving section received one item of video request data, and
   said vehicle-mounted video relay device, when the predetermined time has passed before said receiving section receives another item of video request data, transmits video data transmitted from a predetermined image pickup device to each video processing device.

2. The vehicle-mounted video communication system according to claim 1, further comprising
   a power controlling section for supplying power to said image pickup device specified by said controller, and shutting off power supply to said image pickup device required not to pick up an image.

3. The vehicle-mounted video communication system according to claim 1, wherein said vehicle-mounted video relay device includes a converting section for converting the video data transmitted from said predetermined image pickup device into video data having a predetermined resolution or frame rate, and
   said vehicle-mounted video relay device transmits the converted video data having the predetermined resolution or frame rate to said plurality of video processing devices.

4. The vehicle-mounted video communication system according to claim 3, wherein
   said video request data contains data indicating a resolution or frame rate of video data, and
   said converting section of said vehicle-mounted video relay device converts the resolution or frame rate of video data on the basis of said data.

5. The vehicle-mounted video communication system according to claim 1, wherein one of said plurality of video processing devices includes:
   a detection result receiving section for receiving a detection result from an external detector;
   a table which stores the detection results and the image pickup devices specified according to the detection results, associated with each other;
   a controller for specifying said image pickup device according to the detection result on the basis of the detection result received by said detection result receiving section and said table; and
   a transmitting section for transmitting video request data requesting video data of the image pickup device specified by said controller to said vehicle-mounted video relay device, and
   said vehicle-mounted video relay device includes:
   a receiving section for receiving the video request data transmitted from said transmitting section;
   a controller for specifying said image pickup device required to pick up an image, on the basis of the video request data received by said receiving section; and
   a transmitting section for transmitting the video data transmitted from said image pickup device specified by said controller to each video processing device.

6. The vehicle-mounted video communication system according to claim 1, wherein said image pickup device includes:

a controller for performing predetermined processing for video data obtained by picking up an image; and a transmitting section for transmitting a predetermined signal depending on a result of the predetermined processing, and said vehicle-mounted video relay device includes a receiving section for receiving the predetermined signal, and said vehicle-mounted video relay device, when the predetermined signal is received, transmits video data of an image pickup device from which the predetermined signal was transmitted to each video processing device.

7. The vehicle-mounted video communication system according to claim 6, further comprising a controller for:

when the video data of said image pickup device from which the predetermined signal was transmitted and video data of the other image pickup device are multiplexed and transmitted, judging as to whether a bit rate of the video data that is multiplexed and transmitted is equal to or more than a predetermined bit rate; and when it is judged that the bit rate is equal to or more than the predetermined bit rate, converting the video data of the other image pickup device into video data having a lower bit rate.

* * * * *